US007441197B2

(12) United States Patent
Tschiegg et al.

(10) Patent No.: US 7,441,197 B2
(45) Date of Patent: Oct. 21, 2008

(54) RISK MANAGEMENT INFORMATION INTERFACE SYSTEM AND ASSOCIATED METHODS

(75) Inventors: Mark A. Tschiegg, Granby, CT (US); Linda P. Burrows, Tolland, CT (US); Todd A. Reinart, Rancho Santa Margarita, CA (US); Peter F. Langan, Avon, CT (US); Michael J. Sutherland, Hartford, CT (US); Mark R. Driscoll, Winthrop, MA (US)

(73) Assignee: Global Asset Protection Services, LLC, Avon, CT (US)

( * ) Notice: Subject to any disclaimer, the term of this patent is extended or adjusted under 35 U.S.C. 154(b) by 24 days.

(21) Appl. No.: 10/411,912

(22) Filed: Apr. 12, 2003

(65) Prior Publication Data
US 2005/0192963 A1 Sep. 1, 2005

Related U.S. Application Data

(63) Continuation-in-part of application No. 10/085,497, filed on Feb. 26, 2002.

(60) Provisional application No. 60/372,291, filed on Apr. 12, 2002.

(51) Int. Cl.
G06F 3/00 (2006.01)
G06F 17/00 (2006.01)
(52) U.S. Cl. .......................... 715/741; 707/102; 707/9; 706/38

(58) Field of Classification Search .............. 707/104.1, 707/102, 10, 9, 100, 200; 705/1, 7, 8, 9, 705/20, 35, 38, 39; 715/714, 744, 741
See application file for complete search history.

(56) References Cited

U.S. PATENT DOCUMENTS

| 5,852,819 | A | 12/1998 | Beller |
| 6,005,560 | A | 12/1999 | Gill et al. |
| 6,023,694 | A | 2/2000 | Kouchi et al. |
| 6,026,397 | A | 2/2000 | Sheppard |
| 6,366,299 | B1 | 4/2002 | Lanning et al. |
| 6,473,080 | B1 | 10/2002 | Brown et al. |
| 6,631,382 | B1 | 10/2003 | Kouchi et al. |
| 6,785,728 | B1 | 8/2004 | Schneider et al. |
| 2002/0087705 | A1 | 7/2002 | Smyth |

(Continued)

OTHER PUBLICATIONS

Beroggi et al., Operational Risk Management, Engineering and Technology Management, 1998. Pioneering New Technologies: Management Issues the Third Millennium, IEMC '98 Proceedings, International Conference on Oct. 11-13, 1998 pp. 447-451.*

(Continued)

*Primary Examiner*—Greta L Robinson
(74) *Attorney, Agent, or Firm*—Lee & Hayes, PLLC

(57) ABSTRACT

A graphical and interactive interface system manages risk management information. A secure database stores risk management information that is accessible by authorized access through a network. A graphics interface generates graphic data of the risk management information in response to the authorized access. One or more workflow process terminals connect in network with the database to provide updates to the risk management information. Summary reporting and statistical processing functionalities facilitate predictive accuracy of the system by permitting a user to compare relevant system inputs when selecting data to provide recommendations to customers for adjustment of insurance policies in accordance with risk management practices.

9 Claims, 48 Drawing Sheets

U.S. PATENT DOCUMENTS

| | | |
|---|---|---|
| 2002/0099586 A1 | 7/2002 | Bladen et al. |
| 2002/0133504 A1 | 9/2002 | Vlahos, et al. |
| 2002/0138318 A1* | 9/2002 | Ellis et al. ................. 705/7 |
| 2002/0147671 A1* | 10/2002 | Sloan et al. ............... 705/36 |
| 2002/0184088 A1 | 12/2002 | Krishnan et al. |
| 2002/0198750 A1* | 12/2002 | Innes et al. ................ 705/7 |
| 2003/0004967 A1 | 1/2003 | Calderaro et al. ........ 707/104.1 |
| 2003/0014287 A1* | 1/2003 | Williams et al. ........... 705/7 |
| 2003/0036087 A1 | 2/2003 | Kaushikkar et al. |
| 2003/0037063 A1* | 2/2003 | Schwartz ................. 707/104.1 |
| 2003/0112234 A1 | 6/2003 | Brown et al. |
| 2003/0120589 A1* | 6/2003 | Williams et al. ........... 705/38 |
| 2003/0135554 A1 | 7/2003 | Bellotti et al. |
| 2003/0160818 A1* | 8/2003 | Tschiegg et al. ........... 345/743 |
| 2003/0191780 A1 | 10/2003 | Heger et al. |
| 2003/0229509 A1* | 12/2003 | Hall et al. ................. 705/1 |
| 2004/0015422 A1 | 1/2004 | Glick et al. |
| 2005/0021288 A1 | 1/2005 | Kunce |

OTHER PUBLICATIONS

U.S. Appl. No. 60/372,291, filed Apr. 12, 2002, entitled "Risk Management Information Interface System and Associated Methods.".

U.S. Appl. No. 10/815,099, filed Mar. 30, 2004, entitled "Strategies for Managing Recommendations.".

Selections from Web Risk Management website, including homepage page, Web Risk ManagerTM Modules page, Web Risk Manager News page, and attached brochure, [online] [retrieved on Sep. 5, 2006], [retrieved from the Internet at URL: <http://www.webriskmanagement.com/home.asp>, copyrighted material dated 2002-2006, 9 pages total.

* cited by examiner

LOCATION SUMMARY REPORT
 DATA FIELDS

- LOCATION ID#
  COUNTRY
  CITY
  STATE
  ADDRESS
  TOTAL LOCATION VALUE ($)
  RISK QUALITY RATING ( SCALE OF 1 TO 10 )
  PREDOMINANT CONSTRUCTION TYPE
  PREDOMINANT NUMBER OF STORIES
  PREDOMINANT YEAR BUILT
  TOTAL LOCATION SQUARE FEET ( SQUARE METERS )
  OCCUPANCY CLASS
  % SPRINKLERS ( 0 TO 100 )
  % SPRINKLERS NEEDED ( 0 TO 100 )
  NORMAL LOSS ESTIMATE TOTAL ( $ )
  PROBABLE MAXIMUM LOSS TOTAL ( $ )
  MAXIMUM FORESEEABLE LOSS TOTAL ( $ )
  ATC EARTHQUAKE ZONE ( 1 TO 7 )
  FEMA FLOOD ZONE ( A, B, OR C)
  WIND STORM ( HIGH, MEDIUM, LOW )
  LAST SURVEY DATE

FIG. 51

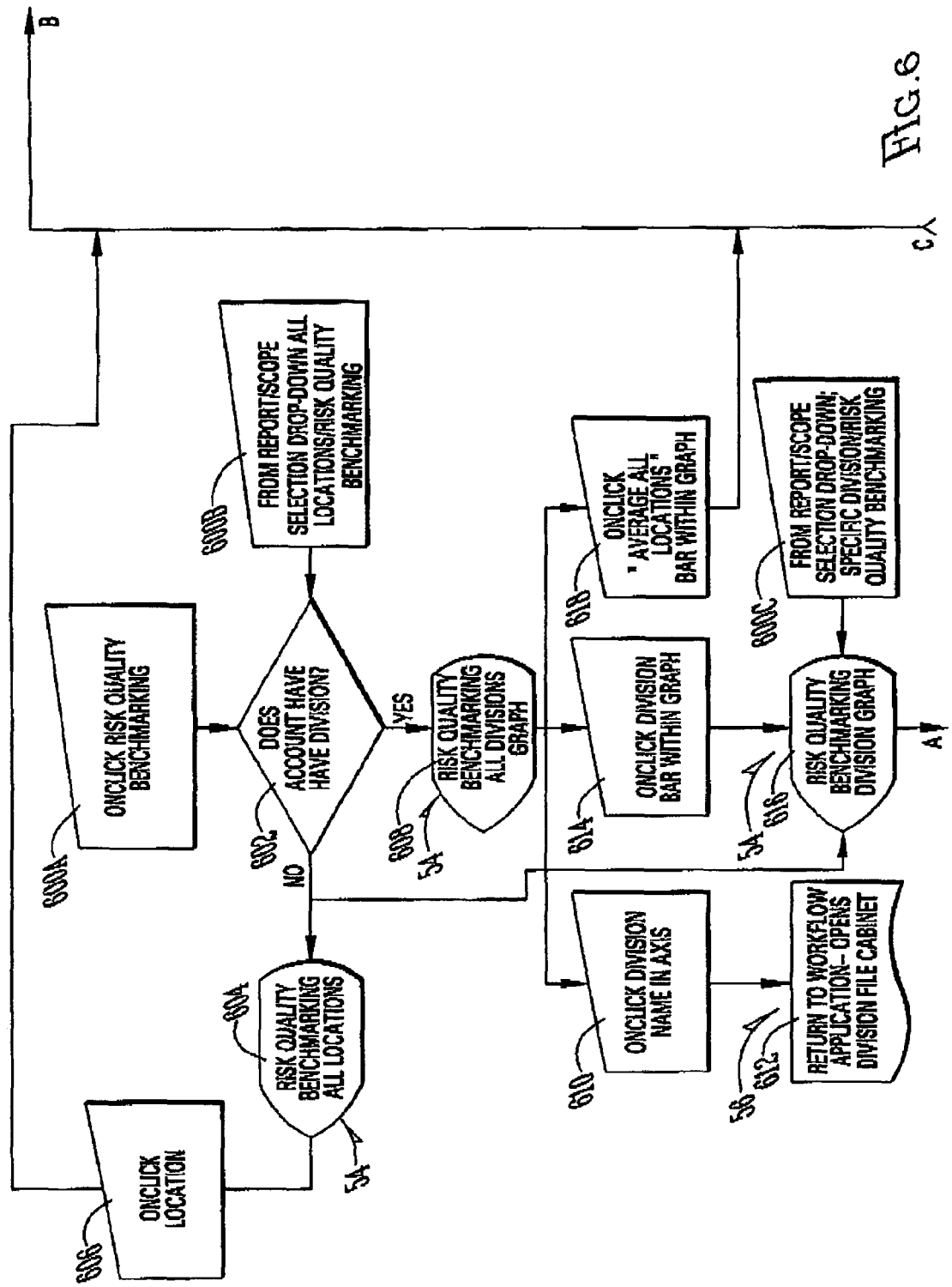

FIG. 28A

COPE SUMMARY

Construction:
Total Square Footage: 150,000
Total Number of Buildings: 12
Predominant Year of construction: 1959
Predominant Number of Stories: 1

| | Non-Combustable Construction | Non-Combustible Walls and Roof deck and Combustible Roof Cover | Combustible Roof and/ or Walls |
|---|---|---|---|
| Square Footage | 101,000 | 200,000 | 100,000 |
| Percentage | 44 | 54 | 2 |

Occupancy:
Major Product: Metal Chassis Used in Transmissions
Number of Employees: 1,200
Number of Shifts per day in Operation: 2
Number of days per week in Operation: 5
General Description: This facility produces metal parts that are used for production of transmissions. The facility does all of the forming, machining. Finishing is not completed here. This location ships unfinished metal chassis to the Mount Vernon, NY. location for finishing.
Interdependency Details:
Protection:
Percent Sprinkler Protected: 70
Percent Needing Sprinkler Protection: 12
Predominant Surveillance Type: Central Station Monitoring
Predominant Water Supply Type: Connection to the Public Water Authority
Fire Department Type: Full Time/Paid
Fire Protection Summary Section — 2800A
Exposures:
External Fire Exposure Severity Rating: 5
External Fire Exposure Description: Building Nos 1 and 3 are "lightly" exposed to the north side by an adjacent two storey residential.
Natural Catastrophe:

| ATC Earthquake Zone | FEMA Flood Zone | Hail Storm |
|---|---|---|
| | | Medium |

Natural Catastrophe Summary Section: — 2800B, 2800C
Other and Allied Perils:

| Type | Protection Rating | Impact Rating | Description |
|---|---|---|---|
| Hail | 4 | 2 | Stock is stored exterrieur to warehouse |

Fire and Allied Perils Loss Estimates

Value Information:

As of: January 12, 2002
Location Property Value (USD): 10,000,000
Location Time Element Value (USD): 14,000,000
Total Value (USD): 24,000,000

|  | DLE | PML | MFL |
|---|---|---|---|
| PD % | 00.013 | 10 | 50 |
| TE % | 00.500 | 25 | 75 |
| PD (USD) | 250,000 | 5,000,000 | 10,000,000 |
| TE (USD) | 500,000 | 7,500,000 | 14,500,000 |
| Total (USD) | 750,000 | 12,500,000 | 24,000,000 |

*Yellow signifies maximum for the Account
**Orange signifies maximum for the Division Loss Estimates Details: — 2810

Recommendation Summary

Total Active Recommendations: 3
Total Recommendations Under Evaluations: 10
Total Recommendations In Progress: 2
Total Recommendations Delayed/On-Hold: 3
Total Recommendations Will Not Complete: 6
Total Done Recommendations: 8
Total Verified Complete; since January 1, 2001: 9
Total Abeyance Recommendations: 4

Customer Comments — 2812

Display recommendations with the following status: Active

| Rec. D# | Status | Type | Summary | Customer intent to complete | Cost to complete (USD) | Loss Estimate (USD) | Customer Comments |
|---|---|---|---|---|---|---|---|
| 1999-1-1 | Active | Automatic Sprinklers | Summary | Considering | 1,000 | 150,000 | Add/View Comments |
| 1999-1-2 | Active | Management Programs | Summary | Considering | 100 | 45,000 | Add/View Comments |
| 2001-1 | Active | Special Hazards | Summary | To do within 1 year | 10,000 | 350,000 | Add/View Comments |

| Account Name: | Global Industries Inc. |
|---|---|
| City: | Buenos Aires |
| State: | |
| Country: | Argentina |
| Location ID: | 122156 |

| Facility Identification: | Paint Spray Booth No. 1 |
|---|---|
| Hazard Type: | Spray painting - Manual |
| Location Description: | Building No. 1 : First floor east, Room No. 101 |
| Special Hazards Details: | These building are of light |

| Description & Protection: | Automatic sprinkler protection |
|---|---|
| Protection Rating: | S |
| Impact Rating: | 3 |
| Outstanding Recommendations: | 1999-2, 1999-3, 2002-1, 2002-3 |

Active

| Rec. ID# | Status | Type | Customer Intent | Customer Target Date | Customer Priority | Total LE Before (USD) | Cost To Complete (USD) | Estimated Effect on Overall Industry Index Rating | Last Modified Date | Customer Comments | E-Mail Recs Add Comments | Edit |
|---|---|---|---|---|---|---|---|---|---|---|---|---|
| 1999-2 | xxxx | xxxxx | xxxxx | xxxx | xxxxx | xxxxx | xxxx | xxxxxx | xxxx | xxx | ☐ | xxx |
| 1999-3 | xxxx | xxxxx | xxxxx | xxxx | xxxxx | xxxxx | xxxx | xxxxxx | xxxx | xxx | ☐ | xxx |
| 2002-1 | xxxx | xxxxx | xxxxx | xxxx | xxxxx | xxxxx | xxxx | xxxxxx | xxxx | xxx | ☐ | xxx |
| 2002-3 | xxxx | xxxxx | xxxxx | xxxx | xxxxx | xxxxx | xxxx | xxxxxx | xxxx | xxx | ☐ | xxx |

RISK MANAGEMENT INFORMATION INTERFACE SYSTEM AND ASSOCIATED METHODS

RELATED APPLICATIONS

This application is a continuation-in-part of application Ser. No. 10/085,497 filed Feb. 26, 2002 and claims benefit of priority to provisional application Ser. No. 60/372,291 filed Apr. 12, 2002, each of which are hereby incorporated by reference to the same extent as though fully replicated herein.

BACKGROUND

Companies purchase risk management services to assess risks and exposures within relevant globally distributed properties to better assess and manage property protection and other investments, including human resources and business processes. Risk management services may include, for example, strategic planning and consulting, risk identification, loss prevention assessment and analysis surveys, safety studies, industrial hygiene studies, and capital project review and management. Source data is generally collected from the purchasing company's locations and people. The source data is processed by an extended team of globally distributed field associates, who issue evaluations and recommendations to correct property protection deficiencies; these recommendations and evaluations are generated based on consulting judgment. The source data is refreshed at each consulting engagement or at each field associate visit or via other communications. Typically, such services generate static reports for the companies. In turn, the companies must sift through lengthy, obscure, and poorly coordinated third-party evaluations of their loss control efforts and physical protection systems, in order to benefit from the reports.

Trained experts are routinely able to provide risk management services; however, recommendations (or the lack thereof) to implement risk management strategies are often faulty because the recommendations are based upon bad or incomplete data. The practice of risk management is adversely affected by the unreliability and incompleteness of information from different sources. The reading, maintenance and administration of reports, and the management of resulting action items, is both time consuming and difficult. These circumstances effectively devalue associated investments in property protection, human resources and business processes. Moreover, many companies must physically re-enter certain data from various reports into company-owned databases, in order to facilitate local manipulation of data. It is difficult or impossible, for example, to perform cost benefit analyses, or to benchmark the performance of one entity against the performance of other entities, due to lack of integrated information resources. Furthermore, due to time lag between the time when information become available and when the information can be used, there is often a failure to make timely adjustments accommodating changed business, regulatory or environmental conditions that require correspondingly appropriate risk management activity.

Expert knowledge may also be of relatively narrow scope, for example, in the case of special hazards that are relevant to a particular industry or transportation sector. It is difficult to integrate such specialized knowledge into risk management practices, particularly where the experts may work for different entities and/or the risk management knowledge resides in a plurality of experts that may deliver inconsistent results.

SUMMARY

Certain of the following systems and methods overcome the problems outlined above and advances that art by a providing a risk management system including a seamless interface for real-time manipulation and management of risk management information over a network that accesses integrated information resources. Several other features of the risk management system are apparent within the description that follows.

In one aspect, a risk management system provides a graphical and interactive interface system for managing risk management information. A secure database stores risk management information that is accessible by authorized user access through a network. A graphics interface generates graphic data of the risk management information in response to the authorized access. Users interact with the system in an I/O context via the graphics interface to access the risk management information. The risk management information may be segmented or categorized into a plurality of risk categories, such as fire, catastrophe, construction, and loss prevention. The database may associate risk management recommendations with each risk category on a location or facility basis. The reporting engine may summarize the risk management information, for example, by reporting from the database using user-defined data filtration parameters, calculating statistics, producing counts of data fields, adding loss estimate data to represent a total exposure value, or plotting data points that associate color codes with levels of risk exposure.

In another aspect, one or more workflow process terminals connect in network with the database to provide updates to the risk management information. The terminals may for example include a computer, facsimile, telephone and scanner.

In yet another aspect, the database may include assistance data that is accessible concurrently with authorized access of the risk management information. The assistance data may for example include loss prevention and control standards and guidelines that are useful in establishing uniform risk management practices.

In yet another aspect, the system may have different levels of access authorization that afford users of unrelated entities the benefit of one another's data without breaching confidentiality of the data. A first segment of the risk management information is associated with a first company having proprietary interest in the first segment, and a second segment of the risk management information is associated with a second company having proprietary interest in the second segment. The database and interface cooperate to provide access by users of the first company to the first segment by authorized access while prohibiting access by users of the second company to the first segment. Similarly, the database and interface cooperate to provide access by the second company to the second segment by authorized access while prohibiting access by the first company to the second segment. Accordingly, in another aspect, the risk management information is segmented within the database for association with a plurality of companies having proprietary interest in, and authorized access to, one or more segments of the risk management information. Where the first company users and the second company users are in related industries or have similar locations, it is sometimes useful for the first and second users to share data for benchmarking comparison purposes. Accordingly, access security may be relaxed among those companies wishing to share data, such that data from the first company (or a group of such companies) may be statistically processed for benchmark comparison purposes and used by the second company in a way that does not reveal confidential information of the first company.

In one aspect, at least part of the risk management information is encrypted in complying with the authorized access. One or more access computers coupled in network with the graphics interface thus access the risk management information of the database by decrypting the encrypted risk management information with input of appropriate access codes.

In yet another aspect, the workflow engine, security database, and e-mail notification engine cooperate to automatically generate an e-mail when new information is posted to the risk management database. Users with authorized access to view the segment of the risk management database to which the new information has been posted receive the 'e-mail notification' if the user requests and self-authorizes such e-mail notification. The user may turn this function on or off at their own discretion via a standard screen within the graphic interface. The user may also change the frequency of e-mail notification at their own discretion via the same screen. The database or an email notification application may generate the email in response to authorized updates to a segment of risk management information. The email is addressed to a user at an access terminal that has the appropriate authorizations. The email may contain a hyperlink to the updated information and/or to a document loaded in association with the segment. Email may also be generated periodically to inform the user of interim updates.

In yet another aspect, the graphics interface provides one or more filter functions to manipulate the risk management information for display of graphic data at a computer networked with the graphics interface. The filter functions may for example provide user selection of one or more of the following: country, city, state, location identifier, gross site property damage values, property value, total location in square feet, percent noncombustible construction, percent of noncombustible walls and roof deck with combustible roof covering, percent of combustible roof, percent of combustible walls, percent with sprinklers, percent needing sprinklers, survey report delivery time, cost to complete, last survey date, next survey year/month due, ATC earthquake zone, sprinkler protection, water supply, surveillance, warehousing protection, other protection, management programs, impairments, smoking regulations, maintenance, employee training, new construction, insurance, pre-emergency planning, private fire brigade, hazardous materials, hot work, loss prevention inspection, fire protection inspection, hazard evaluation, housekeeping, outside contractors, FEMA flood zones, windstorm, fire department type, survey frequency, customer priority, customer status, customer intent to complete, predominant construction, customer target date, loss estimates property and time element damage percentage (maximum foreseeable, normal, and probable maximum), facility hazard ID, hazard type, hazard protection rating, hazard impact rating, # of outstanding hazard-specific recommendations, hazard maximum total loss estimates before recommendation completion, maximum hazard total loss estimate cost to complete, hazard benchmark rating, hazard type by industry, hazard type by hazard, recommendation cost to complete, recommendation total loss estimate before completion, recommendation estimated cost to complete, estimate risk reduction, and recommendation loss probability.

Moreover, the graphic data may include one or more graphical reports such as a fire protection, recommendation summary, loss prevention survey report delivery, loss prevention survey report schedule, risk quality benchmarking, risk quality rating, management programs, building construction, catastrophe, active recommendations, and completion status. Additional risk analysis reports may for example include loss estimate (NLE–PML–MFL), location summary, recommendation status, recommendation cost-benefit analysis, location "snapshot", hazard benchmarking, hazard quadrant analysis, hazard summary report, account review-MFL vs. risk quality ratings, account review-natural catastrophe, account review-recommendation status and intent, account review-risk quality categories, account review-risk quality ratings and water test results.

In one aspect, the graphics interface and database form a web server platform to generate secure web pages of the risk management information at a computer networked with the platform and with authorized access to the risk management information.

In another aspect, the database responds to inputs by a user with authorized access, at a computer networked with the database, to securely store electronic documents with the risk management information associated with the user. These electronic documents may for example include one or more of loss prevention survey results, risk summaries, and CAD diagrams. Software may convert the CAD diagrams into a format more suitable for the database. One format is a graphical format. The software may reside with the database or with a workflow application networked with the database.

The database may for example be a SQL database server. The database of one aspect responds to electronically received recommendations regarding a segment of risk management information to post the recommendations with the segment of risk management information.

In another aspect, the graphics interface accommodates input of interactive recommendations such that the recommendations may be stored with the database in association with the segment of risk management information.

In another aspect, the graphics interface provides drill-down linkage between high level summaries and low level explanatory details based upon contributing factors to one or more ratings. The graphics interface may further generate color-coded graphic data to differentiate decision-making risk management information. The color-coded graphic data may further associate different colors to different quality ratings.

One system described below provides for appending user-generated comments to one or more segments of the risk management information. The system facilitates viewing and manipulating risk management recommendations and associated valuations through the graphics interface and over the network. System integration through field-linked reporting presented on the graphical interface facilitates selectively switching between cost-benefit analyses, summaries, and status screens, through the graphics interface and over the network. Users may selectively switch between charts and values associated with recommendations, through the graphics interface and over the network.

In certain aspects, one system generates one or more of the following recommended cost-benefit analysis information through the graphics interface and over the network: total loss before implementation of a recommendation, total loss after implementation of a recommendation, property damage loss before implementation of a recommendation, property damage loss after implementation of a recommendation, business interruption loss before implementation of a recommendation, business interruption loss after implementation of a recommendation, estimated cost to complete, estimated cost to complete source, estimated probability, estimated probability source, and estimated risk reduction. The estimated risk reduction may for example include a factor of [(property loss before implementation of a recommendation+business interruption loss before implementation of a recommendation)−(property loss after implementation of a recommendation+business interruption loss after implementation of a recommendation)−estimated cost to complete].

In another aspect, recommendations may be shared between users through the interface and over the network. By way of example, the recommendations may be shared based upon access and authority levels of accounts, divisions, locations, or individuals.

One system provides for posting user-generated documents with user-authorized risk management information through the graphics interface and over the network. Another system provides for automatically emailing users with notification of modifications in a segment of risk management information, so long as the users have authorized access to the segment. By way of example, the modifications may include the posting of a new document to the segment of risk management information. New documents may be user-created, or generated by a third-party and posted by an authorized user.

In another aspect, an email server connects in network with one or more access computers. An email notification application connects in network with the database to automatically send email notification(s) to the access computers upon updates to segment(s) of the risk management information. A workflow engine application may also connect in network between the database and the email notification application, to interface between one or more access terminals and the database.

In one aspect, a system manages risk management information such that an authorized user may access graphical data representing at least part of the segment of risk management information. A database stores one or more segments of risk management information. The system augments the information within one of the segments through a workflow process terminal in network with the database. An email notification server and/or application provide for communicating email to an authorized user of the one segment to notify the authorized user of the augmented information. A workflow engine application may further interface between one or more workflow process terminals and the database. A security buffer may further couple in network between the database and an access computer of the authorized user to ensure only authorized access to the segments of information. The email may include an Internet link to the augmented information within the one segment. The buffer may automatically check with the database to ensure that a user accessing the link has authorized access to the augmented information. The system may include a graphics interface to collate risk management information from the database into a graphical display for an access computer coupled in network with the database.

In yet another aspect, a method is provided for managing risk management information, including the steps of: segmenting risk management information within a database according to access authorizations; generating graphical display of a segment of risk management information at an access computer networked with the database in response to user inputs at the computer and having appropriate access authorizations; updating the segment of risk management information in response to data inputs through a workflow process terminal; and automatically communicating email to the access computer in notification of the data inputs to the segment.

In one aspect, the step of automatically communicating includes the step of sending an Internet link to information within the segment. In another aspect, the method includes the step of automatically verifying authorizations at the database in response to user interaction with the Internet link. The step of generating graphical display may include the step of filtering the segment of risk management information in response to user-selected filtering options at the access computer.

Further aspects of the system may include a robust reporting capability that can be used to sort and filter relevant risk management data according to user-specified parameters. Generally, a reporting engine is capable of summarizing risk management information, e.g., at a location, division, or company level, or by category of risk. Detailed information in support of the summary may be accessed by drill-down selection of features from summary level reports. For example, a loss estimate summary report may be provided for all locations or filtered according to user-specified parameters. The loss estimate summary report may include a location identifier, and the graphics interface may be configured to operate in concert with the reporting engine such that onclick selection of the location identifier field provides a location snapshot report of summary information associated with that location identifier. The location summary report may contain other selectable fields, and the graphics interface is configured to operate in concert with the reporting engine such that onclick selection of the selectable field provides a pop-up report of loss estimate details. These reports facilitate improved predictive accuracy, which is achieved by comparing relevant system parameters when selecting risk management data for system data input.

In another example, the reporting engine can provide a location snapshot report that includes summary information for a particular location. The graphics interface may contain a plurality of selectable fields each allocated to providing onclick selectable pop-up reports that include expanded information relevant to a different category of the location snapshot report. The different categories may be selected from the group consisting of location documents, fire protection summary, natural catastrophe summary, other and allied protection summary, loss estimate details, customer comments, outstanding recommendations, and combinations thereof.

Other aspects of the summary reporting functionality include the graphics interface and the reporting engine being optionally interfaced to provide graphical displays, such as bar graphs or pie charts, of filtered risk management information according to user-specified parameters. The reporting engine optionally but preferably provides statistical processing of the filtered risk management information, and displays comparative statistical calculation results to the user. The resulting data is particularly useful in providing recommendations to customers, and the system may also provide a reporting and tracking mechanism subject to one or both of recommendation fulfillment and recommendation rejection.

Aspects of the summary reporting capability and related statistical processing include comparisons of data between historical risk assessments and new data from survey practices. The data may be benchmarked or compared on a weighted average basis to compare users' information against normalized, average, anonymous information within the same industry, occupancy group, or product line.

Other aspects of this comparison utility include the generation of ad hoc reports that may be generated and provided to peers on the network for their use, review and comment for sharing among a community of system users.

Aspects of one system include a functionality to task peers, such as other insurance agents, with assignments, such as constructing a survey or completing tasks related to a customer survey. The system permits the peer to report survey results back to the system, seamlessly uploads the response into the risk management database, and reports the results back to the customer for review and verification.

Customers may be provided access to view and manipulate the information from a computer terminal where they are afforded the ability to view and manipulate recommendations and associated valuations. This capability is assisted by providing the customer with the ability to switch between cost-benefit analysis, summary, and status screens.

Predictive accuracy of the system may be enhanced by reconciling estimated results with actual results to assure predictive integrity of the system. A historical archive of risk management features that have been changed is a valuable aid in spotting trends, e.g., a rising or lowering percentage of total value that is replaced through fire damage where the percentage changes five percent every year.

It is further useful, in cases where 'special hazards' are applicable to a particular industry or production method, that some embodiments of the system include a special hazard category of risk. The special hazard category contains miscellaneous types of risks that may each be associated with an impact rating based upon how dangerous the risk or hazard could be to the operation or how critical it may be to the overall production process for a particular location. For example, the impact rating may be measured as a magnitude of potential loss. Additionally, the special hazard may be associated with a protection rating that represents risk management recommendations, such as insurance or damage control systems, that are in place to mitigate the impact rating based upon user interaction with the system to define guidelines for risk management procedures in relation to location-specific requirements. The protection rating may, for example, be measured as an ability to prevent or compensate for a magnitude of potential loss. This same strategy may be adapted for other risk categories.

The association of the impact rating and the protection rating with each special hazard permits the reporting engine to generate charts that plot the impact rating versus the protection rating. A plurality of locations may be shown as data points on a plot of this type. The X-Y coordinates may be normalized to a dimensionless scale from 1 to 10 where 10 has an equivalent value to the magnitude of potential loss. This normalization permits multiple locations to be plotted on a single plot. Additionally, filtration options may be used to accumulate impact ratings and risk prevention ratings for all locations of a particular category, e.g., all locations in a particular division. The resulting data points may then be plotted as a summary for the division. The plot may be divided into quadrants that represent relative degrees of protection, such as which hazards are well protected versus those having potentially severe impact. The quadrants may be color coded e.g., red, blue, green, yellow, to identify relative degrees of protection. The colors may be assigned to the location and used to associate relative risk for the location on other reports that do not show the quadrant. Onclicking of datapoints on the plot may produce additional reporting that provides, for example, a listing of the risk management recommendations (by status of complete or incomplete) that are in place for a location, the actual values for impact rating, and the actual value for the risk protection rating.

The database may be structured to classify any hazard within the system in a matrix of risk management classifications. By way of example, the database my contain tables allocated to risk categories, and the tables may have subcategories. In this way, a natural catastrophe category may be subclassified into earthquake, flood, and storm hazards. The matrix may provide an association between the risk category or subcategory and values that are relevant to risk management, such as facility-specific loss values including facility property value and time element value, as well as hazard-specific loss estimates, risk quality ratings, natural catastrophe ratings, and risk quality ratings. This type of structure facilitates user-configurable reporting from the matrix, for example, by using filtration options to eliminate some data fields from consideration and/or accumulate associated values from within the data structure.

In the case of special hazards, sub-categories may be industry-specific categories including, for example, transportation, heavy industry, services, public sector, consumer products, energy, high technology, forest products, and pharmaceutical hazards. Special hazard categories may also be type categories, such as standard hazards and non-standard hazards including flammable gas-bulk storage, flammable liquids-process use, flammable liquids-storage room, heat treatment furnace, ovens/dryers, painting-automatic spray robots, painting, automatic spray rotary atomizers, drip-painting, dip-painting, painting by robotic electrostatic rotary atomizer, boiler, combustible liquids storage area, computer or data processing rooms, cooling tower, dust collector, flammable liquids and materials handling, and hydraulic systems or equipment. The industry-specific hazards may be cross-referenced against the type categories to produce cross-reference data, which may be filtered for user-selected reporting.

Reporting examples include an ability to access the risk management information to report, on a hazard-specific basis, a risk management recommendation associated with a loss estimate prior to when the risk management estimate is completed and a cost to complete the risk management recommendation. The reporting engine may access the risk management information to provide reports including a visual depiction of hazard quality by facility; and a weighted average of hazard impact, hazard protection rating, and number of hazards by facility, division, company, or operating segment. The reporting engine may provide a visual depiction of the risk management information as a pie chart or bar chart. These visual depictions may, for example, provide a count of risk management information attributes filtered by location, division, segment, or company. Filtration options may be used to show the risk management information as a bar chart that accumulates total values associated with a location, operating division, industry segment, or company.

There may also be provided a benchmarking capability that permits the user to compare, for example, the risk management performance of all divisions in a company, a plurality of locations against one another, or a plurality of companies against one another.

Data may be exported from the system, for example, as a computer readable form attached to an email. In some embodiments, exportation of data launches a spreadsheet or other analysis program that permits the user to manipulate the data outside the confines of the system

BRIEF DESCRIPTION OF THE DRAWINGS

FIG. 2, FIG. 3 and FIG. 4 collectively illustrate representative reports and data filtering functions that may be processed using the system of FIG. 1;

FIGS. 5A, 5B, 5C, 5D, 5E, 5F, 5G, 5H, 5I and 5J collectively illustrate data field grouped by table for use in a relational database used for risk management data storage and reporting applications;

FIGS. 6-24 collectively illustrate a flow chart for computer process operations that operate on the data elements shown in FIGS. 5A-5H with the assistance of user input and system output provided by graphic display screens and system components suitable for use and operation with system of FIG. 1;

FIGS. 28A, 28B, and 28C collectively illustrate a location snapshot report providing summary risk management information relevant to an insured location or a recommendation to insure a location;

FIG. 37 illustrates an industry hazards summary report that is delivered by the processes shown in FIG. 34; and FIG. 38 illustrates a hazards detail report that is delivered by the processes shown in FIG. 34.

DETAILED DESCRIPTION OF THE DRAWINGS

There will now be shown and described a graphical and interactive interface system that is used to manage risk management information. The system includes a secure database that contains risk management information which is accessible by authorized access through a network. A graphics interface is used to generate graphical data by reporting from the risk management information in response to the authorized access. A reporting engine is capable of summarizing risk management information to facilitate risk management decisions and recommendations. Through the equipment and processes described below, the system is shown to track expert-selected data and process this data with human interaction to build risk management recommendations. The system associates the recommendations with each major category of risk that is tracked by the system, e.g., fire, catastrophe, construction, and loss prevention. By this association, users of the system are able to seamlessly transfer between the data and the recommendations across a wide range of risk categories and risk management information. This seamless transfer capability facilitates the building of risk management recommendations. The system may also track recommendations to ascertain whether they have been implemented.

Figure 1:
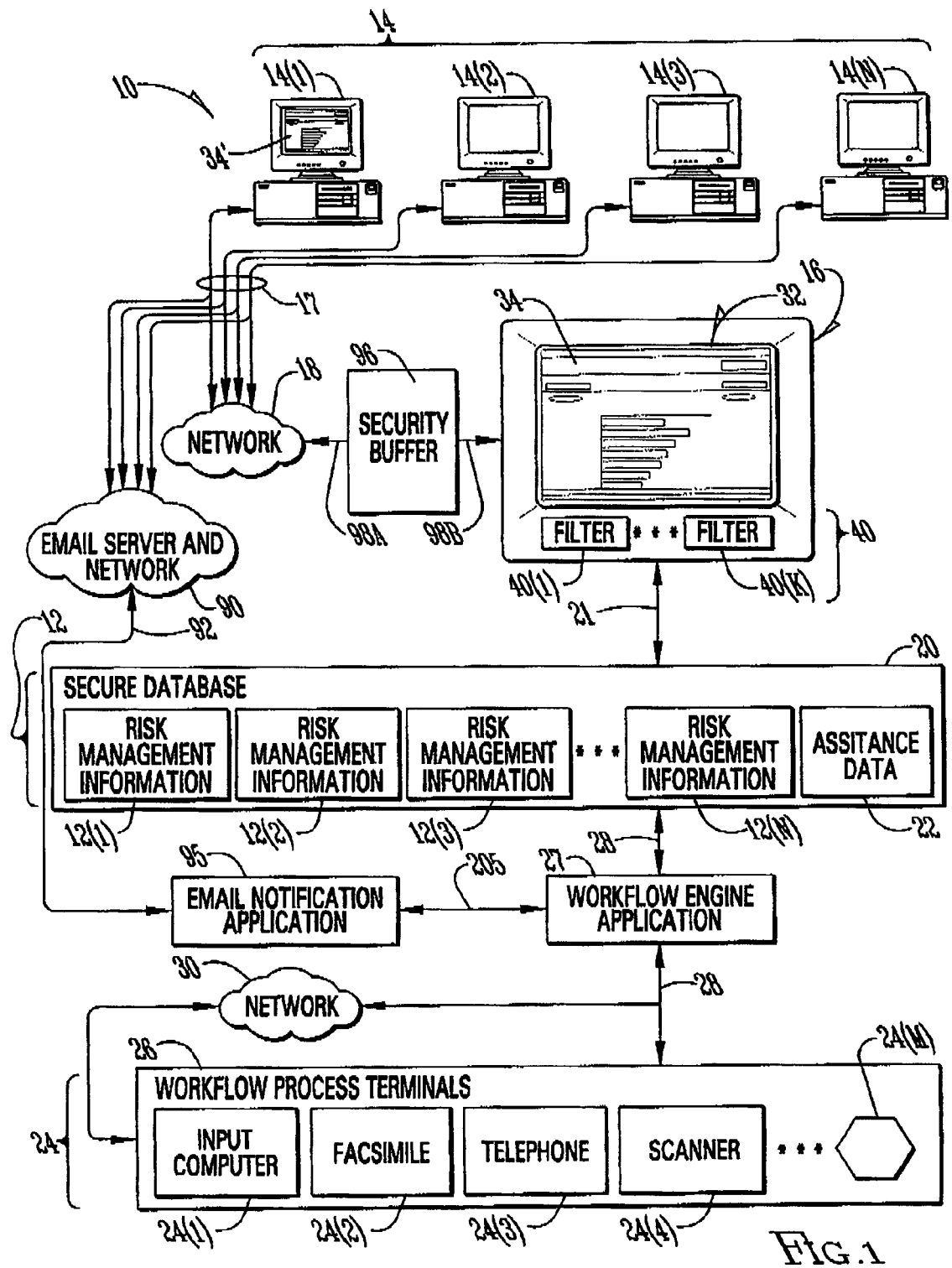
FIG. 1 shows a schematic block diagram of one risk management interface system of the invention.

FIG. 1 shows a risk management system 10. System 10 delivers, archives and manages risk management information 12 from user-authorized segments 12(1), 12(2), 12(3) . . . 12(N) for N users at access computers 14, including computers 14(1), 14(2), 14(3) . . . 14(N), via a seamless graphics interface 16. Computers 14 connect to interface 16 through one or more buses 17 and/or a network 18, such as the Internet. Risk management information 12 is illustratively stored within a secure database 20, connected to graphics interface 16 by a bus 21. Computers 14 access information 12 only with appropriate access authorization, and typically that authorization provides access to only a portion of information 12 within database 20; FIG. 1 thus shows information 12 as a plurality of secure segments 12(1), 12(2), 12(3) . . . 12(N) illustrating that a particular segment 12( ) may by accessed by only authorized users at one or more computers 14. By way of example, a user at computer 14(1) may access and manipulate risk management information segment 12(1), a user at computer 14(2) may access and manipulate risk information segment 12(2), and so on; at the same time, system 10 may restrict computer 14(1) from access to risk information segments 12(2), 12(3) . . . 12(N), restrict computer 14(2) from access to risk information segments 12(1), 12(3) . . . (12(N), and so on.

Typically, access to each secure segment 12( ) is restricted to one company that has a proprietary interest in the risk information data associated with that portion of information 12. Companies may however choose to make the information and connection available to other interested parties, outside of the facility owner's company, at their choice and discretion. Examples of the extended access may include other service providers, insurance companies, insurance brokers, vendors, contractors, and the like. As described below, once access is granted between one access computer 14 and an associated segment 12( ), a user may manipulate the data within that segment so as to isolate desired detail, prioritize activities and/or make risk quality assessments. This permissive access may be graded across different levels of access, for example, a user that controls risk management data 12(1) may choose to provide complete access and sharing of the risk management data 12(1) to other users at computers 14(2) and 14(3), or every user 14(N) on the system 10. Alternatively, the user that controls risk management data 12(1) may permit other users to access this information in ways that do not identify any particular user, in order that users of the system may share information to benchmark their respective risk management performance against that of other users.

Those skilled in the art should appreciate that system 10 typically recognizes users at access computers 14, and not the physical computers. That is, system 10 recognizes authorized users who log in at any computer 14 with an appropriate user name and password.

Database 20 may further store assistance data 22 for access by users at computers 14, to facilitate risk assessments in conjunction with review and manipulation of risk management information 12. Data 22 may for example include loss prevention and control standards and guidelines.

Database 20 couples with workflow process terminals 24 illustratively grouped into a workflow process terminals section 26. Section 26 and database 20 serve to aggregate data by collaborative workflow processes to present that data at interface 16, accessible by authorized access at a computer 14. More particularly, a terminal 24 is interactive with database 20 so as to electronically communicate input from the terminal 24 to a designated risk management information segment 12( ). This communication may for example occur through a bus connection 28 and/or network 30, such as the Internet. By way of example, an input computer 24(1) may download comments and/or computer aided design (CAD) drawings relevant for risk management information segment 12(2) of database 20. In another example, a facsimile may be transmitted to a risk management information segment 12(N) via facsimile 24(2). In still another example, telephone or voice comments may be appended to information of a designated segment 12(1) through a telephone 24(3). In yet another example, a CAD drawing may be scanned into database 20 for association with a particular secure segment 12(3) via scanner 24(4). Those skilled in the art should appreciate that other data may be input to database 20 by other electronic means 24(M) as a workflow process terminal, to associate relevant data to an appropriate risk management information segment 12( ), as above.

In one embodiment, system 10 includes a workflow engine application 27 to securely communicate by and between secure database 20 and terminals 26. Workflow engine application 27 archives and incorporates updated information, including a user's view of website information provided by interface 16 and database 20. Accordingly, when a user interacts with system 10 by making a change to certain interface fields, data is updated in database 20 for transmission to remotely located persons (e.g., at terminals 24) who may review the report.

System 10 may thus control and associate inputs from any of terminals 24 to any of risk management information segments 12( ). In one embodiment, system 10 communicates email to an appropriate computer 14 indicating that a terminal 24 has input data to its associated risk management information segment 12( ). By way of example, a company with a proprietary interest in risk management information segment 12(1) may wish to be notified immediately, through one of its employees at a computer 14(3), of updated information to risk management information segment 12(1) by a terminal 24. In such an example, system 10 may send email notification to that employee when terminal 24 updates information of segment 12(1). System 10 may also generate similar email notifications on a periodic basis, e.g., monthly, weekly or daily, to summarize newly posted information within a segment 12( ). In one embodiment, an email notification to a computer 14 includes a hyperlink to information within a segment 12( ); for example, a new document posted to the segment 12( ) may be accessed immediately by interactively clicking the hyperlink via computer 14 receiving the email. Through graphical interface 16, a user may thus self-select or change the e-mail notification period, turn it on or off, or change the frequency of delivery (e.g., daily, weekly, or monthly).

As appropriate, terminals 24 may also receive information from database 20, interface 16 and/or computers 14. In one example, a user at a computer 14 may request retransmission of items of data loaded into a particular risk management information segment 12( ) by email communicated to a person at a terminal 24.

Communications between users at access computers 14 and workflow process terminals 24 may thus occur in near real-time, via graphics interface 16. When data input by a terminal 24 is associated with a particular risk management information segment 12( ), an authorized user at a computer 14 may view the risk management data of that segment 12( ), including the latest data input by a terminal 24, via a graphic display 32. Illustratively, display 32 shows graphic data 34 that may for example be viewable by one computer 14 accessing data within a particular segment 12( ). Graphic data 34 may represent the very latest digital data associated with a particular segment 12( ), including the most recent risk information input by terminals 24. In one embodiment, graphics interface 16 provides a web-based interface generating a local web page graphic 34' for the authorized computer 14, illustratively shown with access computer 14(1). Accordingly, users of system 10, at access computers 14, have up-to-date and hands-on access to sensitive risk management information 12 for their company.

Those skilled in the art should appreciate that graphics interface 16 and database 20 may for example be constructed as a single web server platform to generate secure web graphics 34' as the graphical interface and data communications portal between computers 14 and risk management information 12. In one embodiment, database 20 is a SQL (structured query language) database server known in the art.

System 10 also provides for storing critical documents within risk management information segments 12( ), for access by authorized computers 14. By way of example, a company with unique access to proprietary risk management information segment 12(1) may access that data through computer 14(1); that company may also download and store company critical documents to segment 12(1), such as loss prevention survey results, risk summaries, CAD diagrams, and more. A download to segment 12( ) may occur through a computer 14 or via an appropriate terminal 24. Once again, database 20 is "secure" so that only a company with authorized access, at a computer 14 or terminal 24, may view graphic data 34 and manipulate risk management information of its associated risk management information segment 12( ). Typically, access to a particular segment 12( ) is protected through encryption techniques, such as 128-bit SSL encryption, to ensure "eyes only" access to appropriate company proprietary information 12 within database 20.

In one embodiment, workflow engine application 27 includes software for converting CAD diagrams to a graphic image that may be saved within a segment 12( ) of database 20.

Display of graphic data 34 may also be manipulated by a user, with authorized access, at a computer 14. Graphic data 34 may be structured or viewed in a way selected by the user at computer 14. Graphic data 34 may for example be manipulated into a variety of risk management information reports selectable through graphics interface 16, via a computer 14, including benchmarking, outstanding recommendation summaries, and management program evaluations. System 10 is programmed with data storage and reporting logic that facilitate a wide range of risk management activities. Recommendations may be automated based upon expert-defined rules, or users of system 10 may access an integrated database to make their own decisions and recommendations. An especially useful and optional feature of the program logic in system 10 is the ability to compare one user's statistics against those of another user. Representative reports that may be generated by system 10 through interaction with interface 16 may for example include, topically:

Account Review-MFL vs. Risk Quality Ratings
Account Review-Natural Catastrophe
Account Review-Recommendation Status & Intent
Account Review-Risk Quality Categories
Account Review-Risk Quality Ratings
Fire protection
Recommendation/Risk Cost Benefit Analysis (RCBA) summary Loss prevention survey report delivery
Loss prevention survey report schedule
Risk quality benchmarking
Risk quality rating
Management programs
Building construction
Catastrophe
Active recommendations by Type
Recommendation Completion status
Fire Loss Estimates (Maximum Foreseeable)
Fire Loss Estimates (Normal)
Fire Loss Estimates (Probable Maximum)
Hazard Benchmark
Hazard Quadrant Analysis
Hazard Summary
Location Summary
Loss Estimates Summary Interface 16 is responsive to inputs at computers 14 to generate the reports or desired graphic data 34 derived from the appropriate risk management information segment 12( ). Interface 16 further responds to user inputs at computers 14 to generate tables and graphs to compare a company's facilities to outstanding recommendations associated with risk management information 12.

In one embodiment, users may interactively filter data from their respective risk management information segments 12( ) by selecting one or more risk management filters 40 of graphics interface 16. FIG. 1 illustratively shows an array of filters 40(1) . . . 40(K). Filters 40 manipulate data of risk management information 12 for display to users at computers 14; for example one filter 40(1) may be used to generate graphic 34 at computer 14(1). A user of system 10 may save configurations of filters 40 so that, for example, only that user can view and utilize the saved filter; or so that a filter 40 may be seen and utilized by anyone with access to a particular information segment 12( ). Moreover, a user may define a filter 40 and save the filter with his associated risk management information segment 12( ) so as to later use the filter in other sessions. Representative filters 40 for use in system 10 may for example exhibit the following non-limiting properties:

- Filters 40 are preferentially available to the most active data fields
- Filters 40 may operate on multiple data fields
- Filters 40 support date ranges and user specified field values
- Filters 40 utilize criteria carried forward to multiple reports
- Filters 40 are accessible at all times
- Filters 40 may be changed at any time
- Filters 40 operate to de-clutter reports with inactive data fields
- Filters may be saved or deleted
- All filters 40 may be applied concurrently or individually
- Filters may be common (shared and viewable by all) or personal (unique to a specific user).

Figure 2:
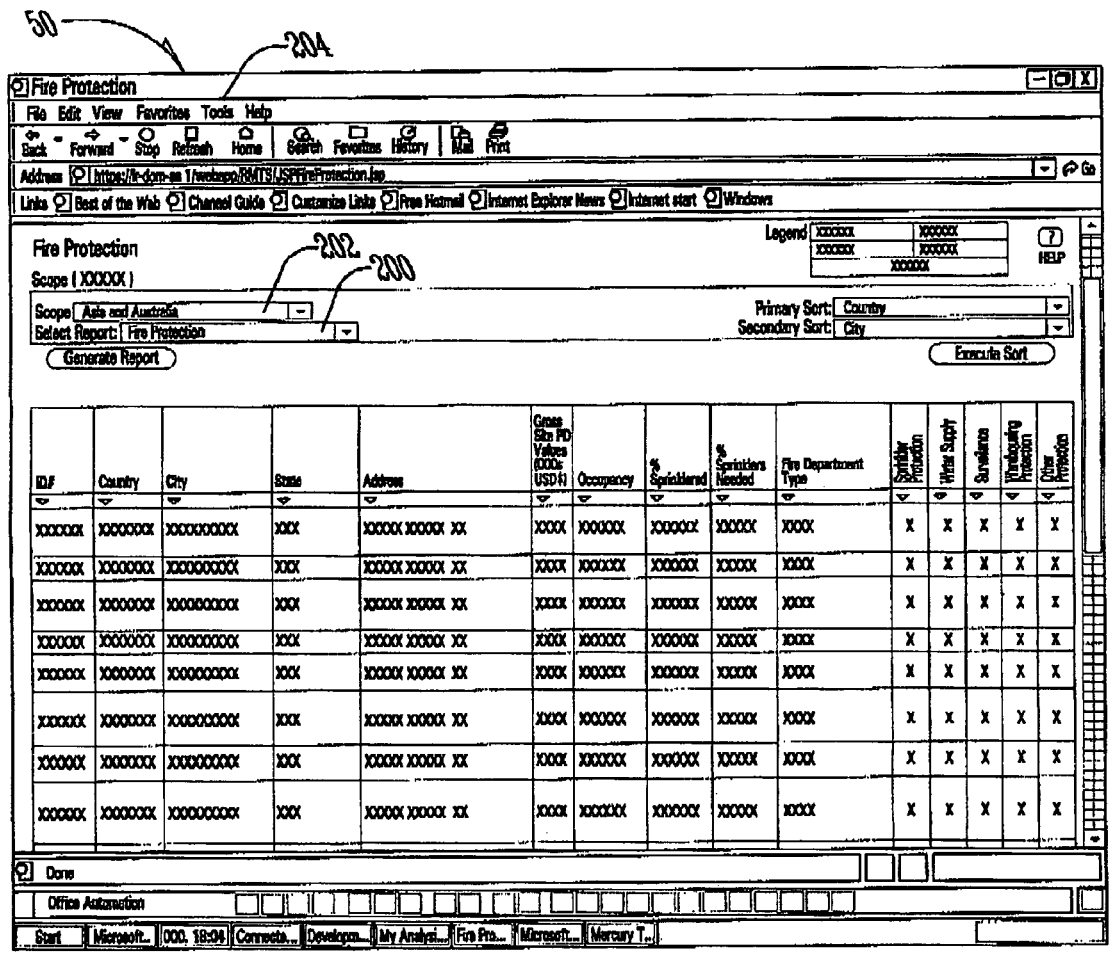
Figures 3, 4:
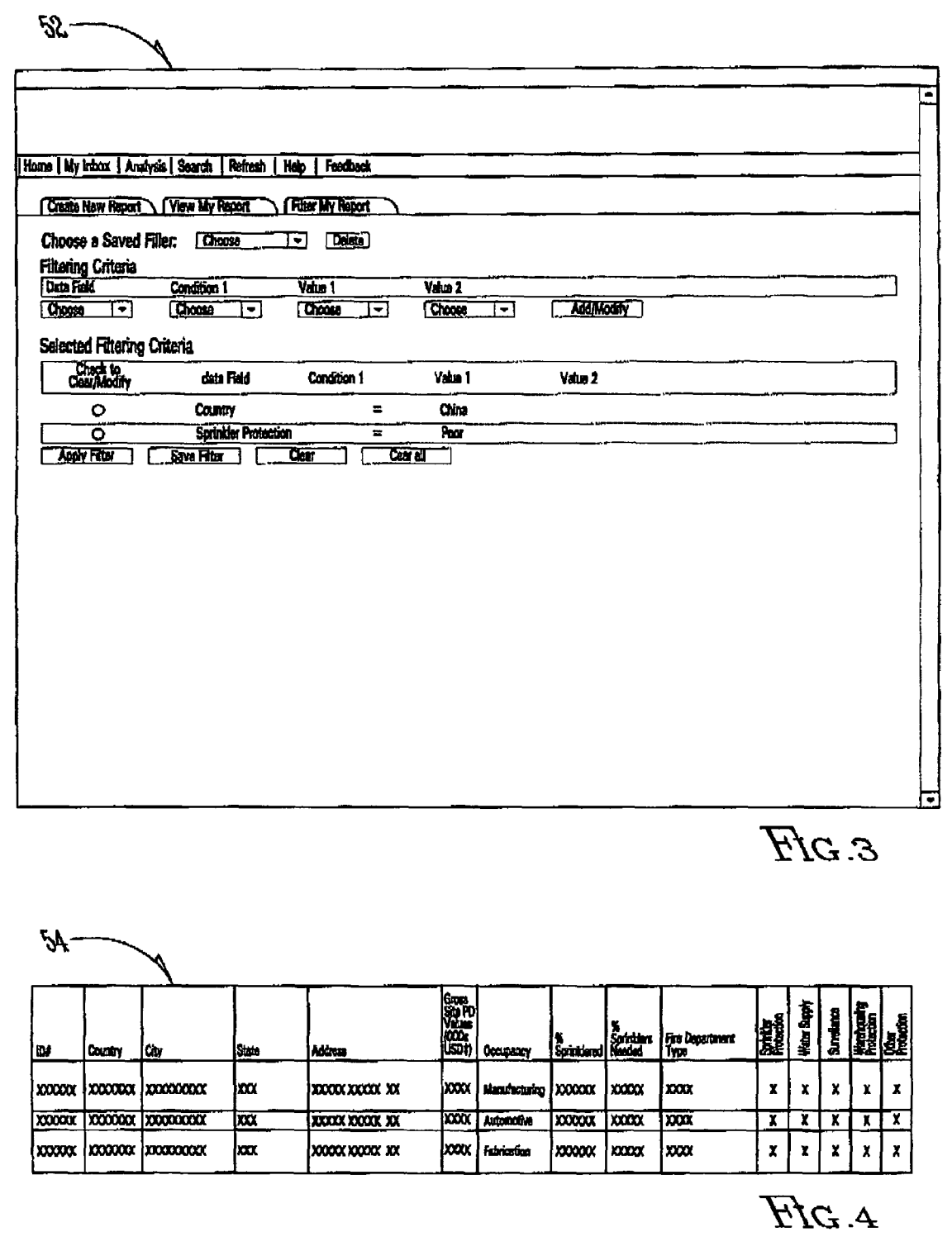

By way of a first example, FIG. 2 shows one representative data graphic 50 generated by and for a user at computer 14(1) and utilizing data from risk management information segment 12(2) through interaction with graphics interface 16 (shown in FIG. 1). Graphic 50 shows a selected fire protection report obtained by selecting a predetermined "Fire Protection" report option from reporting field 200 in combination with a predetermined filter option 202 providing a report scope limited to a geographic region including "Asia and Australia." Filter options like the "Asia and Australia" filter option 202 may be created and saved using the Tools bar 204, generally, to create and/or store filter 40 interactively in a manner that produces different reporting results in graphic 50. For example, FIG. 3 shows one interactive filter 52 available to computer 14(1) that limits the geographic region to other countries (e.g., China) and also locates "poor" sprinkler protection ratings. Once selected, the graphic data 34' available to the user may be a report 54, such as illustrated in FIG. 4.

The system of one embodiment provides for a variety of filtering options. By way of example, the following Table 1 is a non-limiting list of filters, and potential field values, based upon current data fields in use, that may be applied to certain reports generated with the system of FIG. 1:

TABLE 1

| Current Data Fields Filtering Risk Management Information 12 | Interactive Display Fields at Graphics Interface 16 and/or Computer 14 |
| --- | --- |
| Country | Text Box enabling multiple entry of values separated by a delimiter |
| City | |
| State | |
| Location Identifier | |
| Property values | Number field |
| Total location in square feet | |
| Noncombustible construction, % overall | |
| Noncombustible walls and roof deck with combustible roof covering, % overall | |
| Combustible roof and/or walls, % overall | |
| % with sprinklers | |
| % needing sprinklers | |
| Survey report delivery time | |
| Estimated annual risk avoidance | |
| Cost to complete | |
| Last survey date | Selection via a popup window showing a calendar with month/day/year |
| Next survey year/month due | |
| ATC earthquake zone | Selectable list options: Excellent, Good, Fair, Poor and not-evaluated, enabling selection of multiple options |
| Sprinkler protection | |
| Water supply | |
| Surveillance | |
| Warehousing protection | |
| Other protection | |
| Management programs | |
| Impairments | |
| Smoking regulations | |
| Maintenance | |
| Employee training | |
| New construction | |
| Insurance | |
| Pre-emergency planning | |
| Private fire brigade | |
| Hazardous materials | |
| Hot work | |
| Loss prevention inspection | |
| Surveillance | |
| Fire protection inspection | |
| Hazard evaluation | |
| Housekeeping | |
| Outside contractors | |
| FEMA flood zones | Selectable list with 5 options: A, B, C, A&B, NE, enabling selection of any one |
| Windstorm | Selectable list with 5 options: L, M, H, H&M, NE, enabling selection of any one |
| Fire department type | Selectable list with 3 options: Public/Full Time Volunteer None enabling selection of any one |
| Survey frequency | Selectable list with options: 6, 12, 18, 24, 36, 0 (months) |
| Priority | Selectable list |
| Status | Selectable list with options: active, done/verified complete, abeyance under evaluation, delayed/on-hold, in-progress, and complete |

TABLE 1-continued

| Current Data Fields Filtering Risk Management Information 12 | Interactive Display Fields at Graphics Interface 16 and/or Computer 14 |
|---|---|
| Type | Selectable list options:<br>Workplace safety<br>Automatic sprinklers - supplement, improve, reinforce<br>Special hazard protection<br>Boiler machinery<br>Automatic sprinklers - install<br>Surveillance<br>Water supply/manual suppression<br>Construction/Exposure protection<br>Management direction - implement, reinforce, supplement |
| Rec. ID # | Selectable list containing year of recommendations |
| Customer Target Completion Date | Selection via a popup window showing a calendar with month/day/year |
| Customer intent to complete | Selectable list with options:<br>To Do (>3 years)<br>To Do (<1 year)<br>To Do (<=3 years)<br>Considering<br>No Plans |
| Predominant construction | Selectable list with options:<br>Noncombustible - high fire resistance<br>Noncombustible - moderate fire Resistance<br>Combustible?<br>Not Evaluated |

In one embodiment, system 10 of FIG. 1 provides for interactive recommendations. Users at computers 14 and/or terminal 24 may comment upon recommendations produced as a result of risk evaluations posted within a risk management information segment 12( ). Additionally, users at computers 14 may set target dates, adjust status, and identify intent so as to better track the recommendation's actual progress towards completion. In another embodiment, system 10 is programmed to respond to new comments by sending an email to designated persons on the Internet who may have the need or desire to review the new comments; such persons access the risk management information 12, and comments, through a computer (e.g., a computer 14 and/or terminal 24(1)) with appropriate access authorizations. By way of example, these persons typically fall into the following categories: they are identified specifically by the commenting user at the time a comment is issued; they are identified by a user's manager as being responsible for the completion of the recommendation; or they represent all users who have access to view the recommendation.

FIGS. 5A, 5B, 5C, 5D, 5E, 5F, 5G, 5H, 5I, 5J, FIGS. 6-24, FIG. 27, FIGS. 30-31, and FIG. 34 collectively illustrate a flow chart linking data fields or elements, graphic display screens and system components suitable for use and operation with system 10 of FIG. 1. The logic may be implemented by computer program instructions in the form of software. System-enabled linkages between reports logically connect at entrance, exit and transfer points within the flow chart of these figures to facilitate decision-making processes by rapid access to reporting data. Specifically, FIGS. 5A, 5B, 5C, 5D, 5E, 5F, 5G, 5H, 5I and 5J show data tables 500A through 500J used within the flow chart of FIGS. 6-24, FIG. 27, FIGS. 30-31 and FIG. 34. The data tables 500A through 500J may be used as data structures for database 20, and they may be also used to define various reports in context with the discussion below. Collectively, data tables 500A through 500J also define a data input and editing structure that may be referred to below as a Workflow Application, to add, delete, and review raw data that is used in system 10.

Figure 5A:
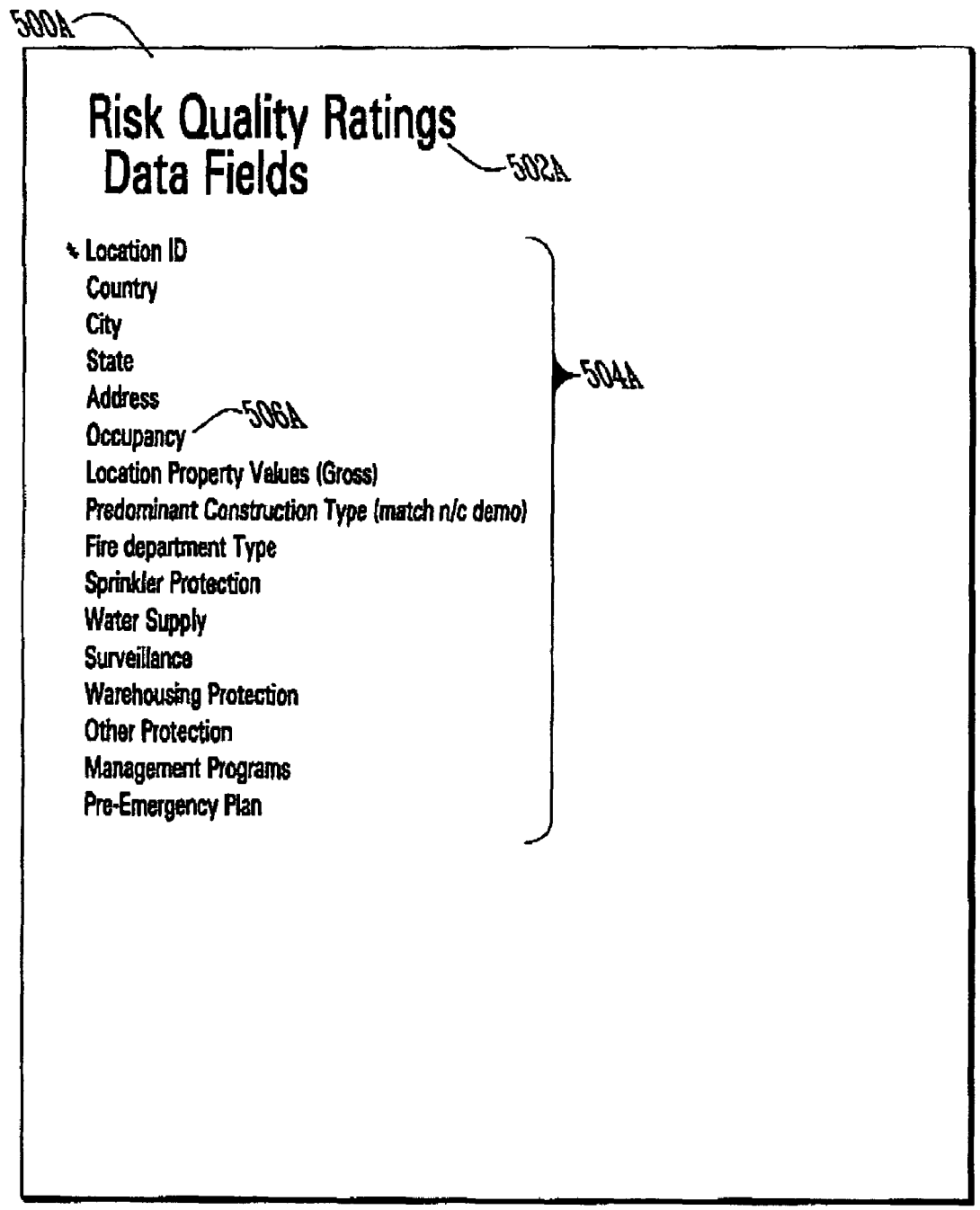

Each of FIGS. 5A-5J, as exemplified by FIG. 5A, contains a data table name 502A, e.g., "Risk Quality Ratings Data Fields," followed by a collection of data elements 504A that are relevant to the topical issue of the data table name. For example, an "Occupancy" field 506A is relevant to fire risk quality. Key fields indicated by an asterisk (*) may be used to link the data tables 500A through 500H to provide combined reporting for accelerated relational database purposes, or non-key linkages may be established for other fields shared between the data tables 500A through 500J. As shown in data tables 500A through 500J, the *Location ID # field is intended be a numeric identifier that identifies a unique combination of city, state and address to define a site where loss may occur. In rural areas, the city may be replaced by a postal mailing address component, such as a rural route (RR).

FIGS. 6-24, FIG. 27, FIGS. 30-31, and FIG. 34 illustrate how the data tables of FIGS. 5A-5J are used to obtain lower-level interactive information. These figures are thus denoted as "drill-down" specifications because interaction through respective elements provides the enhanced detailed information for each column heading of a report from tables 5A-5J. By way of example, a user with appropriate authorizations at a computer 14 may interact with the drill-down specifications of FIGS. 6-24, FIG. 27, FIGS. 30-31 and FIG. 34 to graphically generate display of desired risk management information associated with a particular segment 12( ). In the context of FIGS. 5A-5J, FIG. 27, FIGS. 30-31 and FIG. 34, therefore, system 10 for example provides a workflow application and messaging platform for document hosting and email notification, data manipulation and decision support analysis.

Data table 500A, FIG. 5A, is specifically used within FIGS. 6-9 for reporting risk quality benchmarking and risk quality ratings. The drill-down specifications within FIGS. 6-9 start at initiation points 600A, 600B, and 600C. The "onclick" annotation indicates user selection may be achieved through computer button clicks or menu selections relative to graphical user interfaces (e.g., at a computer 14, FIG. 1). Each report 54 provides singular or multiple lower-level drill-down options, as shown. Control transfer, terminal and new data query points 56 provide the as-shown capability.

Initiation point 600A may be accessed, for example, from graphic 50 shown in FIG. 2 by accessing the pull-down "Tools" bar 204 to select a "Risk Quality Benchmarking" option (not shown). Initiation points 600B and 600C may be accessed as different combinations of predetermined options from reporting field 200 and predetermined filter option field 202 shown in FIG. 2. Processing step 602 determines whether the active account has multiple divisions, for example, geographic operating divisions. If not, system 10 produces a risk quality benchmark report 604 for all locations to which the user has access. Processing to produce the risk quality benchmark entails calculation of a comparative metric for various locations according to expert-defined rules. The metric may also be sorted for comparative purposes, for example, as our locations versus those of others. The report 604 may be presented, for example, as a bar graph or as tabular data.

The report 604 includes a "Location ID" bar that may be user-onclick selected 606 for further processing on path B. If in processing step 602, the account is determined to have division, system 10 produces a Risk Quality Benchmarking All Divisions Graph" 608. Elements of the graph 608 may be user selected to trigger additional processing, for example, by onclick selection of Division name in the graph axis 610, for return to workflow, by opening the division file cabinet 612. Onclick selection 614 of a Division bar within the graph 608 produces a Risk Quality Benchmarking Division Graph 616 that leads to additional processing on path A. Onclick selection 618 of an "Average All Locations" bar within graph 608 provides further processing on path B. Initiation point 600C produces graph 616 and further processing on path A.

Figure 7:
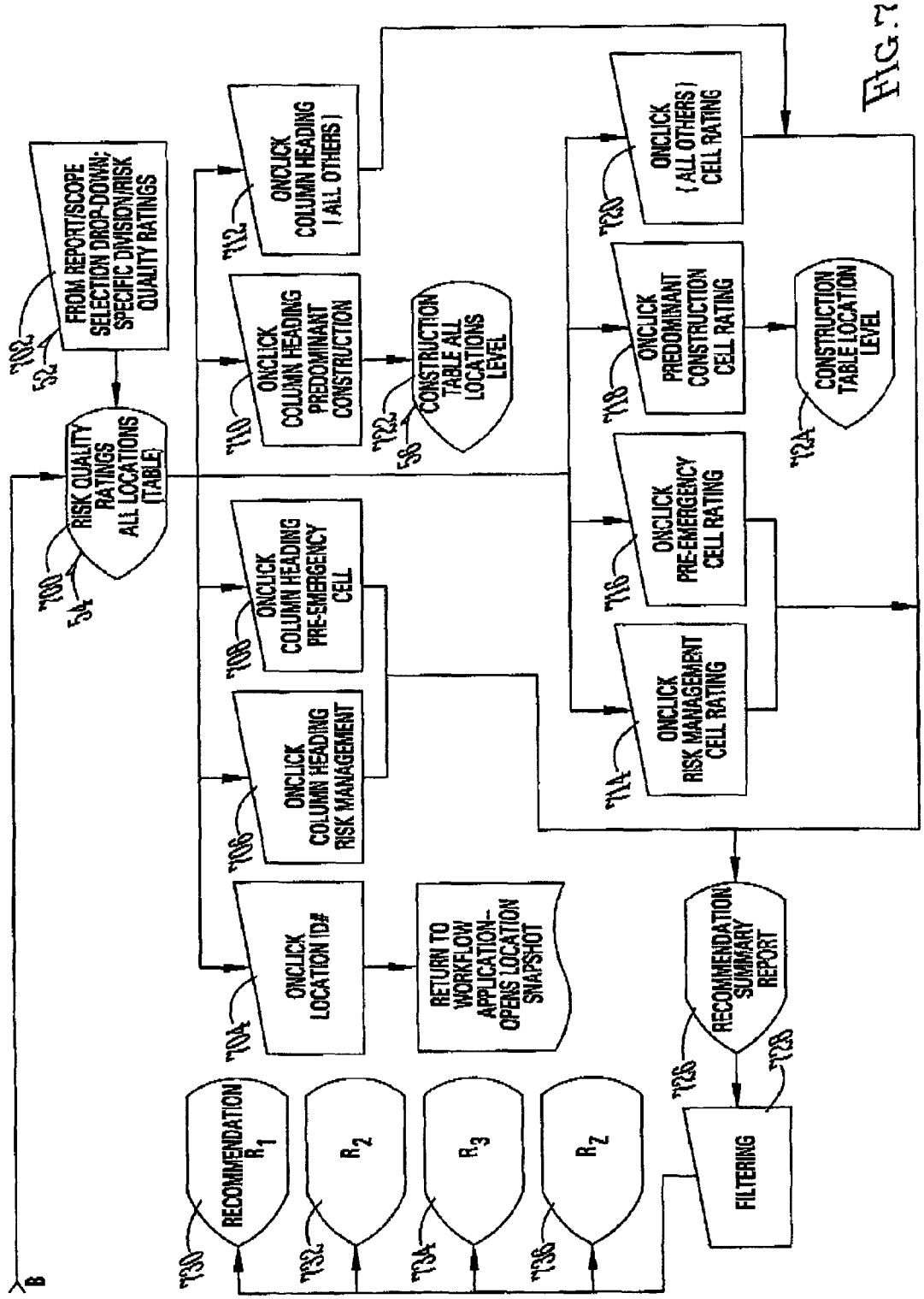

FIG. 7 shows processing downstream of FIG. 6 on path B. System 10 produces report 700 including a risk quality rating for all locations. System 10 generates a risk quality rating report 700 for all locations, e.g., in tabular format. The risk quality rating report contains information selected by experts as being particularly relevant to perceived risks and risk management. By way of example, the risk quality rating report may contain columnar headings for the data fields shown in data table 500A. Alternatively, system 10 may be instructed to produce the report 700 by user selection 702 of predetermined report/scope options 200/202 shown in FIG. 2. Onclick selections 704, 7056, 708, 710, 712, 714, 716, 718 and 720 provide further processing, as shown in FIG. 7, that drill-down into additional detail for columnar headings from report 700 Onclick selections 710 and 718 provide linkages to construction reports 722 (All Locations) and 724 (One Location), which operate on data from data table 500D. Onclick selection 704 provides additional detail about the location, for example, all data shown in Table 1. The remaining onclick selections 706, 708, 712, 714, 716, and 720 cause system 10 to produce a recommendation summary report 726 that is pre-filtered to produce risk management recommendations related to all locations and the columnar heading of the selected one of onclick selections 706, 708, 712, 714, 716, and 720. User-selected filtering options 728 are optionally applied to obtain drill-down functionality that includes detailed reports 730, 732, 734, 736 for each of a "Z" number of recommendations on the recommendation summary report 726.

Figure 8:
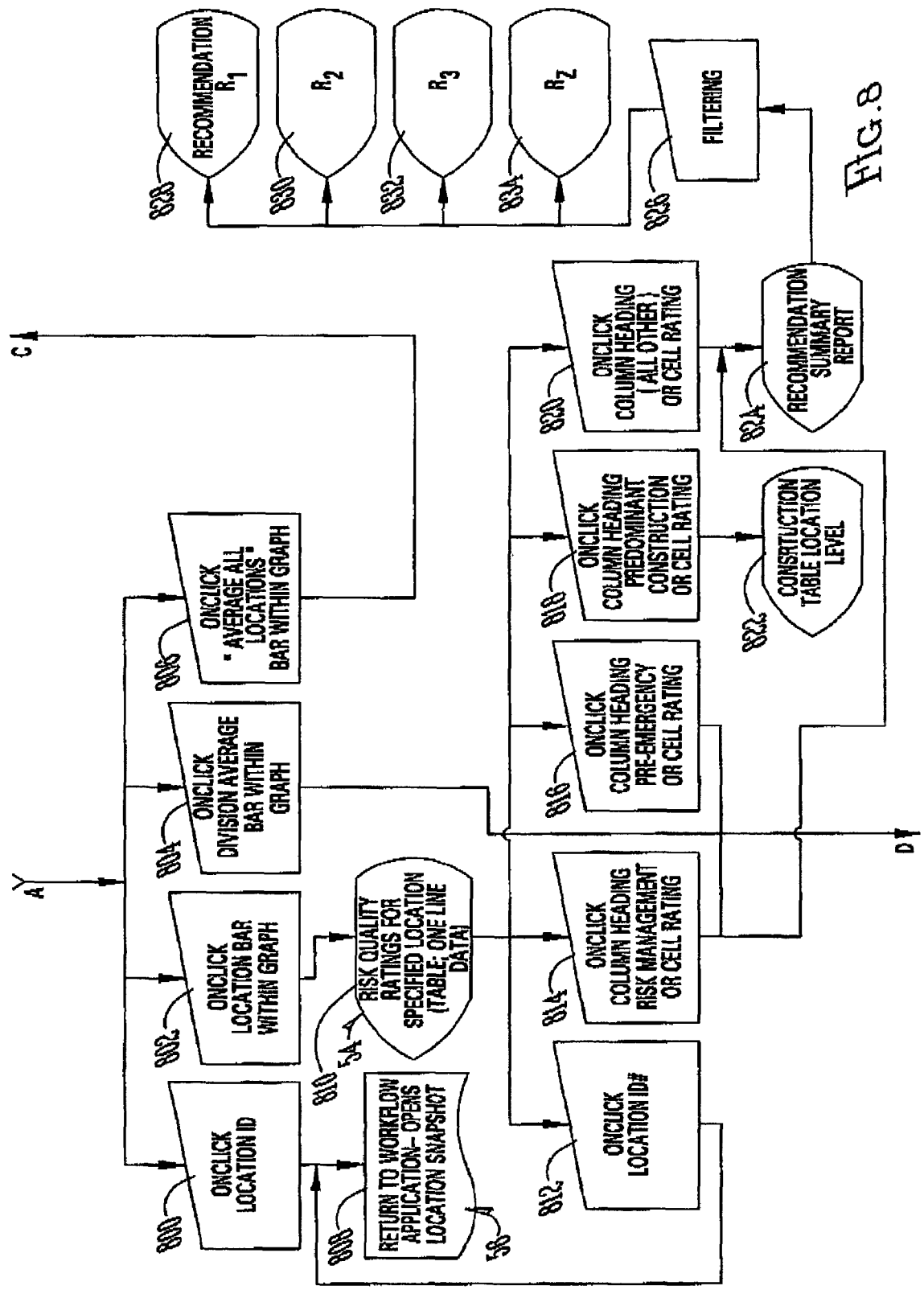

FIG. 8 shows processing downstream of FIG. 6 on path A. As before, onclick selections 800, 802, 804 and 806 of fields from graph 616 provide drill-down functionality pertaining to those fields. Onclick selection 800 of Location ID returns 808 the user to the workflow processing for manual input of data by opening the location snapshot. Onclick selections 804 and 806 lead to respective processing on paths D and C. Path C continues on path C of FIG. 6. Onclick selection 802 produces a location-specific risk quality rating report 810. Columnar headings of report 810, i.e., the data fields of data table 500A, may be onclick selected as selections 812, 814, 816, 818, 820. Onclick selection 812 of Location ID# returns 808 the user to workflow processing. Onclick selection 818 of "Predominant Construction of Cell Rating" produces a construction table report 822 linked to data from the data table 500D shown in FIG. 5D at the location level. The remaining onclick selections 814, 816, and 820 cause system 10 to produce a recommendation summary report 824 that is pre-filtered to produce risk management recommendations related to the division and the columnar heading of the selected one of onclick selections 814, 816, and 820. User-selected filtering options 826 are optionally applied to obtain drill-down functionality that includes detailed reports 828, 830, 832, 834 for each of "Z" recommendations on the recommendation summary report 824.

Figure 9:
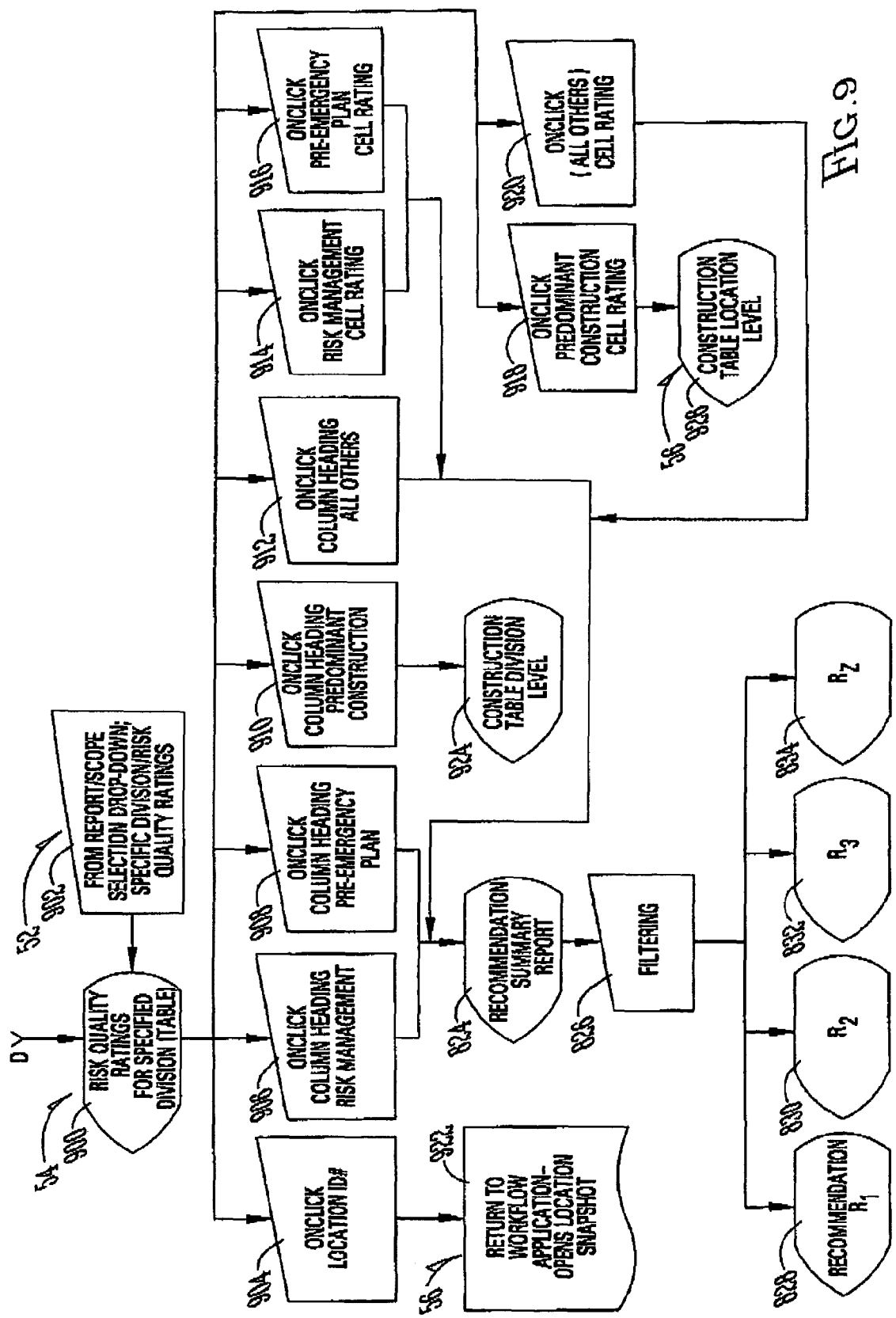

FIG. 9 shows processing on path D downstream of FIG. 8. System 10 produces a tabular risk quality ratings report 900 for a specified division. Alternatively, system 10 may be instructed to produce the report 900 by user selection 902 of predetermined report/scope options 200/202 shown in FIG. 2. Onclick selections 904, 906, 908, 910, 912, 914, 916, 918 and 920 provide drill-down access to additional reporting detail. For example, Onclick selection 904 of Location ID# returns 922 the user to the Workflow Application for manual input of data by opening the location snapshot. Onclick selection 910 of "Predominant Construction of Cell Rating" produces a construction table report 924 linked to data from the data table 500D shown in FIG. 5D at the division level. Onclick selection 918 of "Predominant Construction of Cell Rating" produces a construction table report 926 linked to data from the data table 500D shown in FIG. 5D at the location level. The remaining onclick selection options 906, 910, 912, 914, 916 and 920 invoke the recommendation summary report 824 together with downstream processing 826-834 described in context of FIG. 8.

System 10 processes data elements from data table 500A to produce the risk quality benchmark reports and graphs 604, 608, 616, 700, 710, 724, 726, 730, 732, 734, 736, 810, 822, 900, 924, and 926. Data I/O and processing algorithms for this purpose may be designed by those skilled in the art of risk quality benchmarking.

Figure 5B:
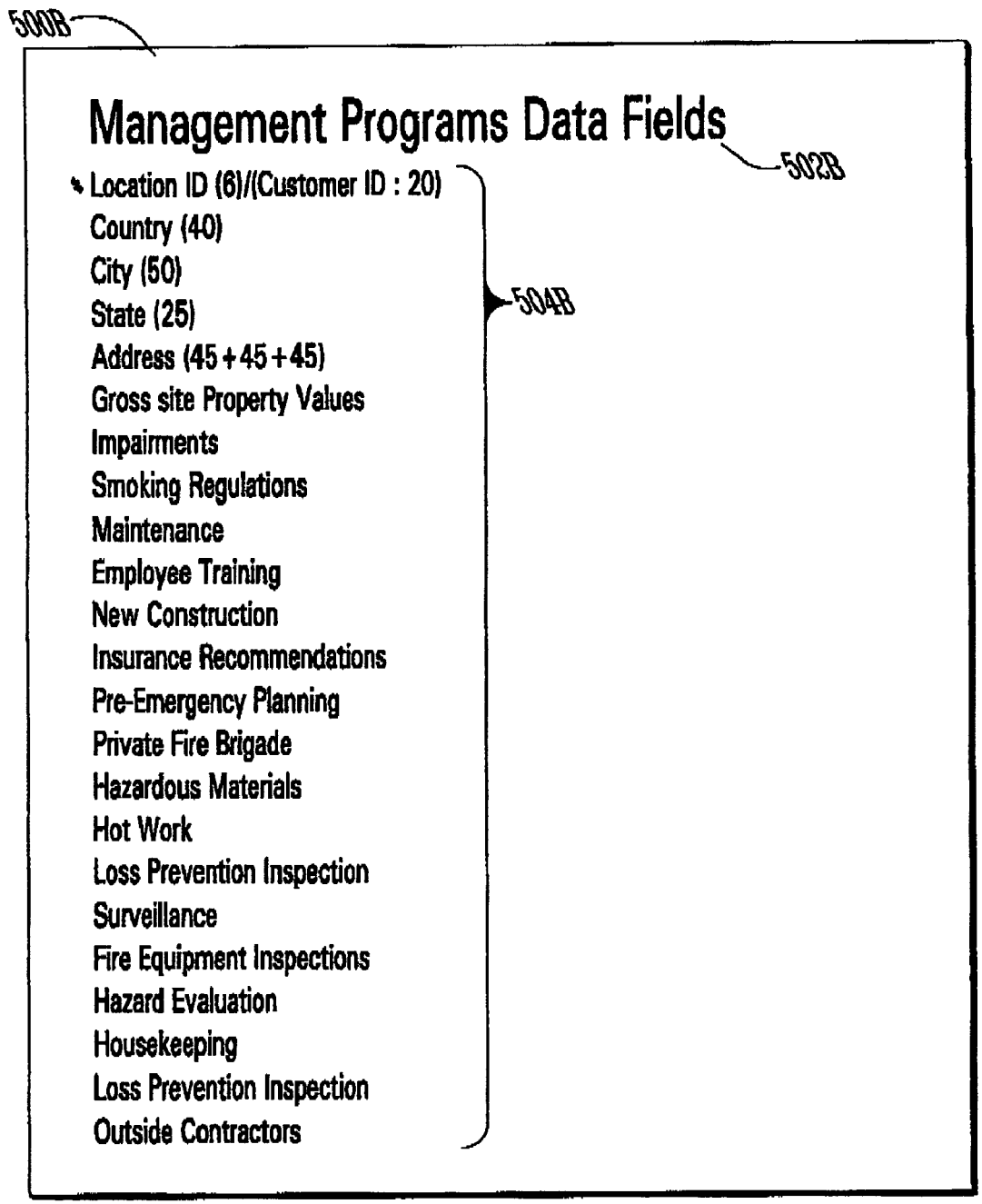
Figure 10:
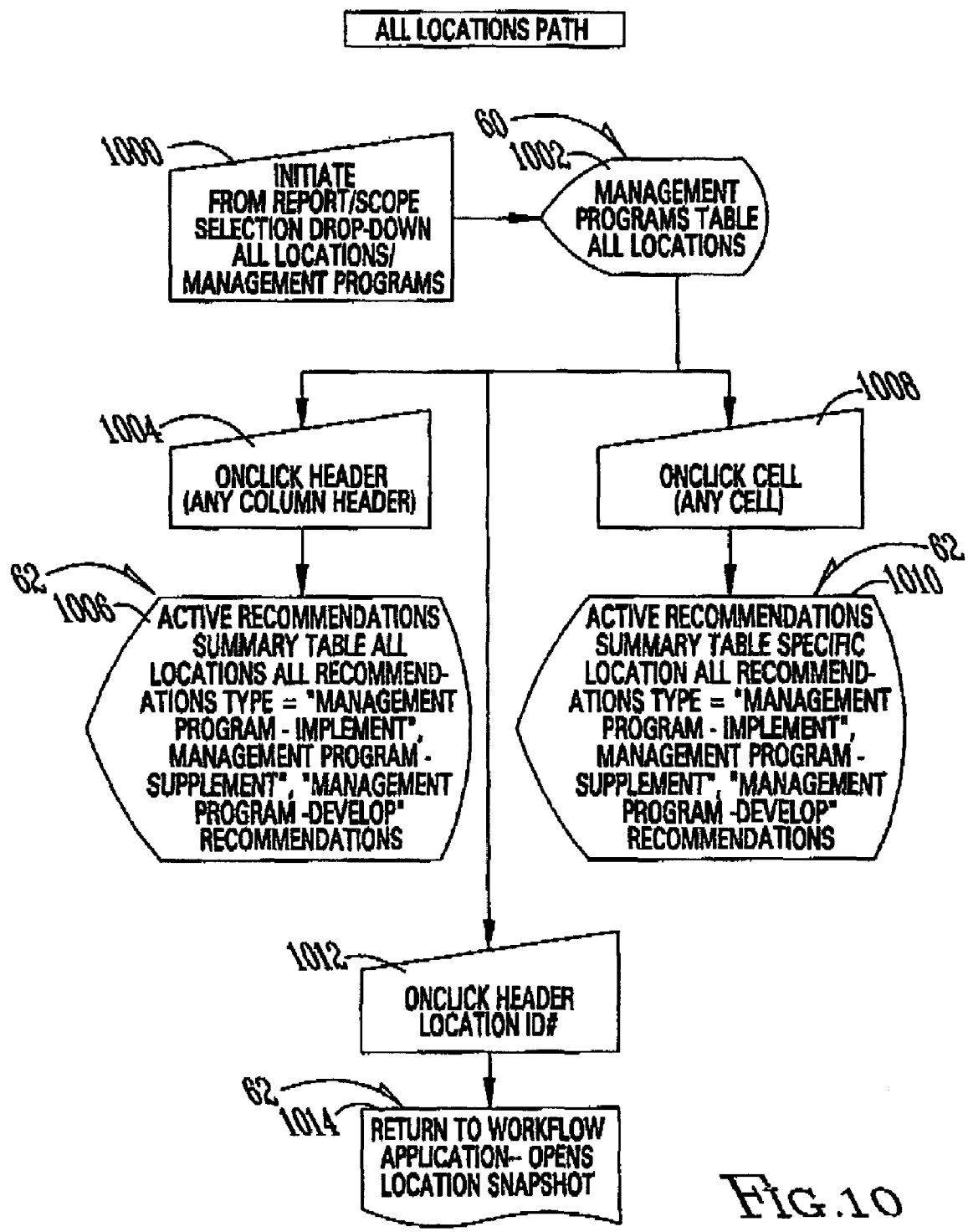
Figure 11:
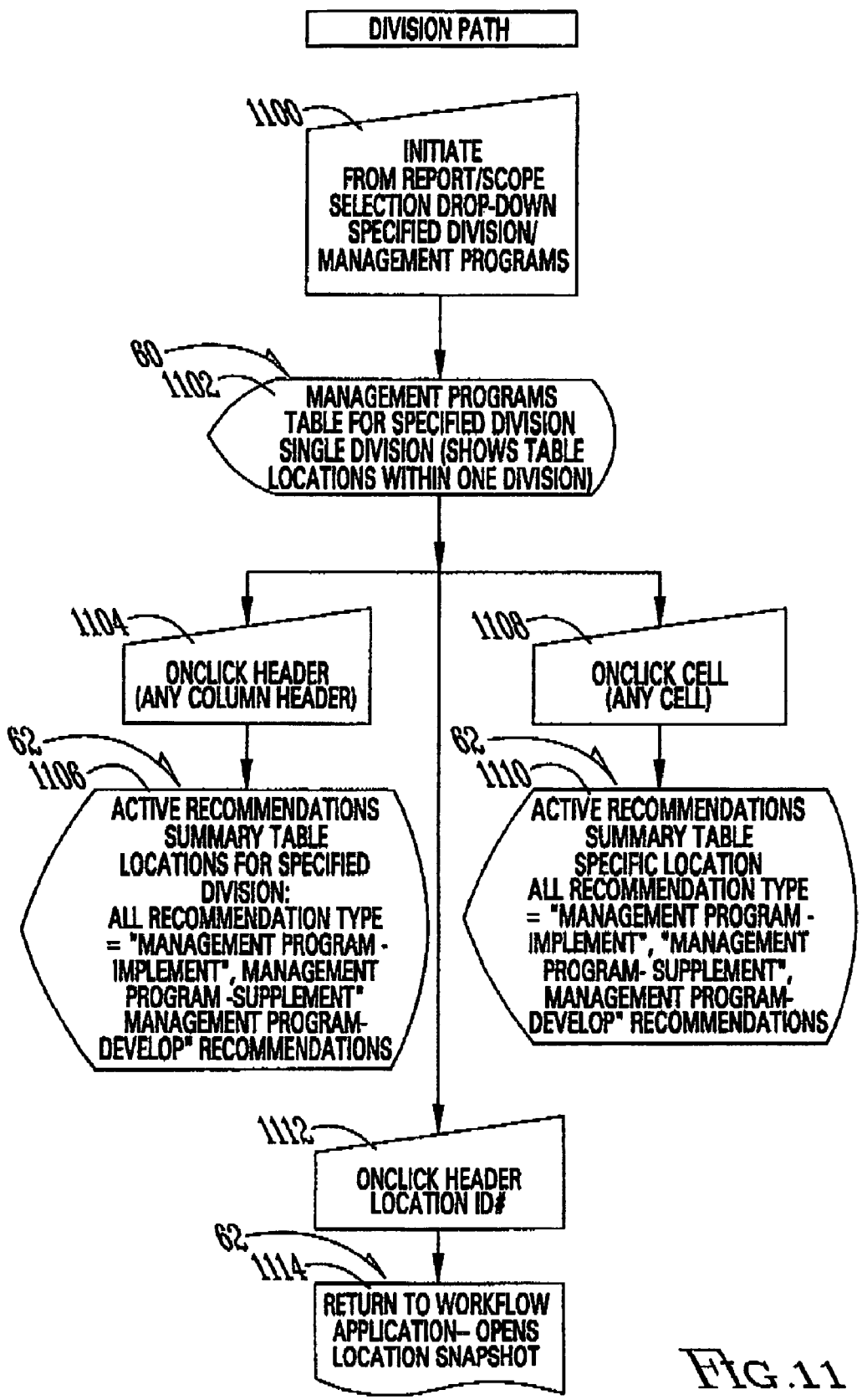
Figure 12:
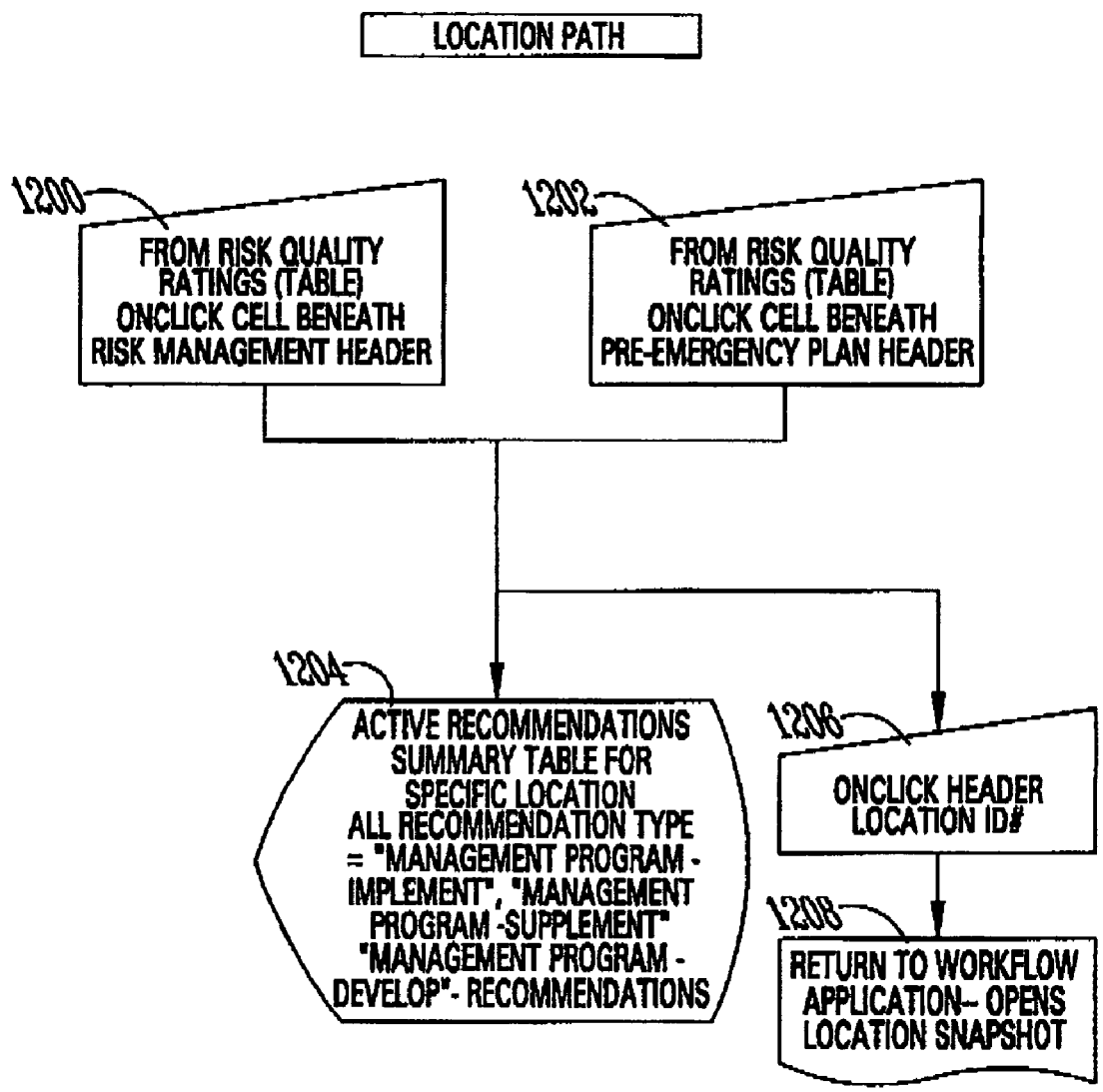

Data table 500B, FIG. 5B, is specifically used within FIGS. 10-12 for reporting management purposes. Each decision point 60 provides singular or multiple lower-level drill-down options, as shown. Control transfer, terminal and new data query points 62 provide the as-shown capability. FIGS. 10-12 are annotated with three separate paths—all locations, division, and one location—to segregate corporate structures to the relevant information. By way of illustration, if a user clicks on the header "management programs," he receives a drill-down graphic view of management programs. If the user then clicks on the location with a poor rating for management, then he may receive a drill-down view of the recommendation and/or deficiencies that are causing a negative rating.

FIG. 10 illustrates an "All Locations" reporting pathway, which is initiated 1000, for example, as a combination of predetermined report/scope options 200/202 shown in FIG. 2. Initiation 1000 produces a Management Programs Table report 1002 combining, for example, data for all locations in any account to which the user has access. The report 1002 includes a plurality of cells that are formed as the intersection of rows and columns (not shown) including, for example, column headings shown as data fields in data table 500B. Onclick selection 1004 of any column header on the report 1002 produces 1006 an Active Recommendations Summary Table including data for all locations, with such recommendations as those that should be implemented as recommendations for a new risk management program, those that supplement an existing risk management program, and those useful in developing a risk management program. Onclick selection 1008 of any cell produces report 1010, an Active Recommendations Summary Table including, for example, column headings as shown in data table 5E. Report 1010 is filtered for a specific location, with such recommendations as those that should be implemented as recommendations for a new risk management program, those that supplement an existing risk management program, and those useful in developing a risk management program. Onclick selection 1012 of the Location ID# returns 1014 the user to the workflow processing for manual input of data by opening the location snapshot.

FIG. 11 illustrates a "Division" reporting pathway, which is initiated 1100, for example, as a combination of predetermined report/scope options 200/202 shown in FIG. 2. Initiation 1100 produces a Management Programs Table report 1102 combining, for example, data for a specific division of the user's account. The report 1102 includes a plurality of cells that are formed as the intersection of rows and columns (not shown). Onclick selection 1104 of any column header on the report 1102 produces 1106 an Active Recommendations Summary Table including data (see FIG. 5E) for the division, with such recommendations as those that should be implemented as recommendations for a new risk management program, those that supplement an existing risk management program, and those are useful in developing a risk management program. Onclick selection 1108 of any cell produces 1110 an Active Recommendations Summary Table including data for a specific location, with such recommendations as those that should be implemented as recommendations for a new risk management program, those that supplement an existing risk management program, and recommendations that are useful in developing a risk management program. Onclick selection 1112 of the Location ID# returns 1114 the user to the workflow processing for manual input of data by opening the location snapshot.

FIG. 12 illustrates a "Location" reporting pathway, which is initiated 1200, 1202, for example, by onclick selection of table cells from report 700 (shown in FIG. 7) including any cell for a particular location beneath the "Risk Management" or "Pre-Emergency Plan" headers. Initiation 1200, 1202 produces an Active Recommendations Summary Table 1204 including data for the location, with such recommendations as those that should be implemented as recommendations for a new risk management program, those that supplement an existing risk management program, and those are useful in developing a risk management program. Onclick selection 1206 of the Location ID# returns 1208 the user to the workflow processing for manual input of data by opening the location snapshot.

Figure 5C:
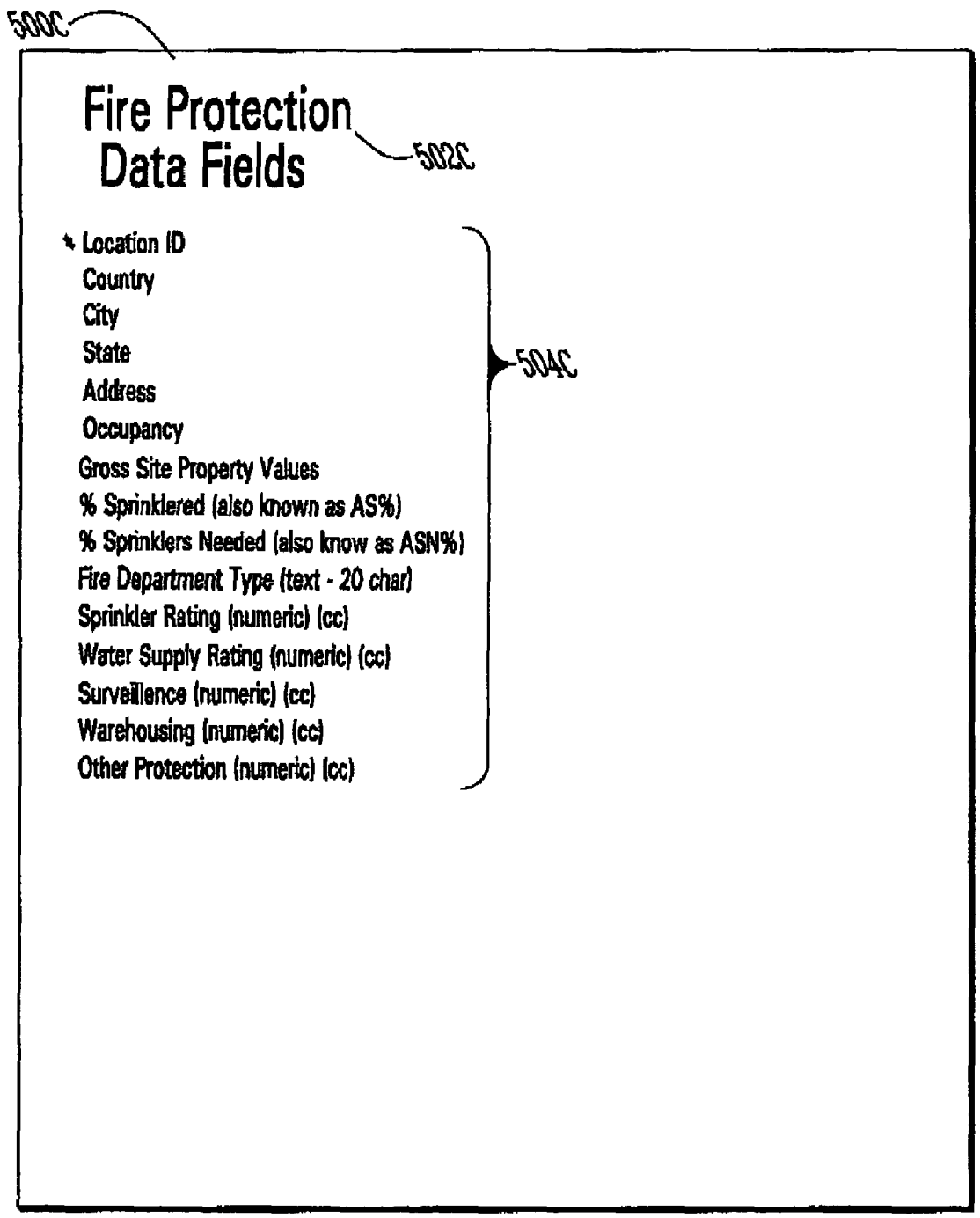
Figure 13:
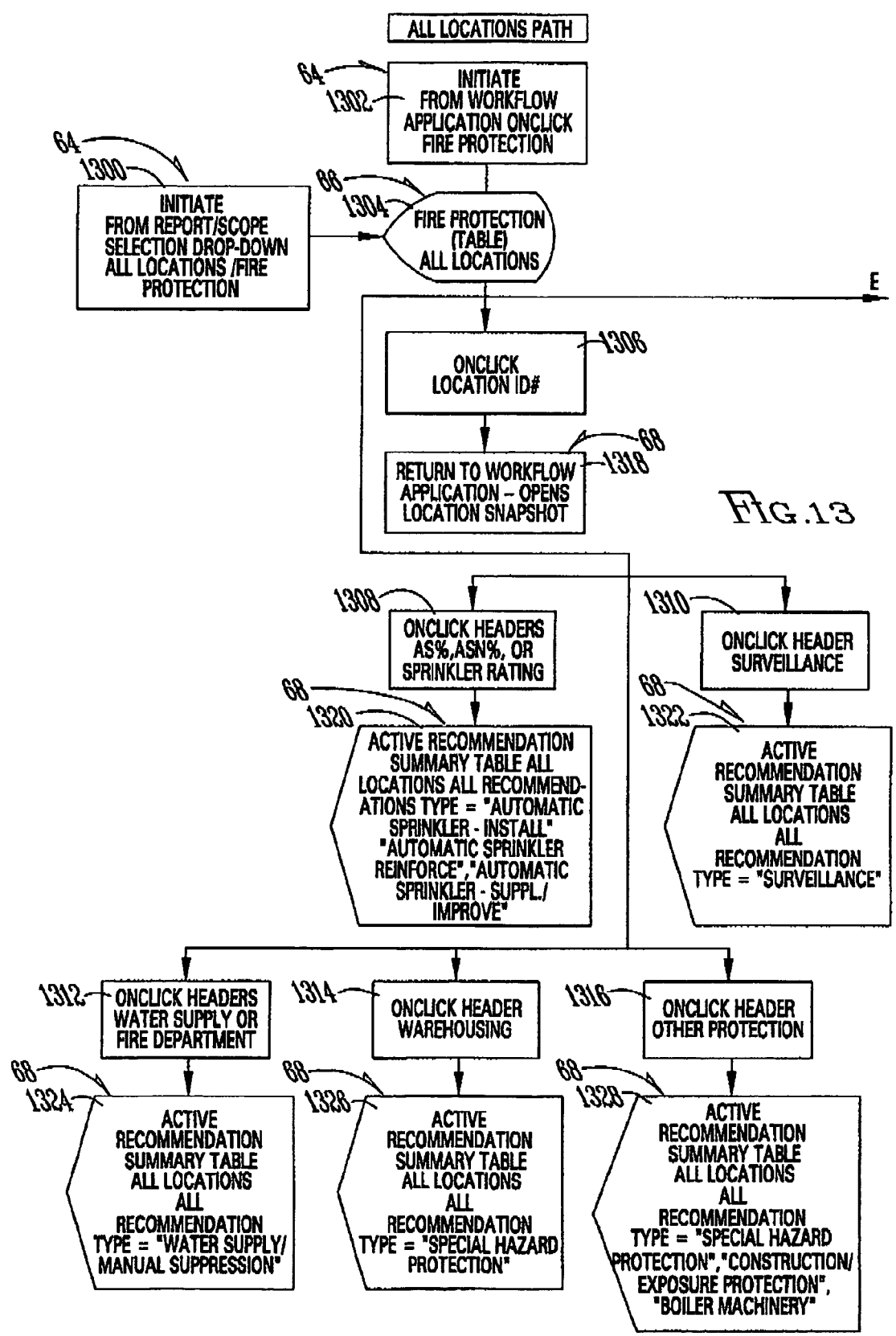
Figure 14:
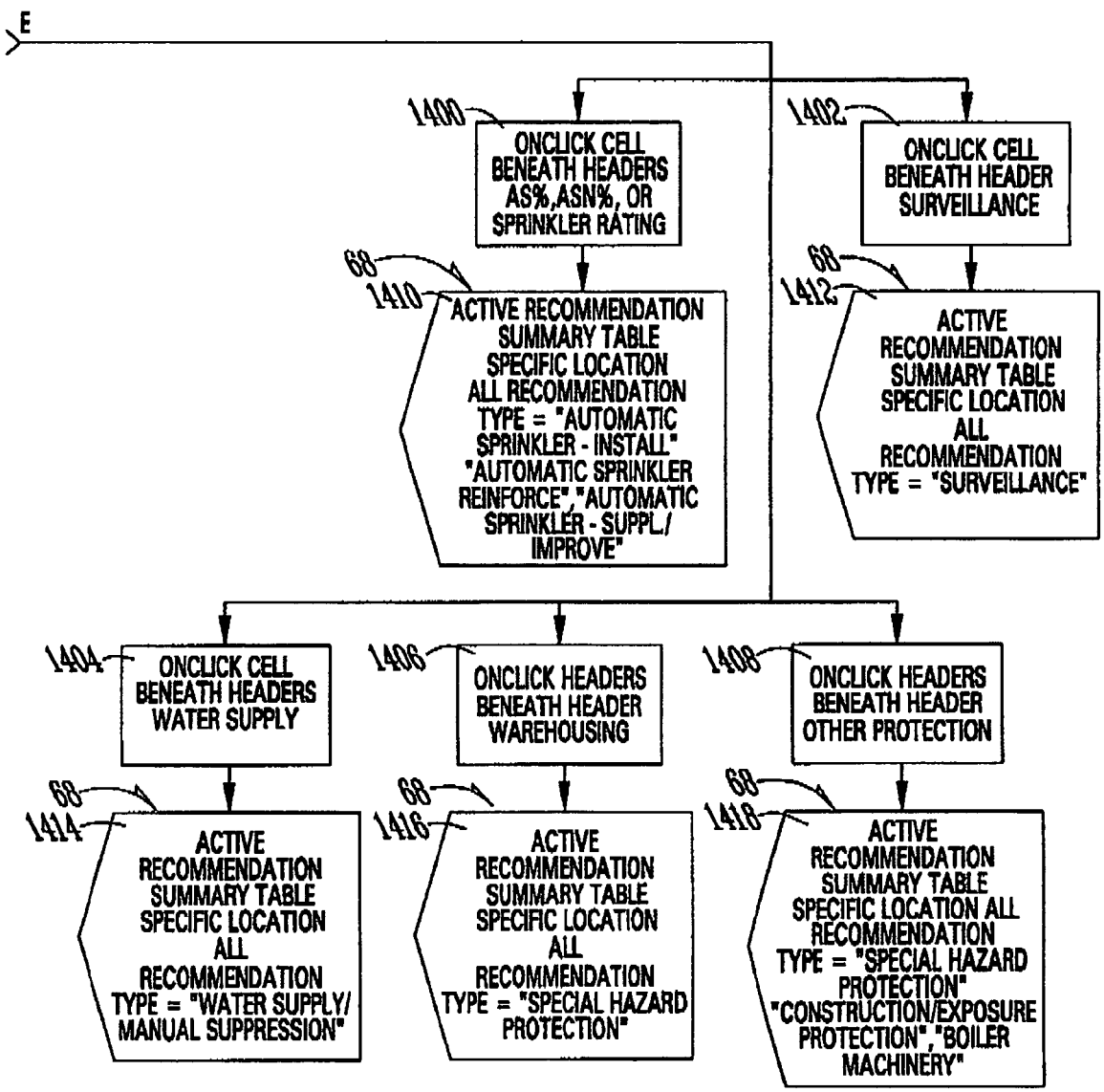
Figure 15:
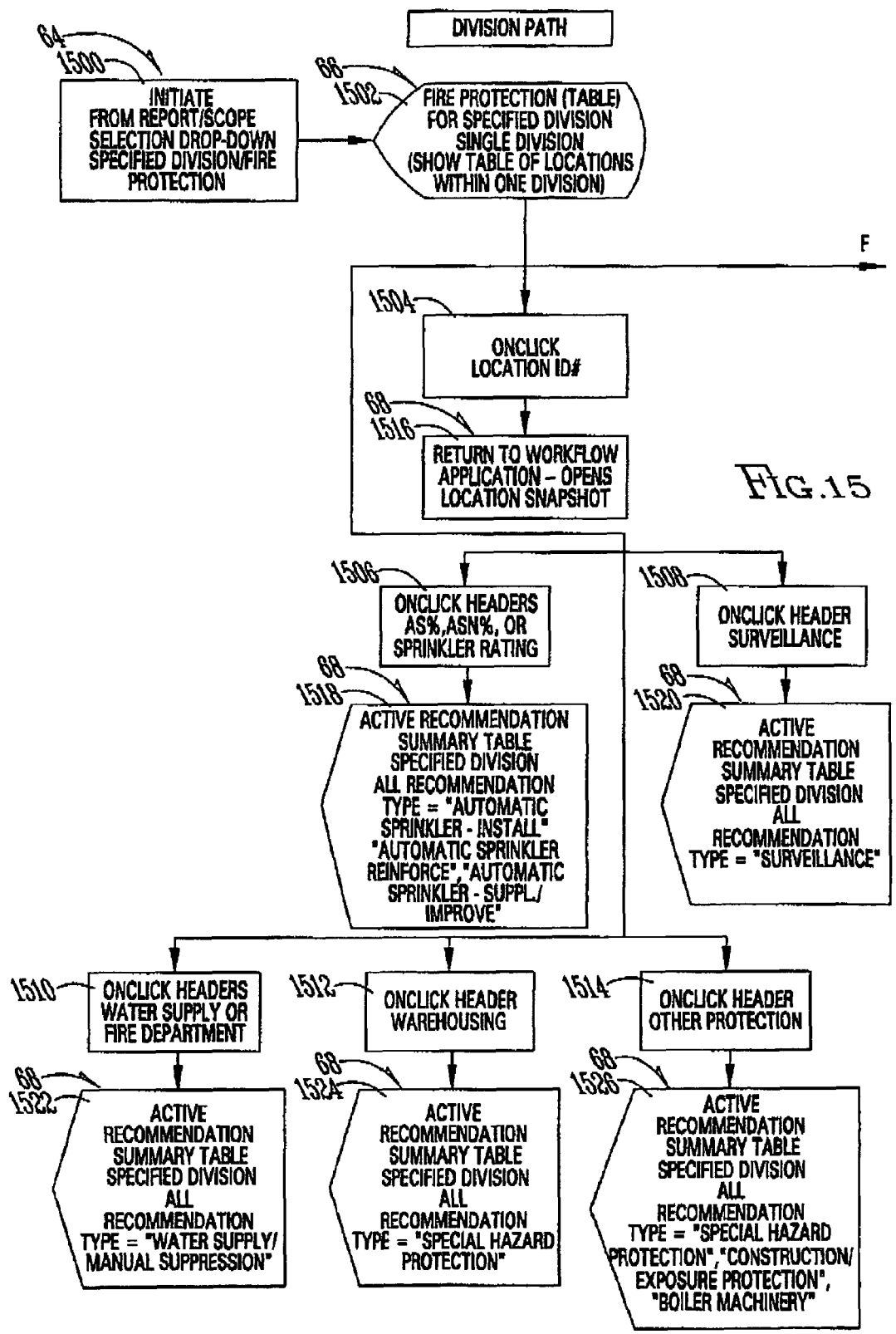
Figure 16:
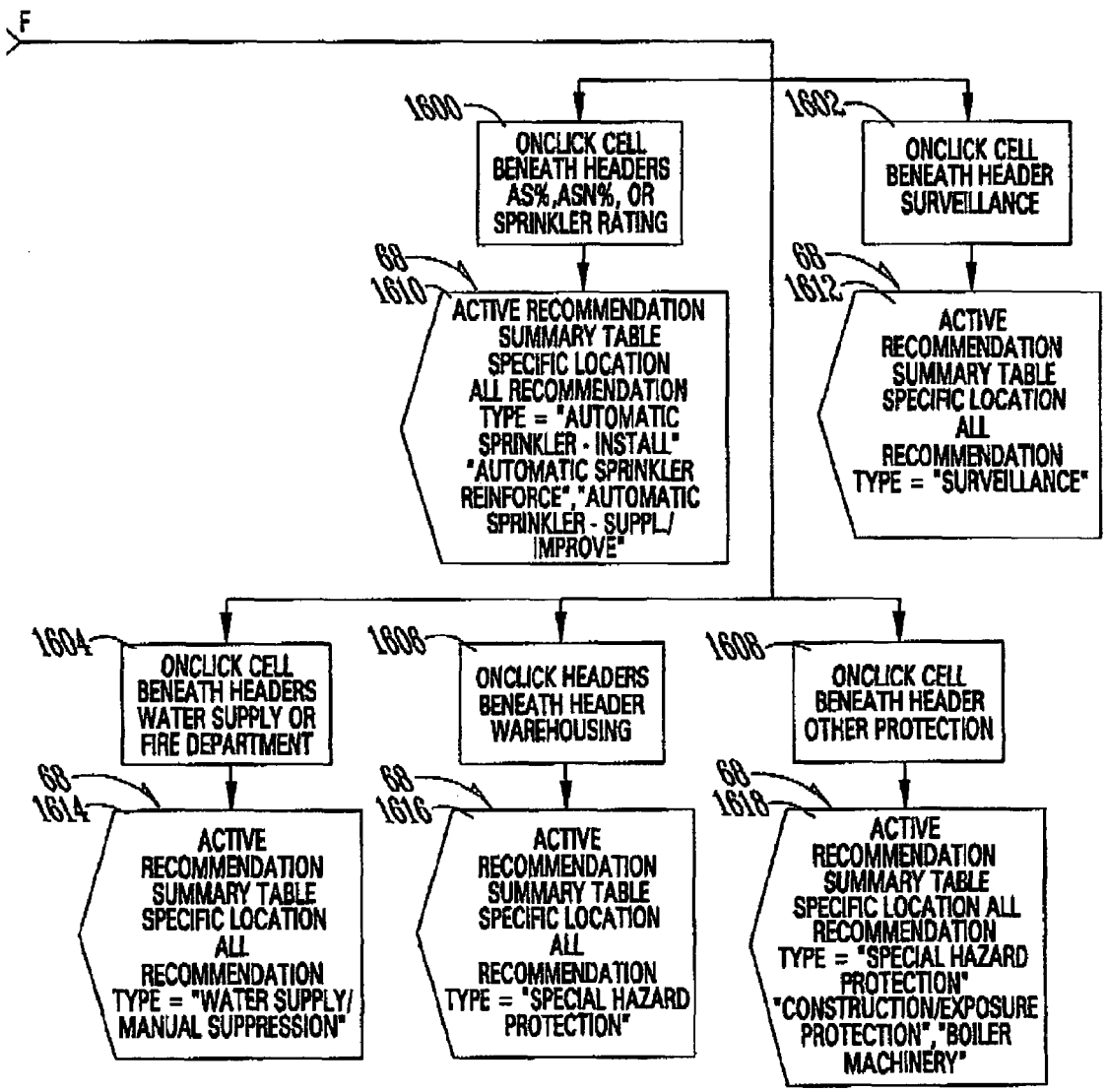
Figure 17:
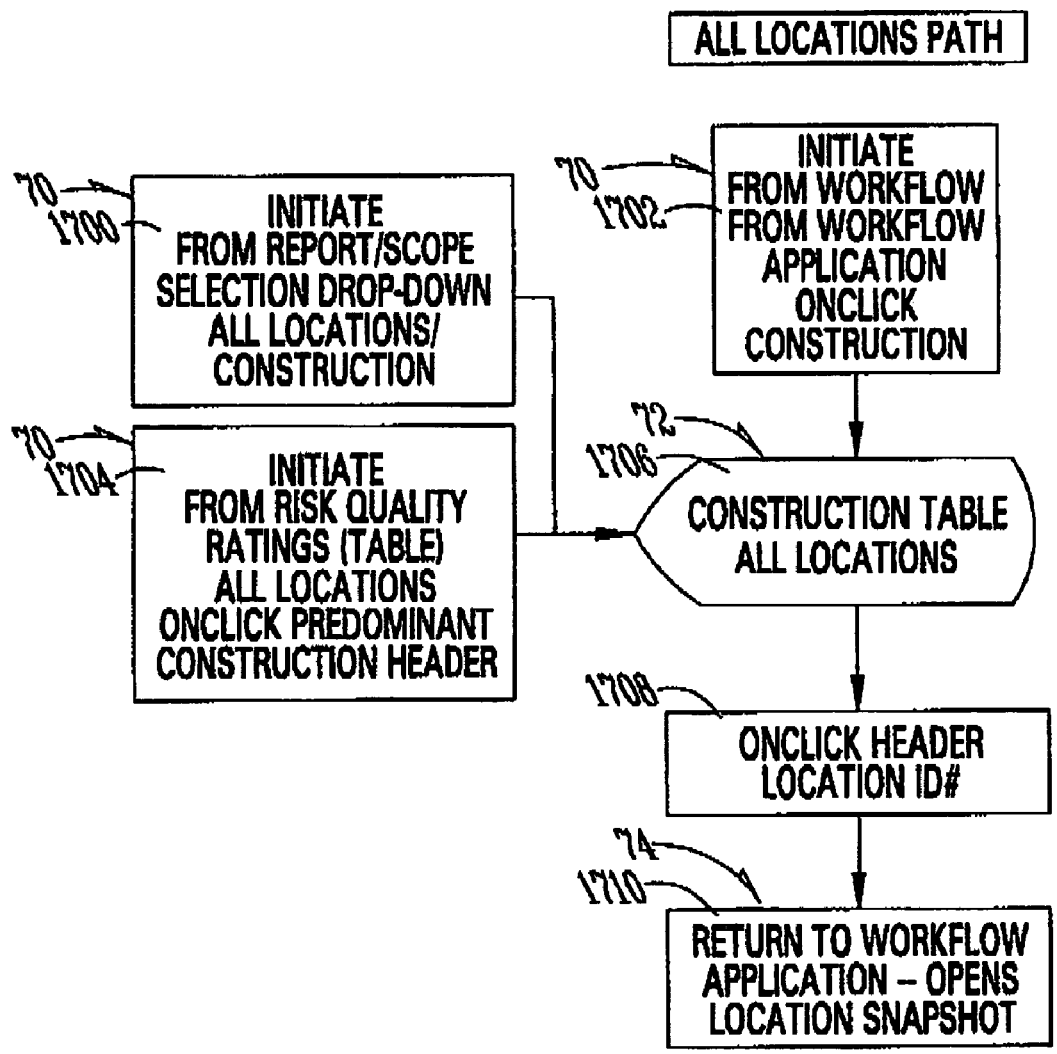
Figure 18:
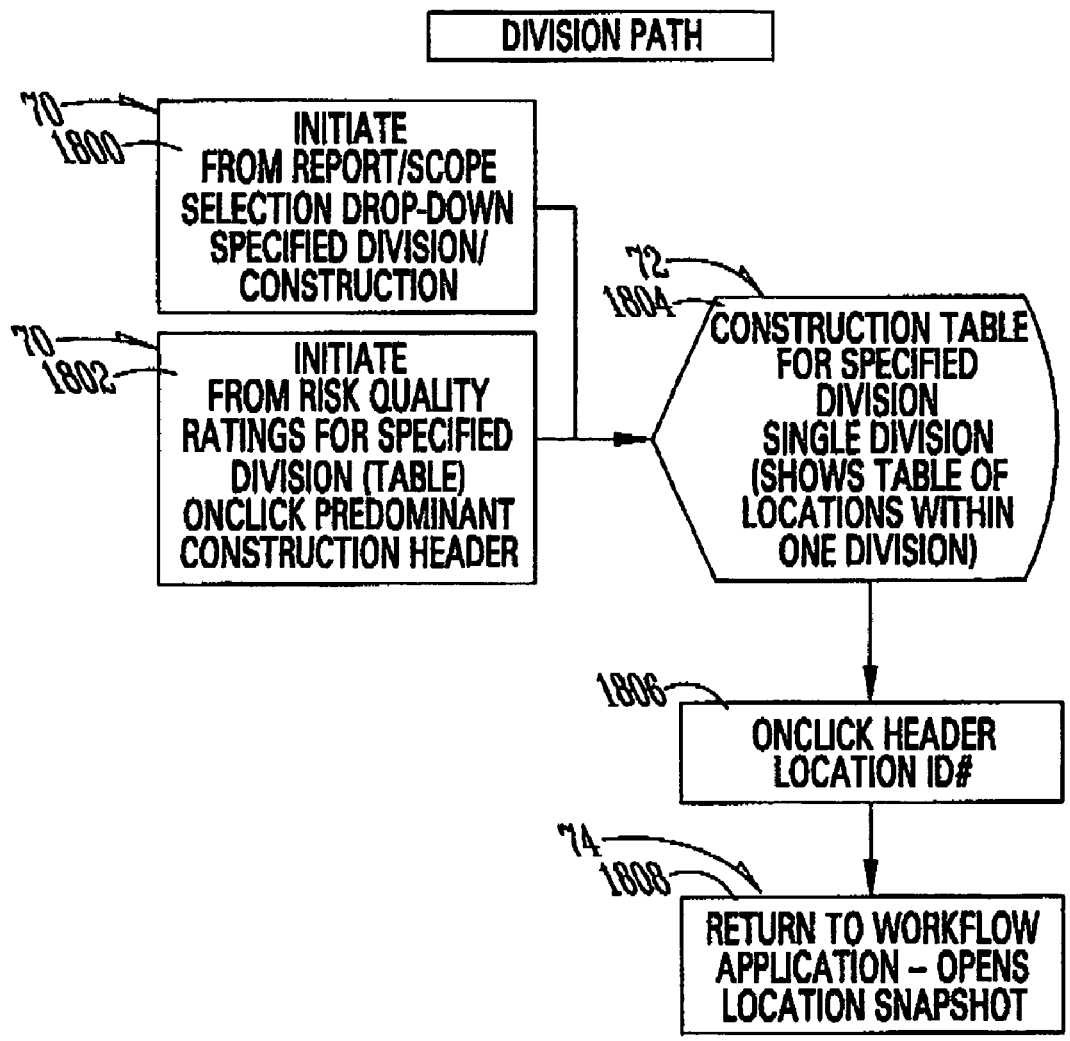

Data table 500C, FIG. 5C, is specifically used within FIGS. 13-16 for reporting fire protection programs. The drill-down specifications within FIGS. 13-16 start at initiation points 64. Each decision point 66 provides singular or multiple lower-level drill-down options, as shown. Control transfer, terminal and new data query points 68 provide the as-shown capability. FIGS. 13-14 provide fire protection drill-down specifications for the all locations path; FIGS. 15-16 provide fire protection drill-down specifications for the division path; and FIGS. 17-18 provide fire protection drill-down specifications for the specified location path.

FIG. 13 illustrates processing along an "All Locations" path, which is initiated 1300, for example, as a combination of predetermined report/scope options 200/202 shown in FIG. 2, or by onclick selection 1302 of "Fire Protection" from the workflow application. Initiation 1300, 1302 produces a Fire Protection Table report 1304 including data for all locations to which the user has access, sorted by location. The fire Protection Table report 1304 includes, for example, data organized under columnar headings shown as data fields in data table 500C. Onclick selections 1306, 1308, 1310, 1312, 1314, and 1316, of column headings from report 1304 provide drill-down detail. Onclick selection 1306 of Location ID # returns 1318 the user to the workflow application and opens the location snapshot. Onclick selection 1308 of headers AS % (automatic sprinkler type), ASN % (automatic sprinkler number) or sprinkler rating produces report 1320 including an active recommendation summary table for all locations including all active recommendations to install, reinforce, supplement or improve automatic sprinkler systems. Onclick selection 1310 of the Surveillance header produces a report 1322 including an active recommendation summary for all locations where the recommendations pertain to surveillance systems, such as smoke, fire, carbon monoxide, or video surveillance systems. Onclick selection 1312 of Water Supply or Fire Department headers produces a report 1324 including an active recommendation summary table for all locations, such as a report containing all active recommendations concerning the water supply or manual fire suppression. Onclick selection 1314 of a Warehousing header produces a report 1326 including an active recommendation summary table (see FIG. 5E) for all locations including all active recommendations concerning special hazard protection that may be applicable to any location, e.g., for storage of explosives or nuclear materials. Onclick selection 1316 of an Other Protection header produces a report 1328 including an active recommendation summary table for all locations, such as all active recommendations concerning risks for Special Hazard Protection, Construction Exposure Protection, or Boiler Machinery.

FIG. 14 illustrates downstream processing from FIG. 13 on path E including onclick selections 1400, 1402, 1404, 1406, and 1408. Onclick selection 1400 of any cell beneath headers AS %, AASN % or Sprinkler Rating produces a report 1410 including an active recommendation summary table including all recommendations for the specific location to install, reinforce, supplement or improve automatic sprinkler systems. Onclick selection 1402 of any cell beneath the Surveillance header produces a report 1412 including an active recommendation summary table that contains all active recommendations for the specific location concerning surveillance equipment. Onclick selection 1404 of any cell beneath the Water Supply header produces a report 1414 including an active recommendation summary table that contains all active recommendations for the specific location concerning the water supply and manual fire suppression options. Onclick selection 1406 of any cell beneath the Warehousing header produces a report 1416 including an active recommendation summary table that contains all active recommendations for the specific location concerning Special Hazard protection. Onclick selection 1408 of any cell beneath the Warehousing header produces a report 1418 including an active recommendation summary table that contains all active recommendations for the specific location concerning risks for Special Hazard Protection, Construction Exposure Protection, or Boiler Machinery.

FIG. 15 illustrates processing along a "Division" path, which is initiated 1500, for example, as a combination of predetermined report/scope options 200/202 shown in FIG. 2. Initiation 1500, produces a fire protection table report 1502 including data for the filtered division, sorted by location. Onclick selections 1504, 1506, 1508, 1510, 1512, and 1514 of column headings from report 1502 provide drill-down detail. Onclick selection 1504 of Location ID # returns 1516 the user to the workflow application and opens the location snapshot. Onclick selection 1506 of headers AS % (automatic sprinkler type), ASN % (automatic sprinkler number) or sprinkler rating produces report 1518, such as an active recommendation summary table for all locations of the division including all active recommendations to install, reinforce, supplement or improve automatic sprinkler systems. Onclick selection 1508 of the Surveillance header produces a report 1520 including an active recommendation summary for all locations of the division where the recommendations pertain to surveillance systems, such as smoke, fire, carbon monoxide, or video surveillance systems. Onclick selection 1510 of Water Supply or Fire Department headers produces a report 1522, such as an active recommendation summary table for all locations that contains all active recommendations for the division concerning the water supply or manual fire suppression. Onclick selection 1512 of a Warehousing header produces a report 1524, such as an active recommendation summary table for all locations of the division that contains all active recommendations concerning special hazard protection that may be applicable to any location, e.g., for storage of explosives or nuclear materials. Onclick selection 1514 of an Other Protection header produces a report 1526 including an active recommendation summary table for all locations of the division including all active recommendations concerning risks for Special Hazard Protection, Construction Exposure Protection, or Boiler Machinery.

FIG. 16 illustrates downstream processing from FIG. 15 on path F including onclick selections 1600, 1602, 1604, 1606, and 1608. Onclick selection 1600 of any cell beneath headers AS %, AASN % or Sprinkler Rating produces a report 1610 including an active recommendation summary table with all recommendations for the specific location to install, reinforce, supplement or improve automatic sprinkler systems. Onclick selection 1602 of any cell beneath the Surveillance header produces a report 1612 including an active recommendation summary table that contains all active recommendations for the specific location concerning surveillance equipment. Onclick selection 1604 of any cell beneath the Water Supply header produces a report 1614 including an active recommendation summary table that contains all active recommendations for the specific location concerning the water supply and manual fire suppression options. Onclick selection 1606 of any cell beneath the Warehousing header produces a report 1616 including an active recommendation summary table that contains all active recommendations for the specific location concerning Special Hazard protection. Onclick selection 1608 of any cell beneath the Warehousing header produces a report 1618 including an active recommendation summary table that contains all active recommendations for the specific location concerning risks for Special Hazard Protection, Construction Exposure Protection, or Boiler Machinery.

Figure 5D:
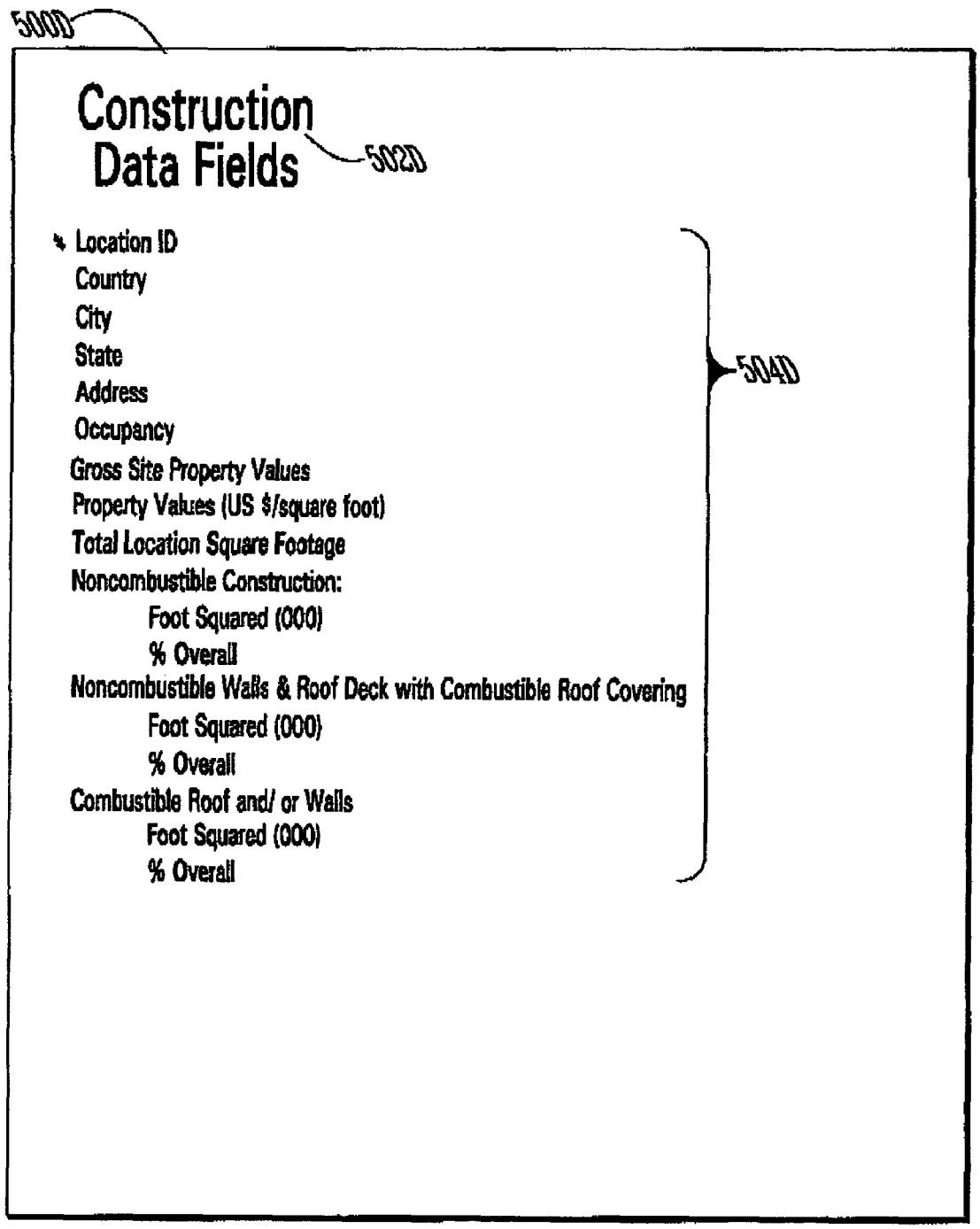
Figure 19:
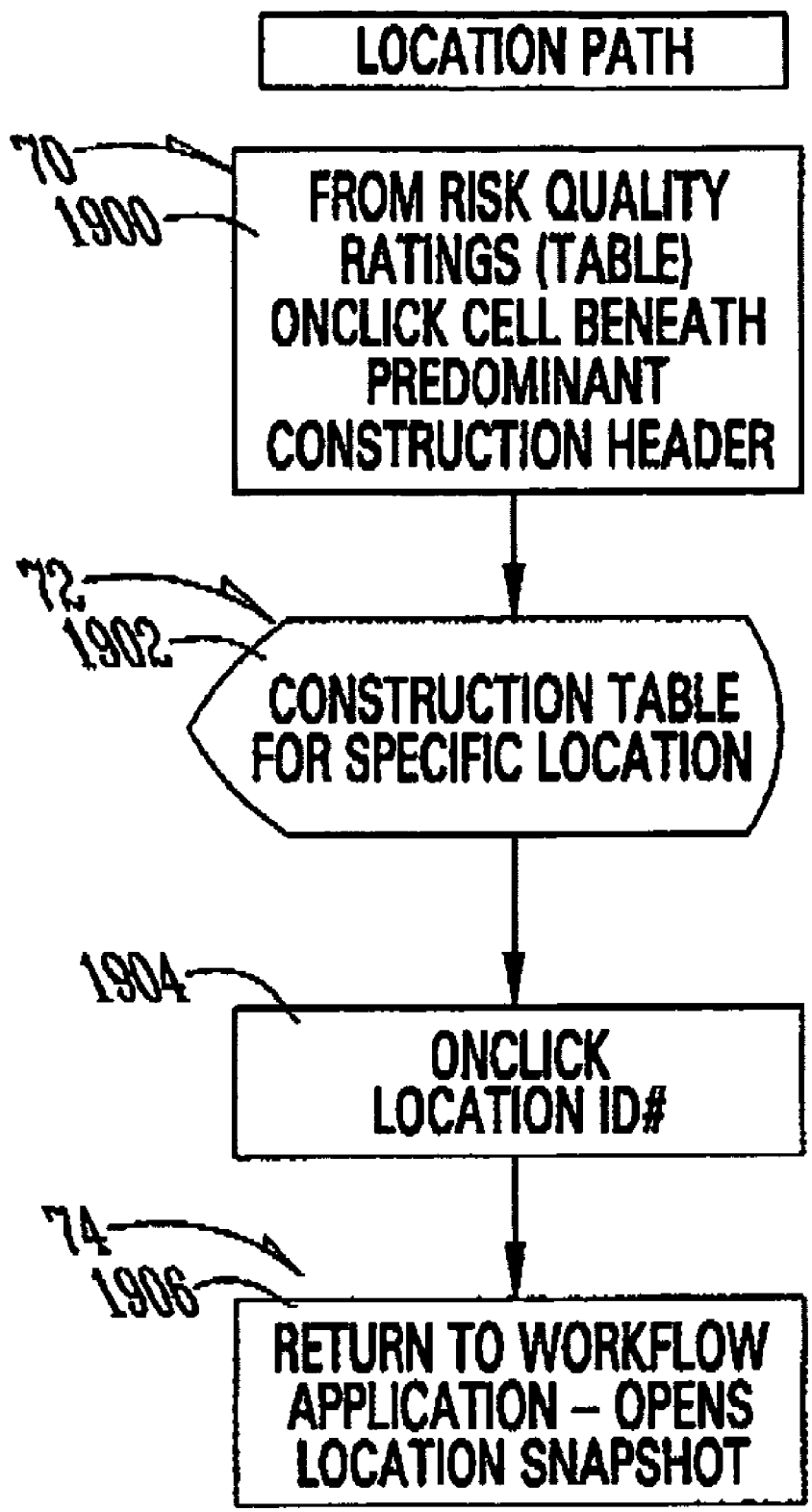

Data table 500D, FIG. 5D, is specifically used within FIGS. 17-19 for construction reporting. The drill-down specifications within FIGS. 17-19 start at initiation points 70. Each decision point 72 provides singular or multiple lower-level drill-down options, as shown. Control transfer, terminal and new data query points 74 provide the as-shown capability. FIGS. 17-19 are annotated with three separate paths—all locations, division, and one location—to segregate corporate structures to the relevant information.

FIG. 17 illustrates an "All Locations" path, which is initiated 1700, for example, as a combination of predetermined report/scope options 200/202 shown in FIG. 2. Alternative initiation 1702 occurs or by onclick selection 1702 of "Construction" from the workflow application, or by onclick selection 1704 of the Predominant Construction header from report 700 (shown in FIG. 7). Initiation 1700, 1702, 1704 produces a Construction Table report 1706 showing data from data table 500D sorted by location. Onclick selection 1708 of the Location ID# returns 1710 the user to the workflow application and opens the location snapshot.

FIG. 18 illustrates a "Division" path, which is initiated 1800, for example, as a combination of predetermined report/scope options 200/202 shown in FIG. 2. Alternative initiation 1802 occurs by onclick selection of the Predominant Construction header from report 810 (shown in FIG. 8). Initiation 1800, 1804 produces a Construction Table report 1804 showing data from data table 500D sorted by location for the specific division. Onclick selection 1806 of the Location ID# returns 1808 the user to the workflow application and opens the location snapshot.

FIG. 19 illustrates a "Location" path, which is initiated 1900, for example, by onclick selection of any cell beneath the Predominant Construction header from report 726 (shown in FIG. 7) or report 810 (shown in FIG. 8). Initiation 1900 produces a Construction Table report 1902 showing data from data table 500D sorted by location for the specific division. Onclick selection 1904 of the Location ID# returns 1906 the user to the workflow application and opens the location snapshot.

Figure 5E:
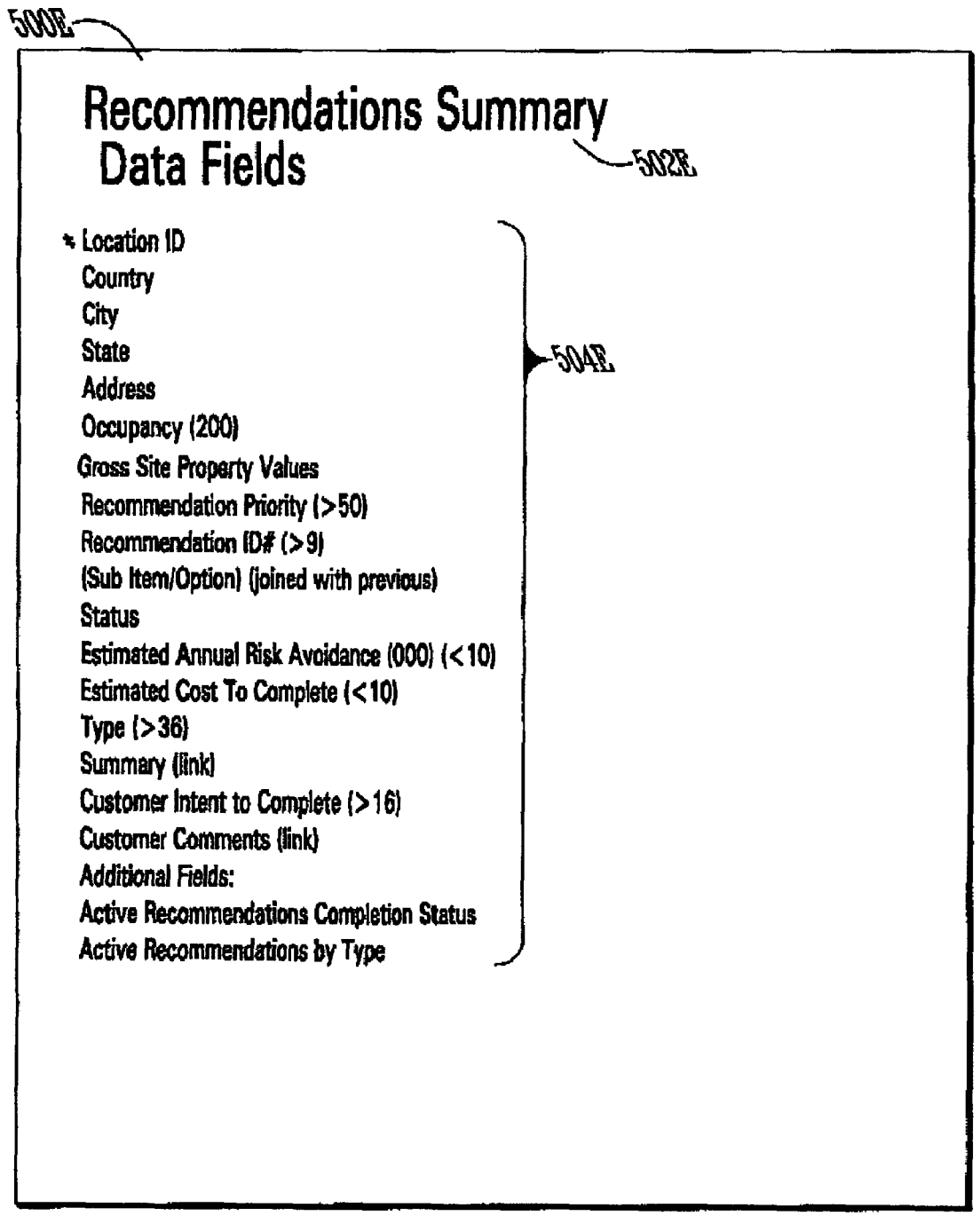
Figure 20:
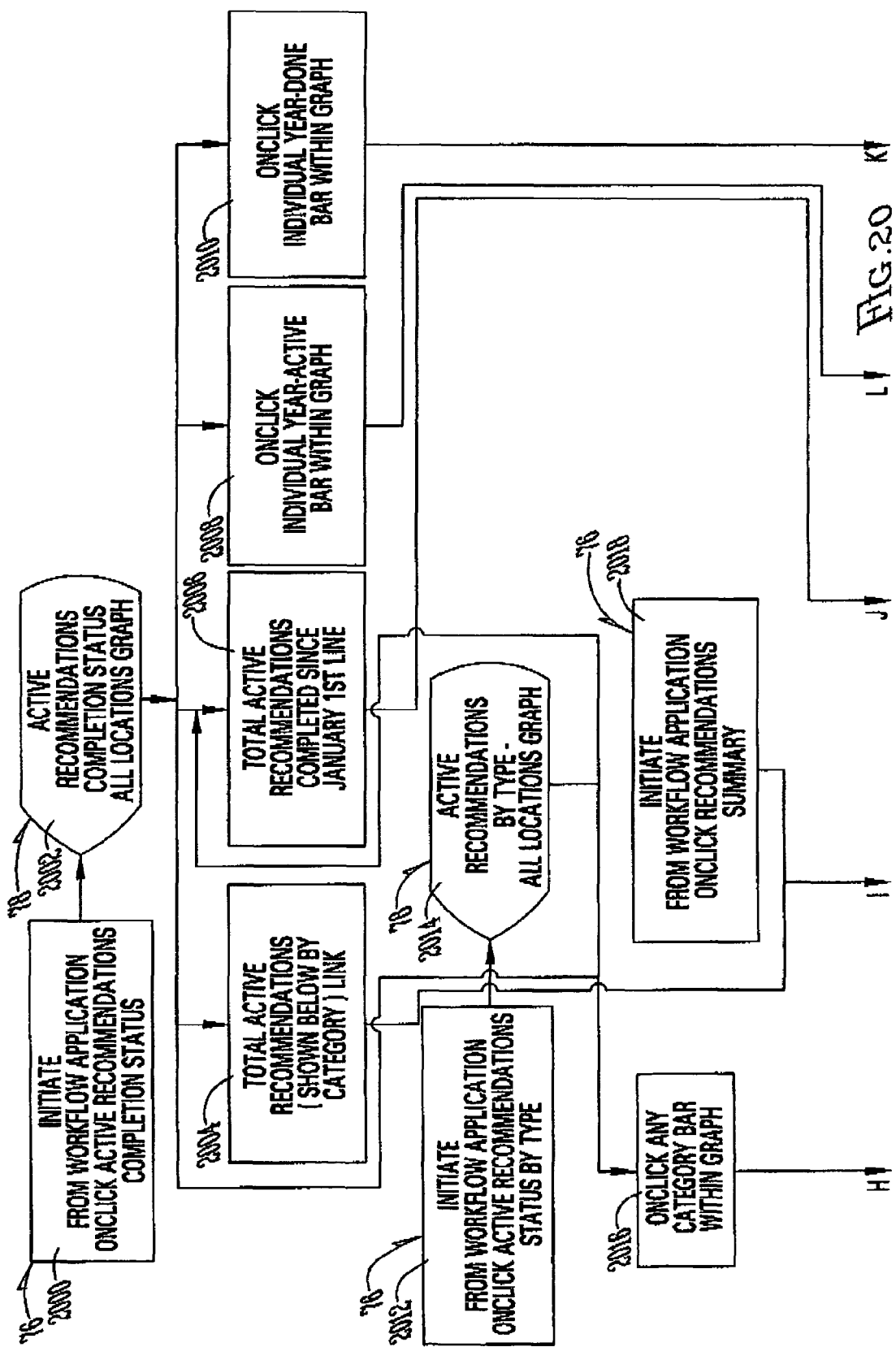
Figure 21:
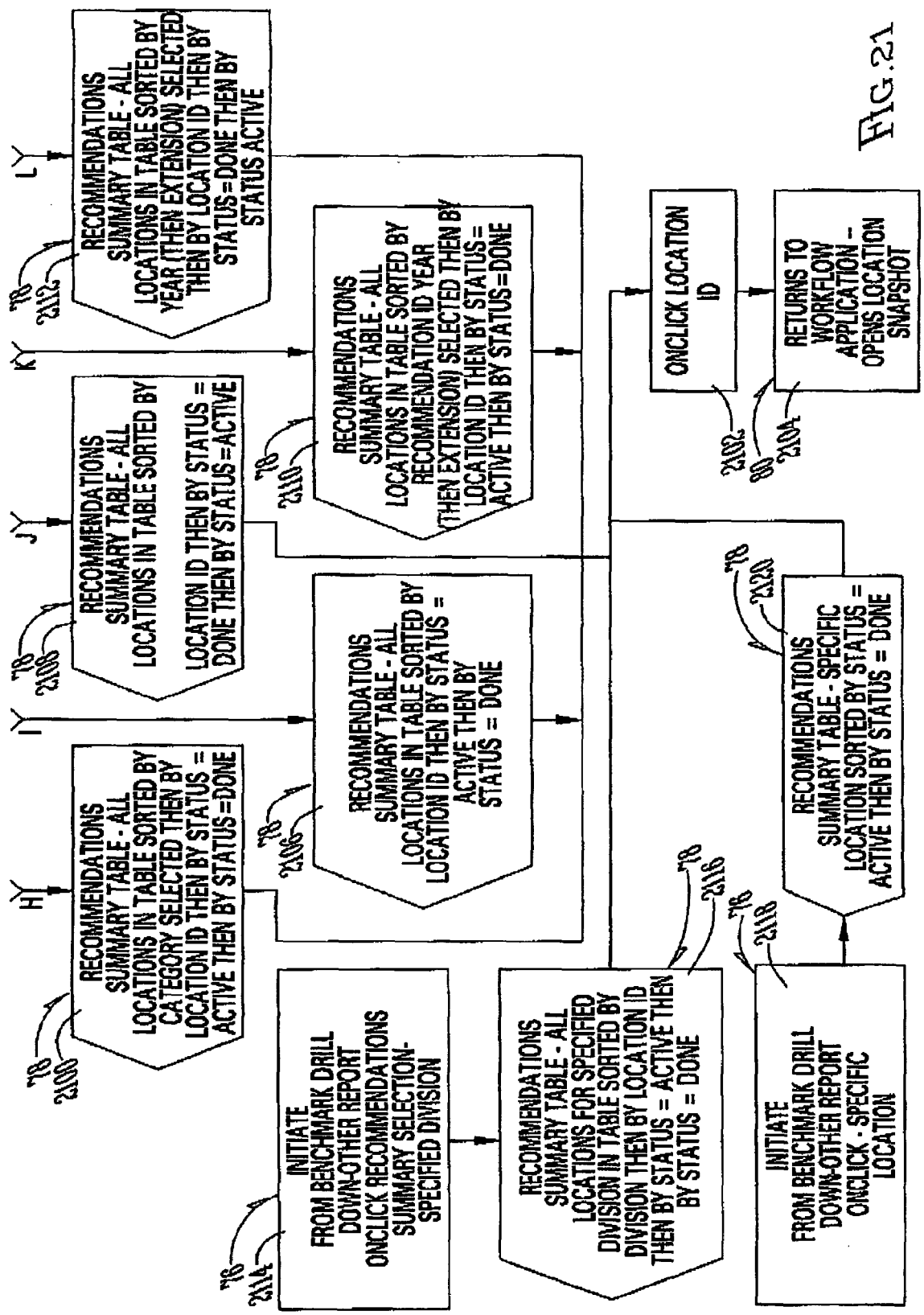

Data table 500E, FIG. 5E, is specifically used within FIGS. 20-21 for reporting of recommendation summaries. The drill-down specifications within FIGS. 20-21 start at initiation points 76. Each decision point 78 provides singular or multiple lower-level drill-down options, as shown; preferably, designated sorting occurs in ascending order. Control transfer, terminal and new data query points 80 provide the as-shown capability.

Initiation 2000 occurs, for example, by onclick selection of an "Active Recommendations" bar on the workflow application, which produces a bar graph 2002 that sorts the elements of data table active recommendations and completions of recommendation status (completed or incomplete) sorted by location. Onclick selections 2004, 2006, 2008, 2010 of fields from the graph 2002 provide drill-down detail. Onclick selection 2004 of a field captioned "Total Active Recommendations (Shown Below By Category)" delivers drill-down on path H. Onclick selection 2006 of a field captioned "Total Active Recommendations Completed Since January $1^{st}$" delivers drill-down on path J. Onclick selection 2008 of an incomplete active recommendations bar in bar graph 2002 delivers drill-down on path L. Onclick selection 2010 of a completed recommendations bar in bar graph 2002 delivers drill-down on path K.

Initiation 2012 occurs from the Workflow Application by onclick selection of a field captioned "Active Recommendations Status By Type." System 10 accesses data table 500E to sort active recommendations by status and type. The reporting results are reflected in bar graph 2014. Onclick selections 2004 and 2006 may be made from fields that are identical to one another on bar graphs 2002 and 2014. Onclick selection 2016 of any category on bar graph 2014 permits drill-down processing on path H. An additional initiation 2018 may occur from the Workflow Application Bar graph and produce by onclick selection of a field captioned "Recommendations Summary," which facilitates drill-down processing on path I in like manner with selection 2004.

FIG. 21 shows continuous processing on paths H, I, J, K and L downstream from FIG. 20. Path H delivers a Recommendations Summary Table report 2100 (see FIG. 5E) wherein all locations presented in the table are sorted by the Category of recommendation identified by onclick selection 2016, then by Location ID, then by Status=Active, then by Status=Done. From report 2100, onclick selection 2102 of Location ID returns 2104 the user to the Workflow Application and opens the location snapshot. Path I delivers a Recommendations Summary Table report 2106 wherein all locations presented in the table are sorted by Location ID, then by Status=Done, then by Status=Active. Path J delivers a Recommendations Summary Table report 2108 wherein all locations presented in the table are sorted by Location ID, then by Status=Active, then by Status=Done. Path K delivers a Recommendations Summary Table report 2110 wherein all locations presented in the table are sorted by Recommendation Identification Year, then Extension, then by Location ID, then by Status=Active, then by Status=Done. Path L delivers a Recommendations Summary Table report 2112 wherein all locations presented in the table are sorted by Recommendation Identification Year, then Extension, then by Location ID, then by Status=Done, then by Status=Active.

Alternative initiation 2114 occurs by drill-down from other reporting features, such as onclick selection of a "Recommendations Summary" field for a specified division on a Benchmark Drill-Down-Other Report. Alternative initiation 2114 delivers a Recommendations Summary Table report 2116 for a specified division wherein all locations presented in the table are sorted by Division, then by Location ID, then by Status=Active, then by Status=Done.

Another alternative initiation 2118 from the Benchmark Drill-Down-Other report occurs by onclick selection of a specific Location ID. Initiation 2118 delivers a Recommendations Summary Table report 2120 for the specified Location ID wherein fields presented in the table are sorted by Status=Active, then by Status=Done.

Onclick selection 2102 of Location ID from any of Recommendation Summary Tables 2100, 2106, 2108, 2110, 2112, 2116, or 2118 returns 2104 the user to the Workflow Application and opens the location snapshot.

Figure 5F:
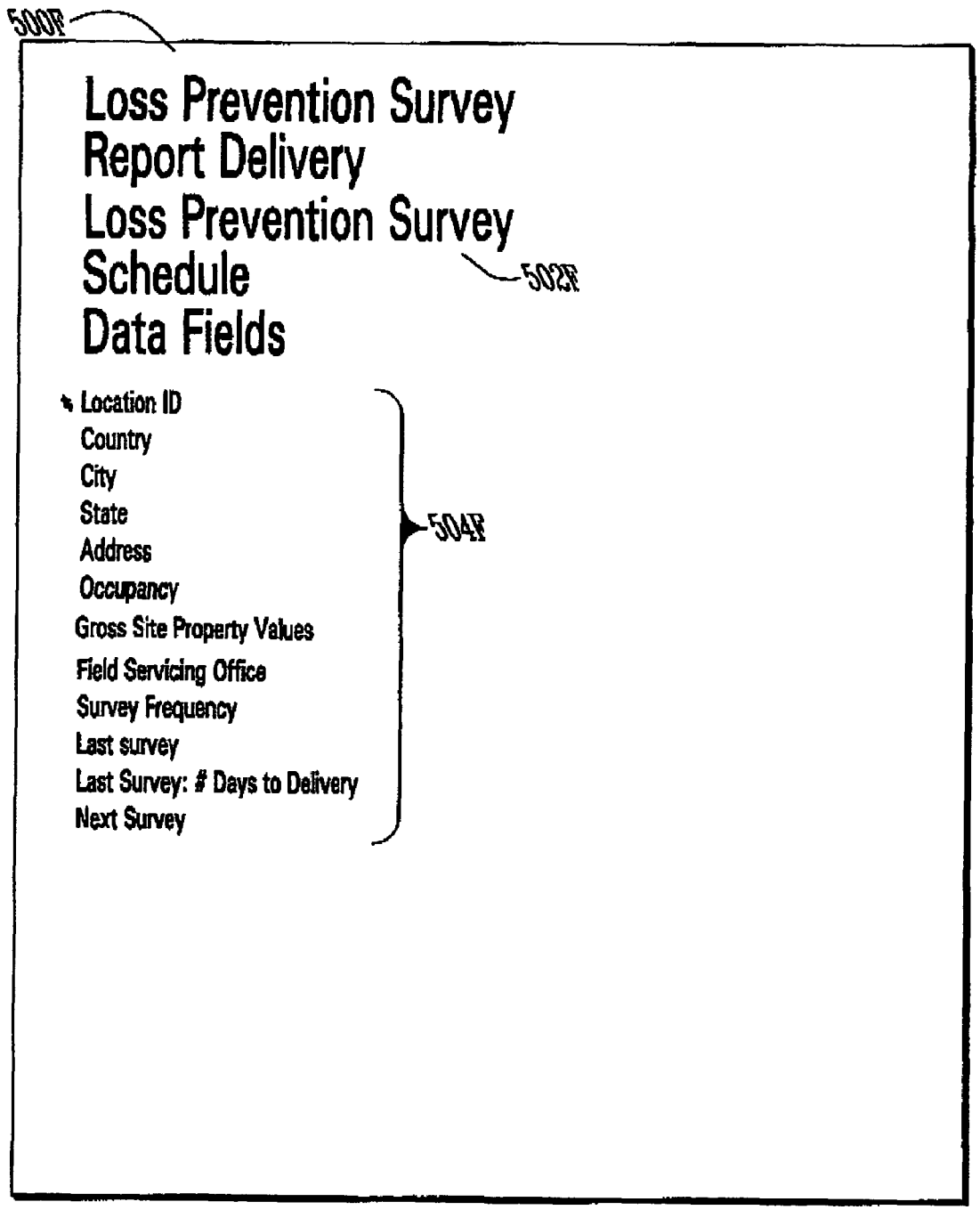
Figure 22:
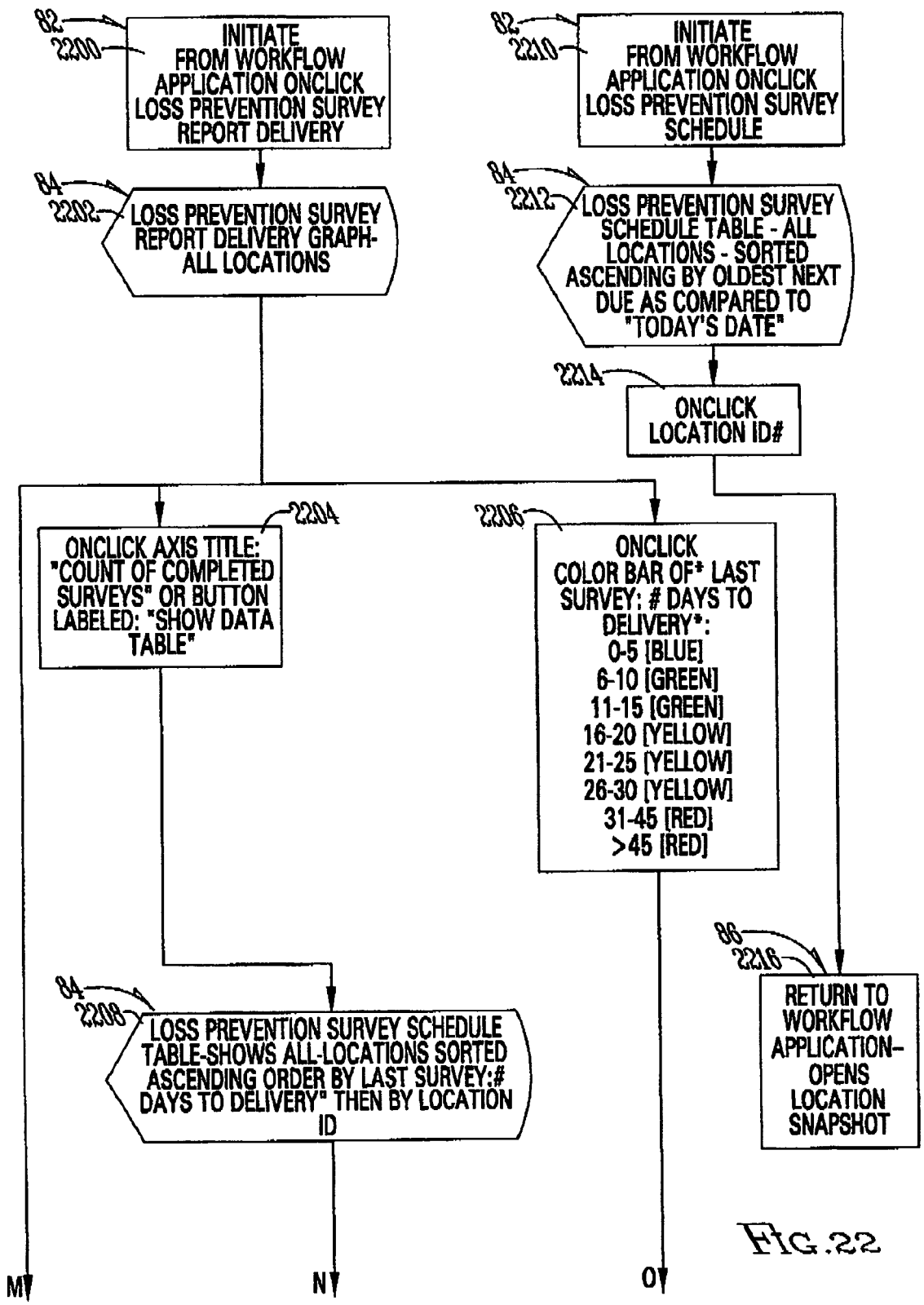
Figure 23:
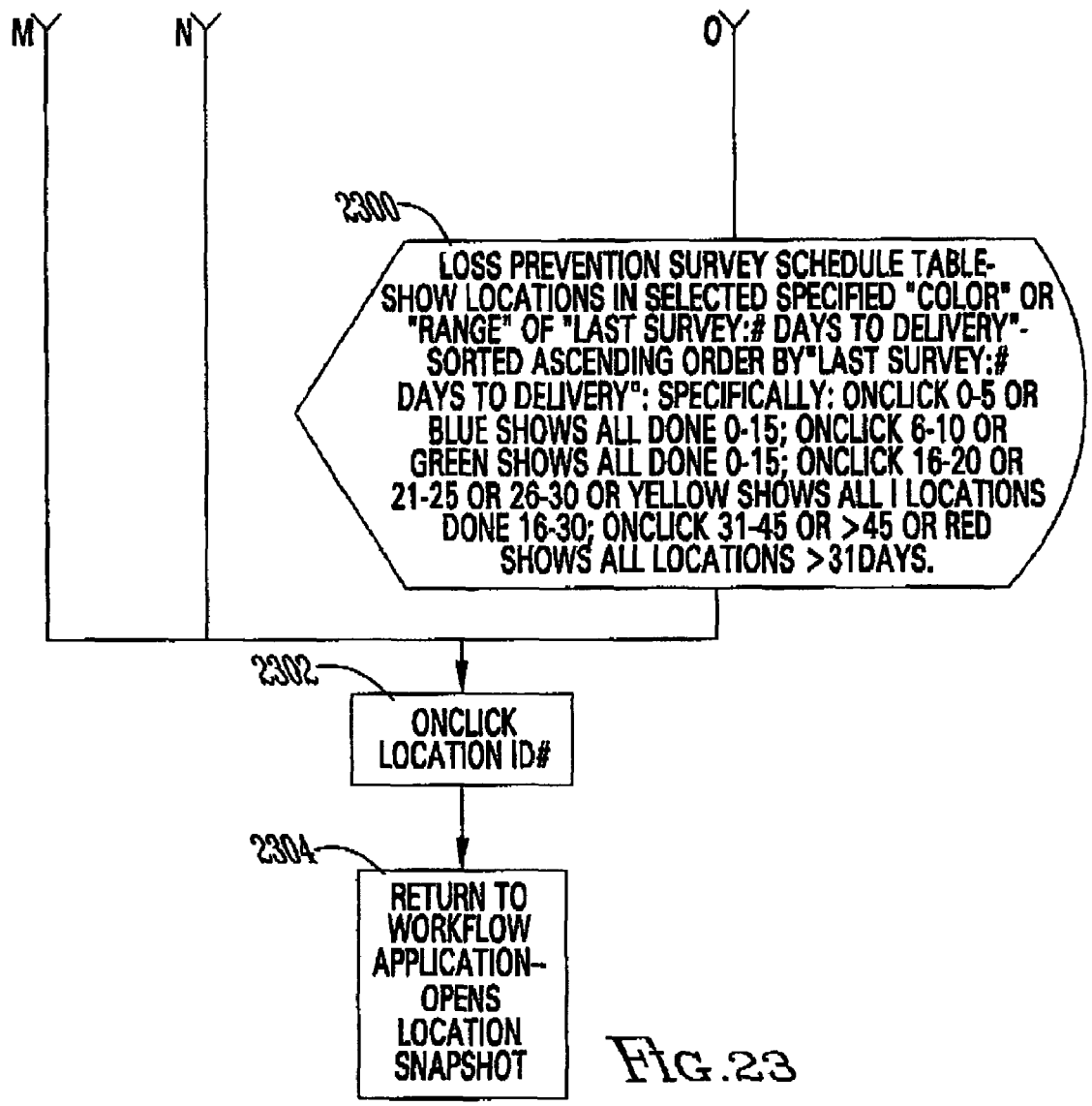

Data table 500F, FIG. 5F, is specifically used within FIGS. 22-23 for loss prevention delivery and schedule reporting. The drill-down specifications within FIGS. 22-23 start at initiation points 82; the "onclick" annotation indicates user selection may be achieved through computer button clicks or menu selections relative to graphical user interfaces (e.g., at a computer 14, FIG. 1). Each decision point 84 provides singular or multiple lower-level drill-down options, as shown. Control transfer, terminal and new data query points 86 provide the as-shown capability.

Initiation 2200 occurs from the Workflow Application by onclick selection of a field captioned "Loss Prevention Survey Report," which delivers a loss prevention survey graph 2202 including a count of completed surveys sorted by the number of days to delivery for the last survey. Graph 2202 contains data from reporting operations on data table 500F. Onclick selections 2204, 2206 of fields from graph 2202 provide drill-down processing. Onclick selection of the axis title "Count of Completed Surveys" or a button labeled "Show Data Table" delivers report 2208, which contains a loss prevention survey schedule showing all locations sorted in ascending order by Last Survey: # of days to delivery, then by location ID. Onclick selection 2206 of a color bar on graph 2202 leads to downstream processing on path O. Alternative initiation 2210 occurs from the Workflow Application by onclick selection of a field captioned "Loss Prevention Survey Report," which delivers a loss prevention schedule table 2212 including all locations sorted in ascending order by oldest next due compared to the current date. Onclick selection 2214 of Location ID # from table 2212 returns 2216 the user to the Workflow Application and opens the location snapshot.

FIG. 23 shows continuous processing on paths M, N, and O downstream from FIG. 22. Path O delivers a loss prevention survey schedule table 2300, which identifies the locations in the specified color range sorted in ascending order by Last Survey: # Days to Delivery. Onclick selection 2302 of Location ID # from graph 2302 or tables 2208, 2300 on respective paths M, N, or O returns 2304 the user to the Workflow Application and opens the location snapshot.

Figure 5G:
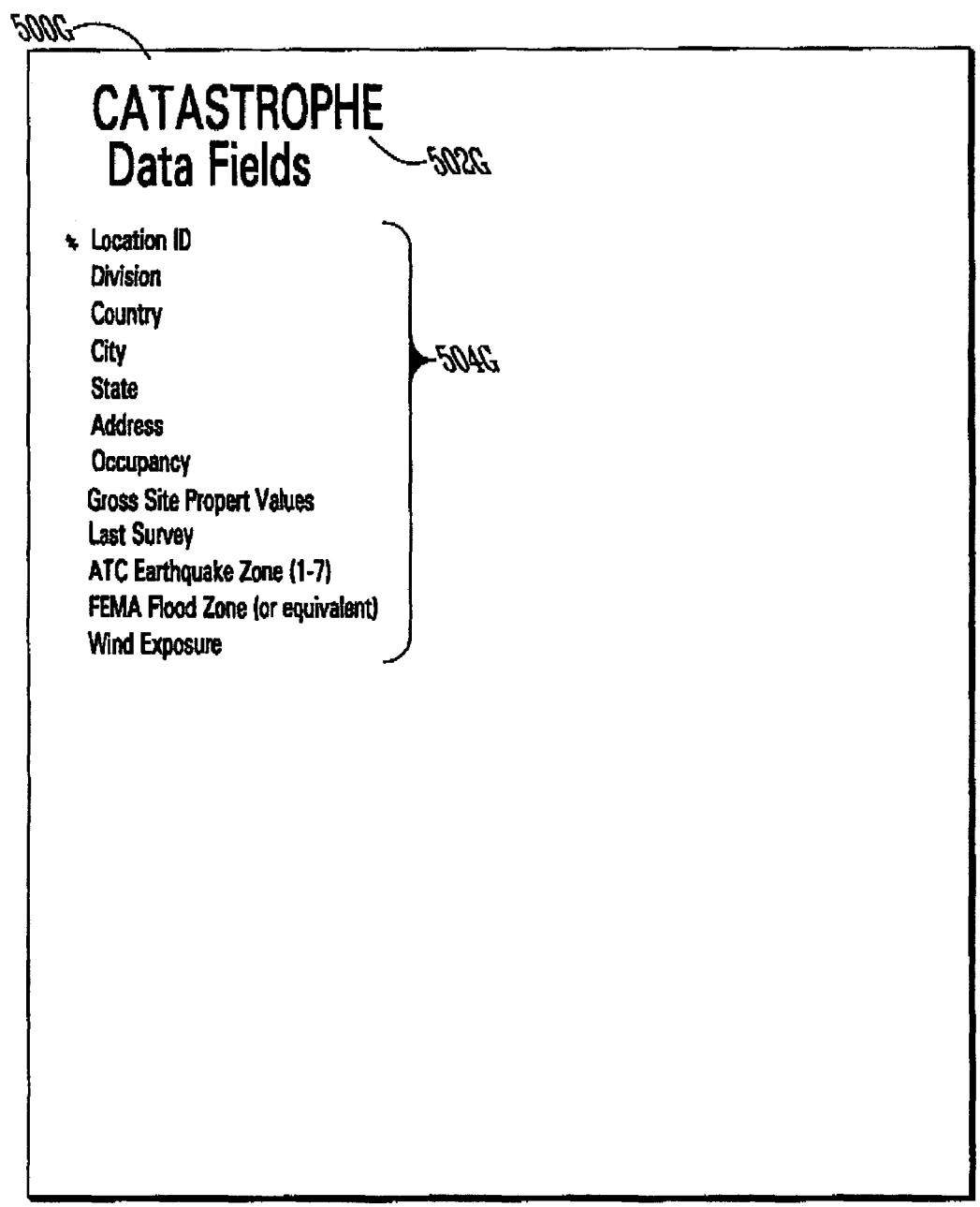
Figure 24:
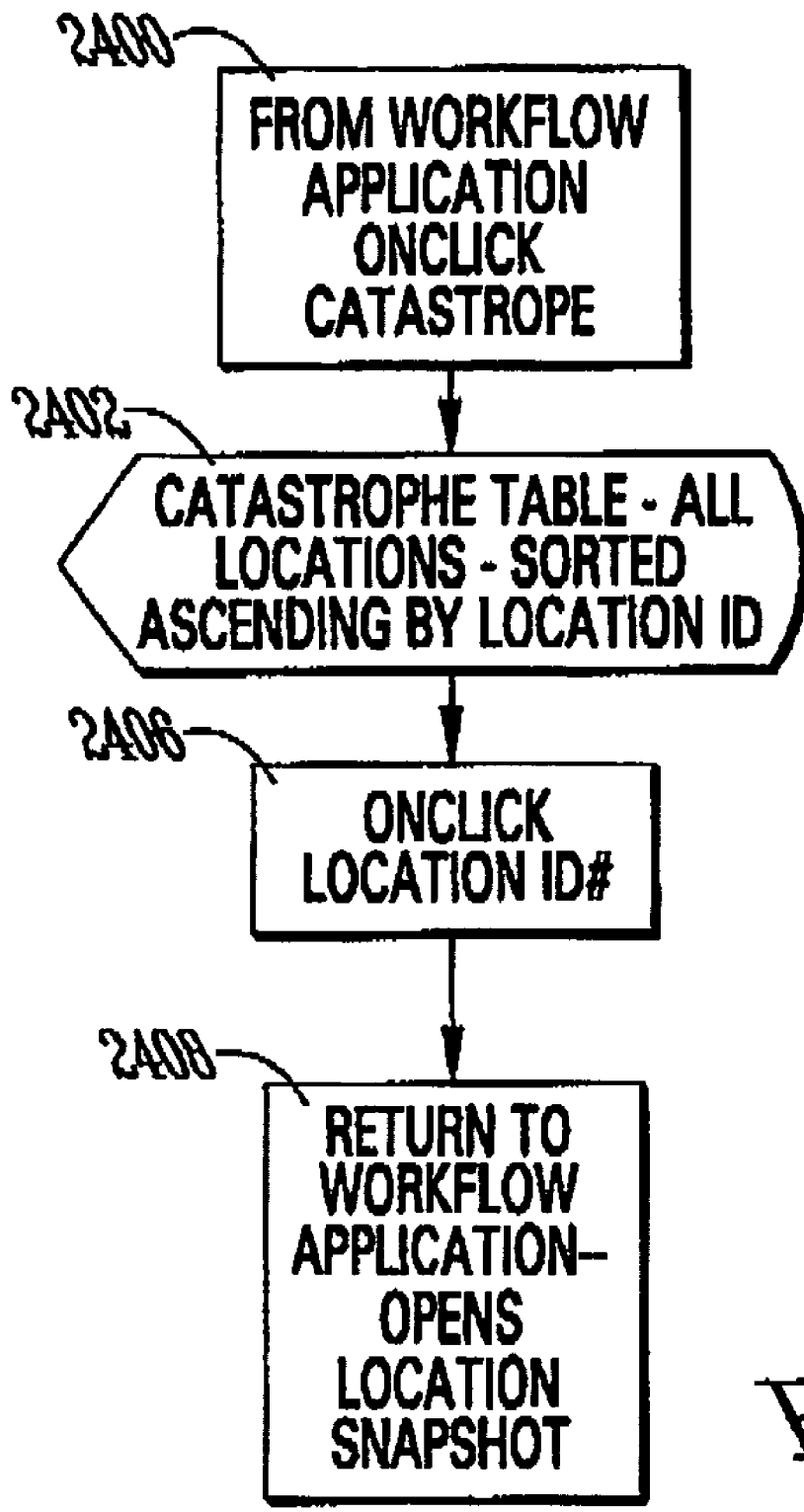

Data table 500G, FIG. 5G, is specifically used within FIG. 24 for catastrophe reporting. Initiation 2400 occurs from the Workflow Application by onclick selection of a field captioned "Catastrophe." Initiation 2400 delivers a report table 2402, including catastrophe data (see FIG. 5G) for all locations sorted by Location ID. Onclick selection 2406 of Location ID # from report table 2402 returns 2408 the user to the Workflow Application and opens the location snapshot.

With further regard to FIG. 1, a user at an access computer 14 may also connect to workflow engine application 27 through an email server and network 90 by buses 17, 90, as shown. System 10 may thus include an email notification application 95 that that connects between buses 92, 94 to interface between (a) email server and network 90 and (b) database 20. In this way, email notification application 95 of system 10 may automatically send an email update to an authorized user, at an access computer 14, regarding modifications or newly-posted data to an associated risk management information segment 12( ). The user may receive the e-mail message with links (e.g., descriptors and/or Internet hyperlinks) to an updated document and/or the file cabinet or binder in which the updated document is located.

The submission of new data for risk management information 12 through workflow process terminals 26 may also generate automated email message notifications. Specifically, upon receipt of the new data through a terminal 24( ), email notification application 95 may generate the email notification for a user at an access computer 14 through email server and network 90. The e-mail is automatically generated by email notification application 95 to notify users with appropriate access to the new data or document, as identified by database 20.

System 10 may further include a security buffer 96 that interfaces between network 18 and graphics interface 16, as shown between buses 98A, 98B. Buffer 96 verifies a user's access authority by comparing the user's identity with the authorization list associated with a particular risk information segment 12( ). Accordingly, when a user clicks on an email link to updated information within database 20, buffer 96 may provide access security for the updated information.

Figure 25:
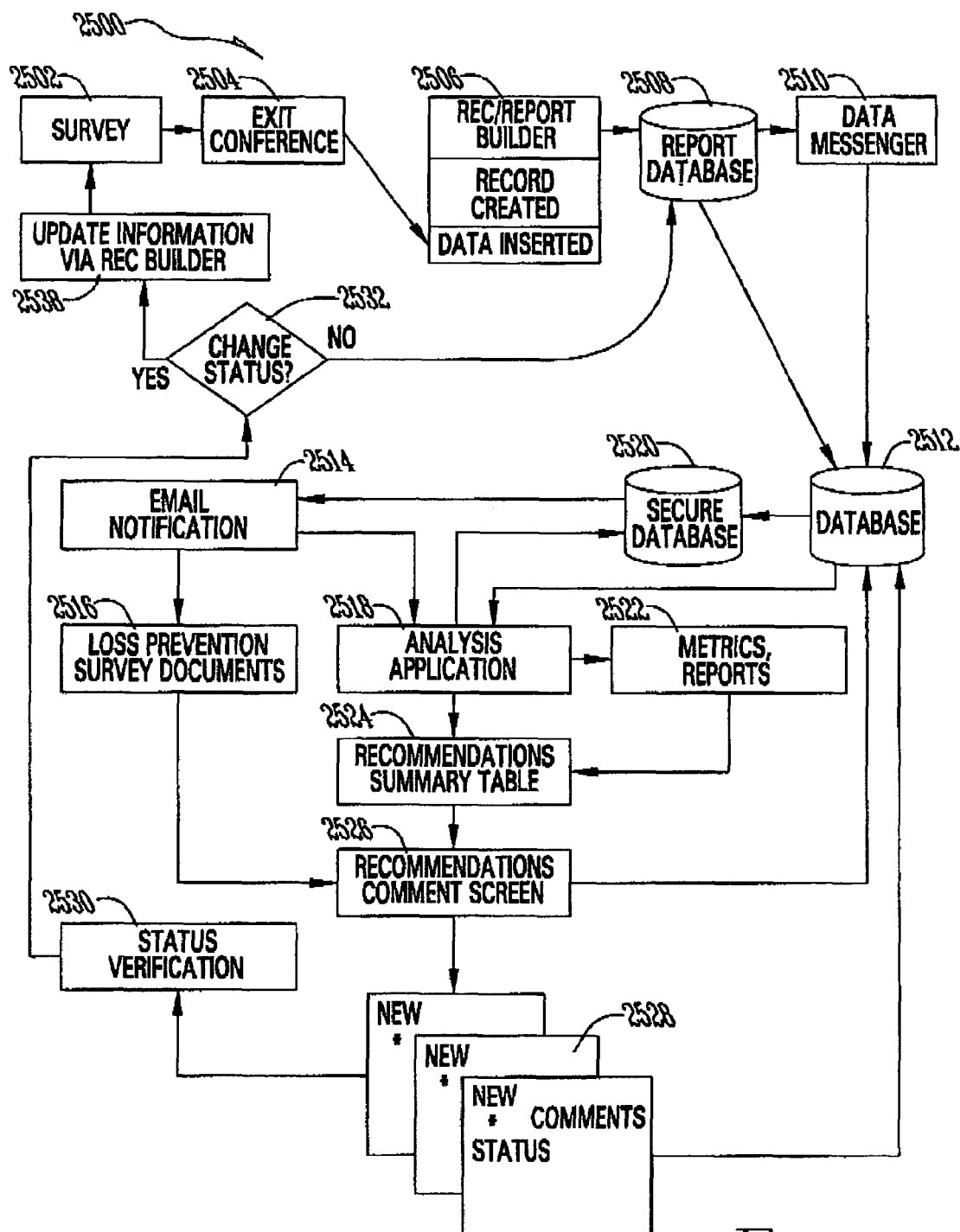
FIG. 25 shows a flowchart illustrating additional process operations of one risk management interface system.

FIG. 25 shows a flowchart 2500 illustrating logistical process operations for obtaining data and system elements for the risk management interface system 10 (see also FIG. 1). At survey 2502, a remote field associate (e.g., an engineer) collects information to complete a risk evaluation from a customer's physical facility. By way of example, the associate may interact with system 10 via a terminal 24 (shown in FIG. 1). At exit conference 2504, the field associate consults with facility management to configure new commitments and recommendations resulting from survey 2502. At step 2506, reports and other records are created within system 10 for insertion to relevant client data segments; a report is then compiled for a client access database 2508. Step 2506 may include a workflow application process denoted as "rec builder" herein; rec builder may for example be used to create recommendations for specific surveys. Reports are sent to database 2508 for direct update by messenger 2510, which may be an Internet e-mail software (client/server) application that segregates the report into data components for storage into interim database 2512; database 2512 stores data results of risk assessments in facility surveys 2502.

A document may be posted to database 2520 for a customer viewing on the World Wide Web; this also engages the e-mail notification 2514, informing all authorized users who (a) have access to view that document and (b) have chosen to subscribe to e-mail notification that they have new information to view on the website. Preferably, the email notification 2514 provides a direct link (e.g., a html link) to the newly posted information 2516; information 2516 may for example take the form of a loss prevention survey.

Responses to email notification 2514 may be received and processed by a response analysis application 2518, which uses the responses to automatically update the secure database 2520. The secure database 2520 may, for example, take the form of database 20 and graphics interface 16 shown in FIG. 1. Information from new surveys is automatically copied from database 2512 to database 2520.

Database 2520 may for example be accessed through interactive interface 16 (FIG. 1) to generate metrics and reports 2522 and a recommendations summary table 2524 (i.e., a high-level list of all outstanding recommendations for the data set relevant to the current user query). Reports 2522 and recommendations 2524 may for example be displayed on a computer screen as graphic data 34', FIG. 1. From the recommendations summary screen, the user may 'click' on a specific line of data (e.g., a specific recommendation) and access the recommendation comments screen 2526. Via comments screen 2526, a user may read an archived history of comments made relative to specific recommendations (or sub-recommendations) and may also make comments, adjust status, change intent, set target dates, access full text of the recommendations, review high level cost-benefit analysis information, access standards and guidelines, engage the system to e-mail the full text of the recommendation(s), summary data and/or comment history (collectively the "data sets" 2528). Changes to specific data sets 2528, namely the comments, status, intent, target dates, etc., are ported directly back to database 2512 for update and future access through messenger 2510.

A new status is verified at status verification 2530 by the remotely located field associate at the next survey 2502. At step 2532, if the user changes the status to "complete," the field associate verifies an appropriate completion, or rejects the completion and refreshes the status. If the recommendation is appropriately completed, the issue is closed and the status is "verified complete"—inactivating the recommendation, removing it from the queue, and reflecting appropriate completion on other data aggregation reports. If the recommendation is not completed according to proper guidelines, or according to user satisfaction, then the status is rejected and returned to a full active state with the field associate's comments appropriately logged. Information is updated via the rec builder at step 2538 and at the completion of the next survey, whereinafter the cycle of FIG. 25 starts again.

Figure 26:
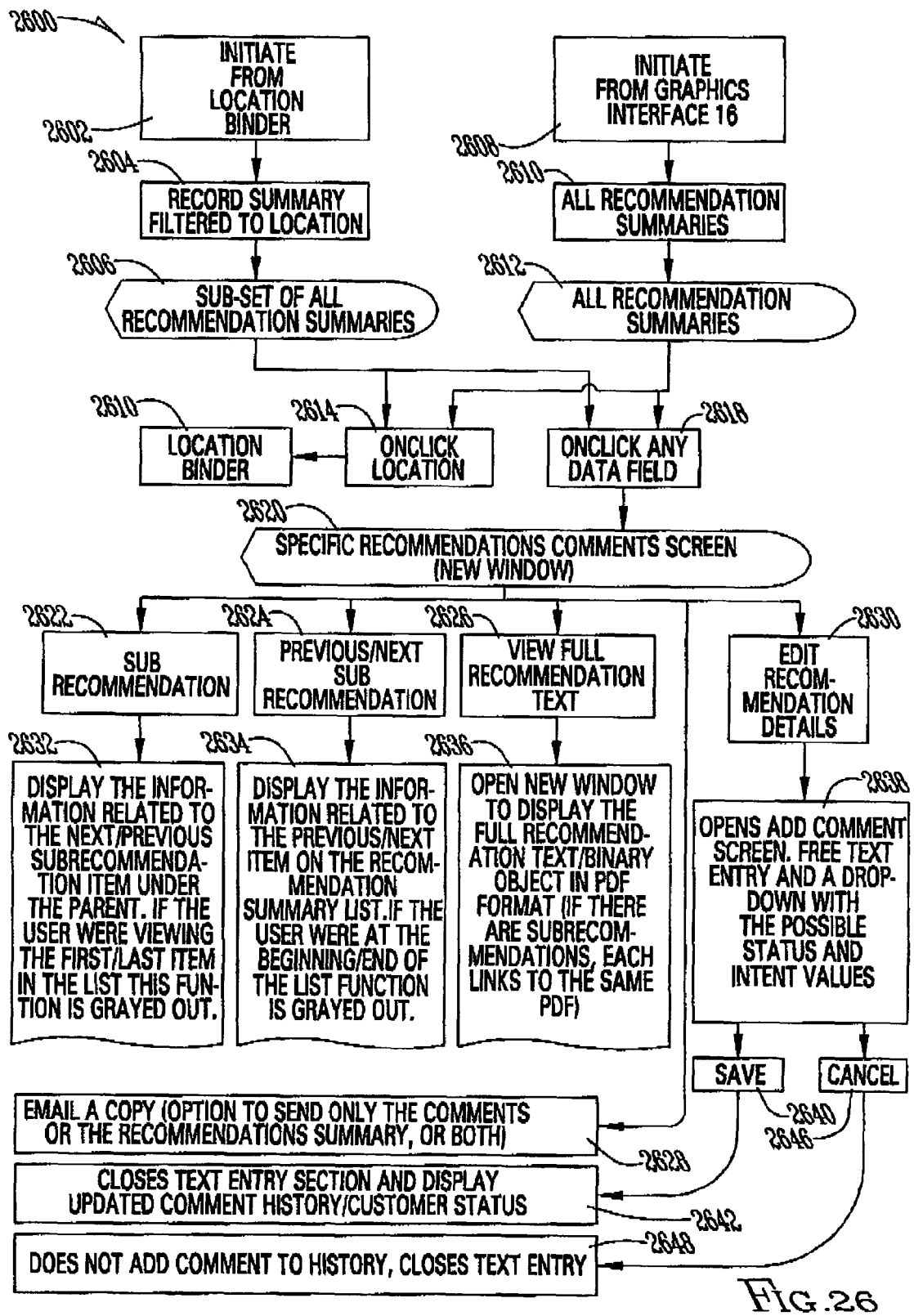
FIG. 26 shows a flowchart illustrating user access locations for interactive recommendations workflow in accord with one risk management interface system.

FIG. 26 shows a flowchart 2600 illustrating user access locations for interactive recommendations workflow in accord with one risk management interface system 10. "Onclick" annotation indicates user selection may be achieved through computer button clicks or menu selections relative to graphical user interfaces (e.g., at a computer 14, FIG. 1). Flowchart 2600 is similar to the flowchart of FIGS. 5-24 in providing drill-down specifications. Initiation 2602 occurs by onclick selection of a Location ID# field from the location binder. The location binder is a collection of summary information concerning a particular location with onclick links established, for example, to detailed information in the location snapshot. The graphical interface 16 for the location binder includes reporting information from data table 500E affording recommendation summary information, such as a count of recommendations for each location. Initiation 2602 filters 2604 the location binder information to provide a record summary report 2606 including, for example, additional detail for the recommendation summary information in the form of a count by type of recommendation, an ascending list of recommendations by date of recommendation, or other information from data table 500E. Alternative initiation 2608 may occur by onclick selection of a predetermined field from graphics interface 16 (FIG. 1). Alternative initiation 2608 causes system 10 to deliver 2610 recommendation summary information for all locations or for a division in the form of a graphical or tabular report 2610. Onclick selection 2614 of a location field from either of report 2606, 2612, returns 2616 the user to the location binder. Onclick selection 2618 of any other field from either of reports 2606, 2612, delivers report 2620 including all specific recommendations pertaining to the selected field and comments concerning those recommendations.

Onclick selections 2622, 2624, 2626, 2628 and 2630 of predetermined fields from report 2620 instigate downstream processing options. Onclick selection 2622 of a field captioned "Next/Previous Sub-recommendation" scrolls 2632 up or down through line items of report 2620. Onclick selection 2624 of a field captioned "Previous/Next Sub-recommendation" scrolls 2634 through line items of report 2620 in opposite direction to that caused by onclick selection 2632. Onclick selection 2626 of a field captioned "View Full Recommendation Text" opens report 2620 to display the full text in an exportable PDF file format. Onclick selection 2628 of a field captioned "Email a Copy" creates an exportable file including the contents of report 2620 (or a subset of those contents) as an email attachment that may be sent to an addressee of the user's choice. Onclick selection 2630 of a field captioned "Edit Recommendation Details" opens 2638 a data entry screen that permits the user to interactively edit data stored in data table 500E and other relevant data. The user may choose to save 2640 the revised data, which closes 2642 the data entry screen and displays the updated information on report 2620. Alternatively, the user may elect to cancel 2646 data entry, which closes 2648 the text entry screen without updating report 2620.

A robust account summary reporting engine capability arises from the foregoing data input and processing. This reporting permits improved creation, management, modification and tracking of recommendations that an agent may make to a customer for the adjustment of insurance coverage, e.g., according to risk assessment and survey practices, or on the basis of comparative data for a given location.

Figure 5H:
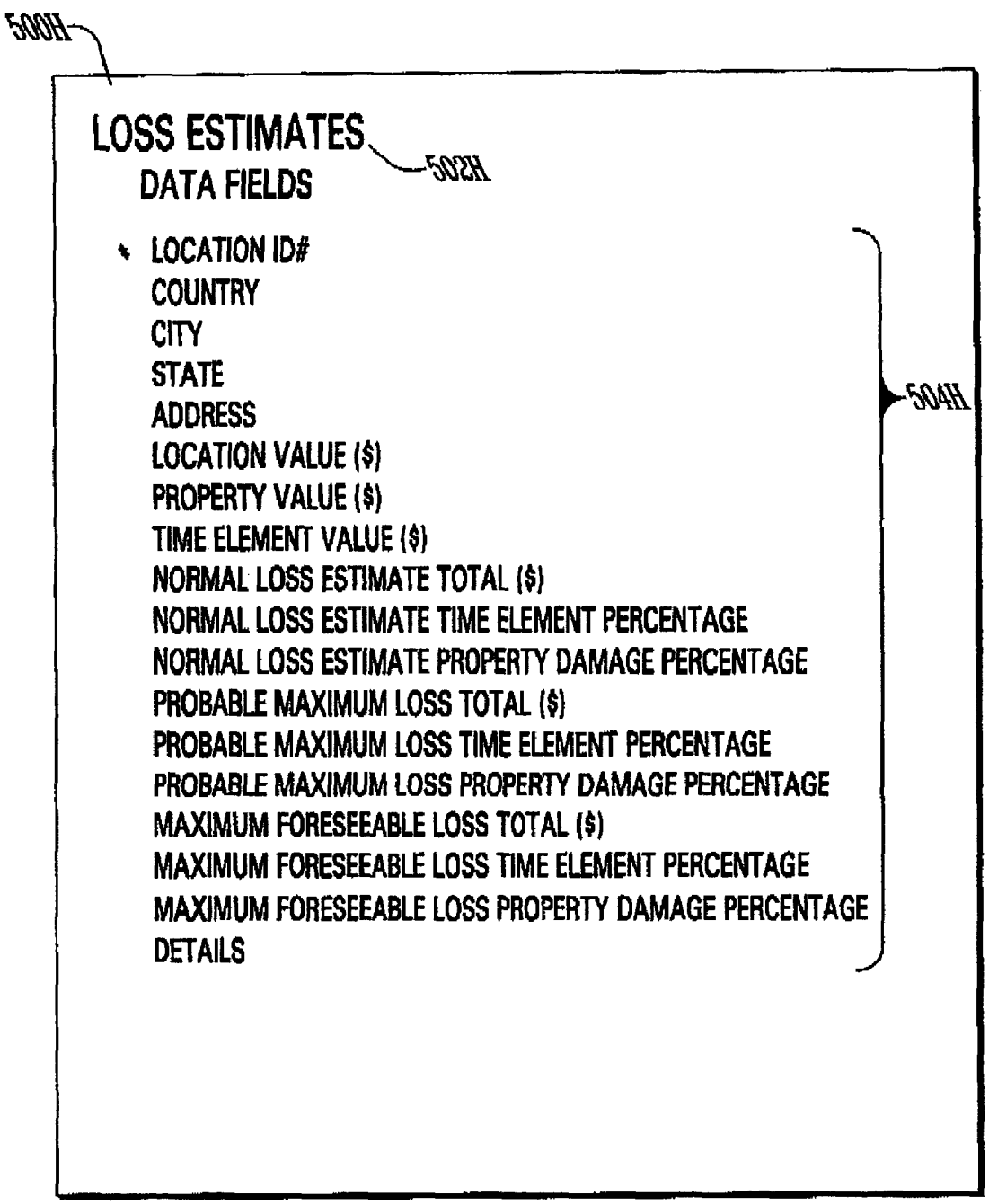
Figure 27:
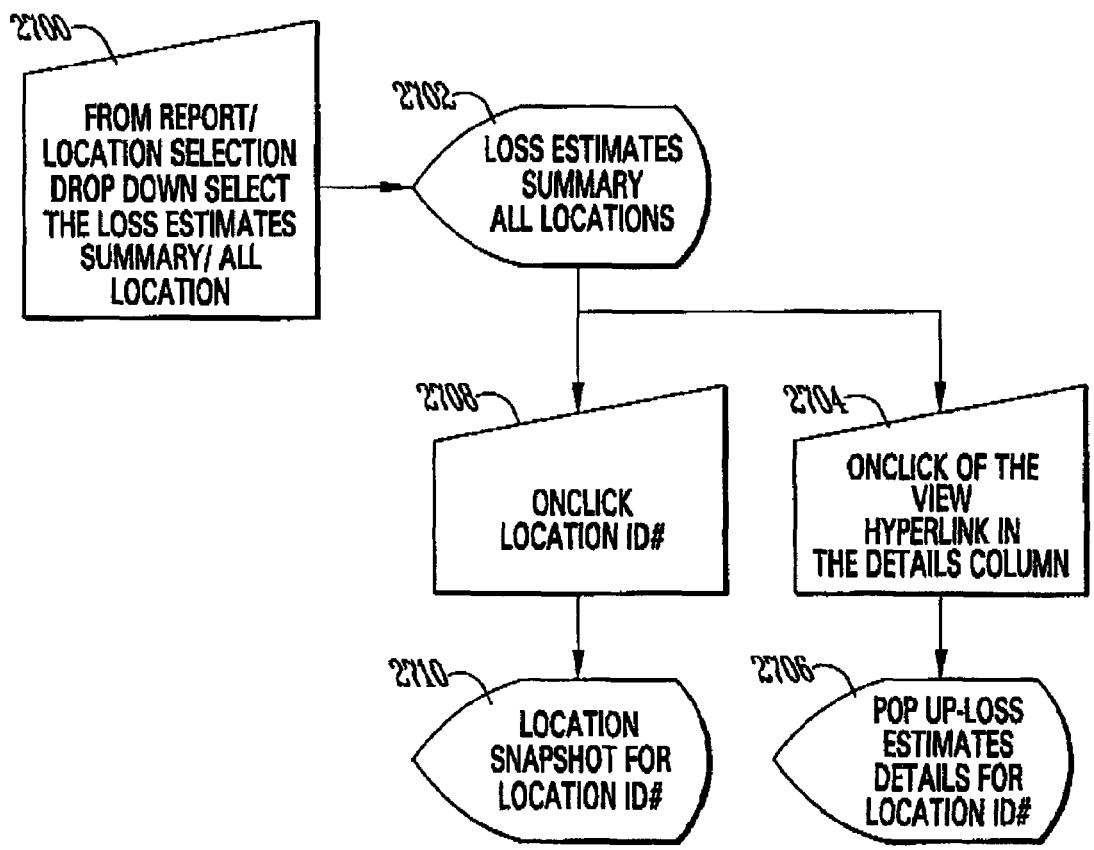
FIG. 27 is a flow chart of selectable menu options that are used in combination with the loss estimate report of FIG. 27 to provide a user-selectable drill-down summary reporting capability that links a graphics interface to a reporting engine.

Data table 500H, FIG. 5H, is specifically used within FIG. 27 for loss estimate summary reporting. Initiation 2700 occurs, for example, as a combination of predetermined report/scope options 200/202 shown in FIG. 2 to select a report captioned "Loss Estimates Summary/All Locations." System 10 delivers the report 2702, which may also be a filtered subset of loss estimate data for a subset of locations. The loss estimate summary report 2702 provides a report organized in columns having headers shown in FIG. 5H, where the table is sorted by Location ID#. For example, a Time Element Value is a cost in dollars of disrupted normal operations at a given location over a fixed period of time. A Property Damage Value is the value of the property. The Normal Loss Estimate is a statistically derived value for losses in similar categories of locations where normal loss prevention control features work as designed, and includes both time element and property damage components as percentages of the Time Element Value and the Property Damage Value. A Probable Maximum Loss is a statistically derived value for losses in similar categories of locations, representing the largest expected total gross loss resulting from a single failure event, and includes both time element and property damage components as percentages of the Time Element Value and the Property Damage Value. A Maximum Foreseeable Loss is a statistically derived value for losses in similar categories of locations, representing the largest expected total gross loss resulting from severely adverse conditions, and includes both time element and property damage components as percentages of the Time Element Value and the Property Damage Value.

Drill-down functionality from the loss estimate summary report 2702 is achieved by onclick selection 2704 of a "Details" field allocated to a specific location ID# to produce a pop-up report 2706 that contains data, such as the loss scenario and estimates description that were input to arrive at and justify the loss estimates. Onclick selection 2708 of the Location ID # field directs the user to the location snapshot report 2710.

Figure 28A:
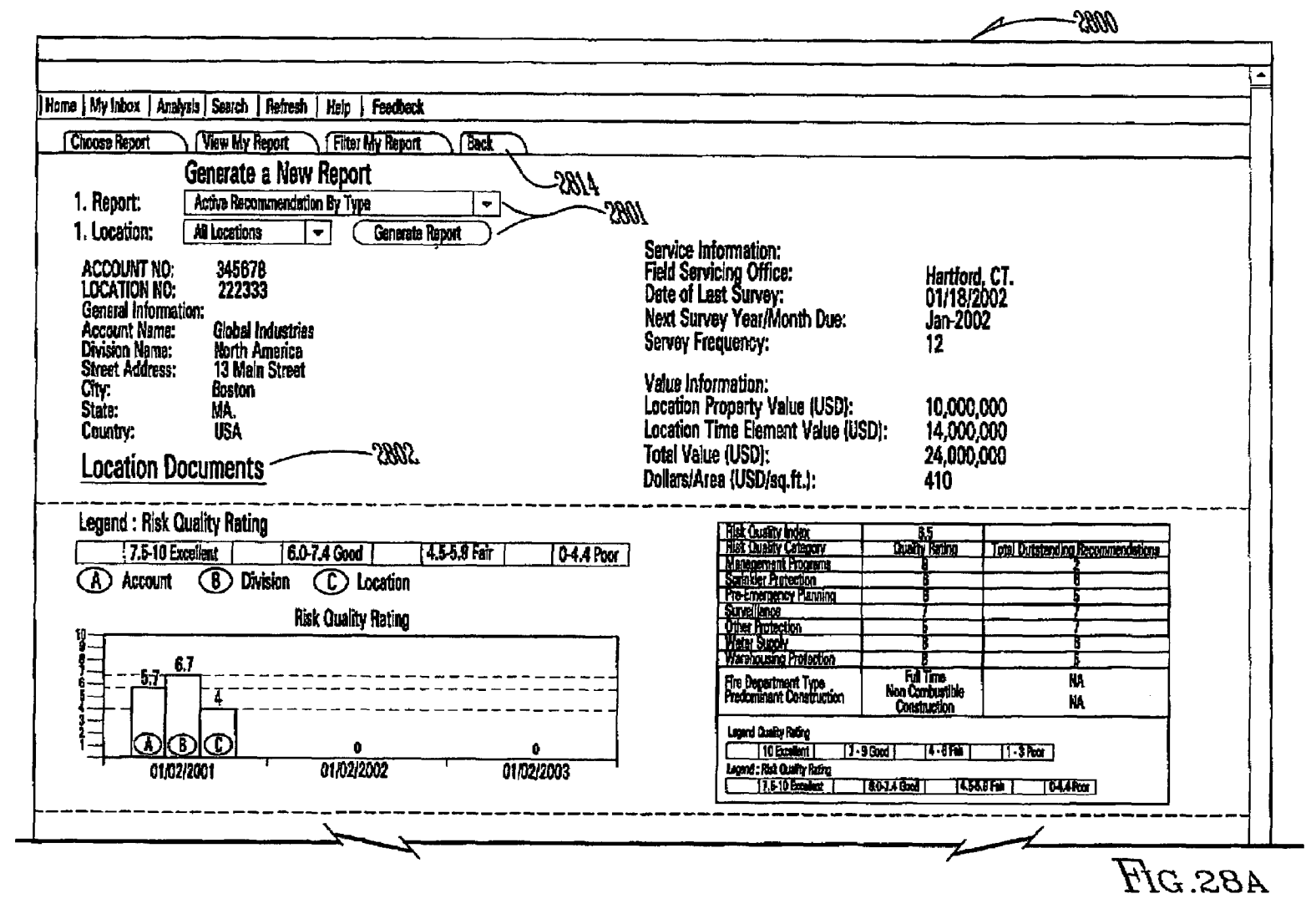
Figure 29:
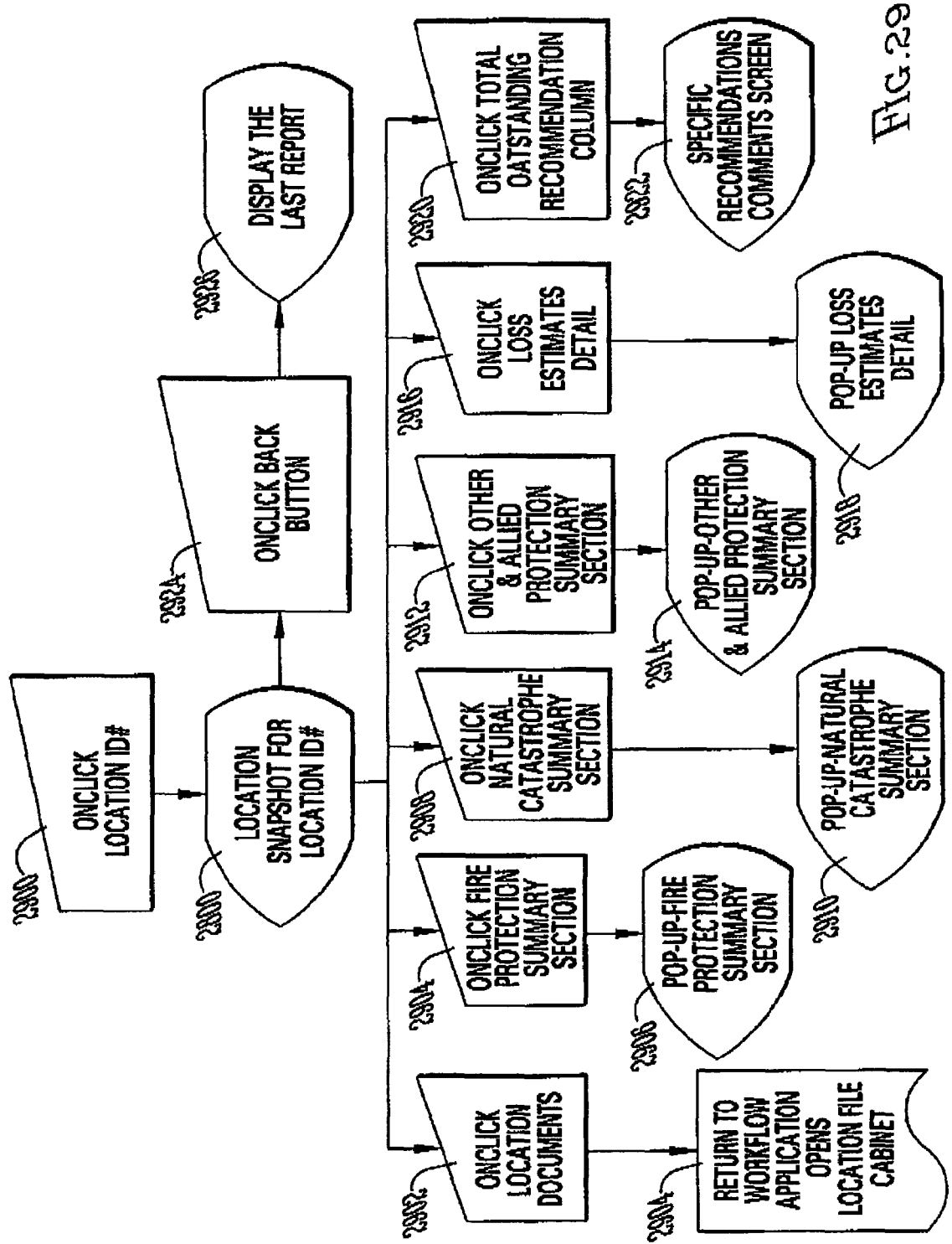
FIG. 29 is a flow chart of selectable menu options that are used in combination with the location snapshot report of FIG. 31 to provide a user-selectable drill-down summary reporting capability that links a graphics interface to a reporting engine.

FIGS. 28A, 28B and 28C collectively illustrate one location summary report 2800 discussed above. The general format of location summary report 2800 is that of a general reporting feature 2801 from which any report on system 10 may be accessed. As shown in the location snapshot report 2800, the general reporting feature 2801 has been accessed to generate the location snapshot report 2800, and stands ready to generate the next report, e.g., an "Active Recommendation By Type" report. The location summary report produces summary level information for a selected location. In addition to being a report, the location summary report 2800 is also a graphical user interface capable of processing user selection commands for drill-down reporting functionality. FIG. 29 illustrates the processing of user commands from the location summary report 2800.

As shown in FIG. 29, and as described above, onclick selection of any Location ID # field in reports from any of data tables 500A through 500H delivers the location summary report 2800. Onclick selection 2902 of field 2802 (shown in FIG. 28A) of "Location Documents" opens 2904 the data input screens of the Workflow Application for the selected location to permit adjustment of data input for reporting purposes. Similarly, onclick selection 2904 of field 2804 (shown in FIG. 28B) for "Fire Protection Summary Section" retrieves a pop-up report 2906 of the fire protection summary data from data table 500C, for example, including textual descriptions of the automatic sprinkler data, the descriptions of water supplies available for fire-fighting, and property surveillance mechanisms in place for fire detection. Onclick selection 2908 of field 2806 (shown in FIG. 28B) for "Natural Catastrophe Summary Section" produces a pop-up report 2910 including a summary of data entered according to FIG. 5G and FIG. 26. Onclick selection 2912 of field 2808 (shown in FIG. 28B) for "Other & Allied Perils" produces a pop-up report 2914 of text describing other insurance policies that may be issued or considered, such as for hail damage and loss of power. Onclick selection 2916 of field 2810 (shown in FIG. 28C) produces a pop-up report 2918 of detailed information used to provide loss estimates (FIG. 500H). Onclick selection 2920 of any field within column 2812 (shown in FIG. 28C) produces a pop-up report 2922 listing specific recommendations for insurance coverage adjustments that have been prepared for the customer (FIG. 500E).

All reports 2904, 2910, 2914, 2918, 2922 may be interactively edited for adjustment or modification, as deemed desirable by the user. The user can seamlessly switch from any of these reporting functions by onclicking of a "Back" button (not shown) on reports 2904, 2910, 2914, 2918, 2922 for return to the location snapshot report 2800. In the same manner, onclick selection 2924 of a back button 2814 (FIG. 28A) displays 2926 the previous report, for example, one of reports 2904, 2910, 2914, 2918, 2922.

Data fields for the location summary report 2800 are shown in FIG. 51. The location summary report summarizes raw input data for all locations sorted by Location ID# and is accessed from the main reporting window location of system 10, for example, as shown in FIGS. 28A, 28B and 28C. Information presented in the location summary report 2800 may include the contents of data table 5001, as well as the results of processing raw data from data tables 500A through 500H and 500J, for example, in the recommendation summary count of column 2812.

Figure 30:
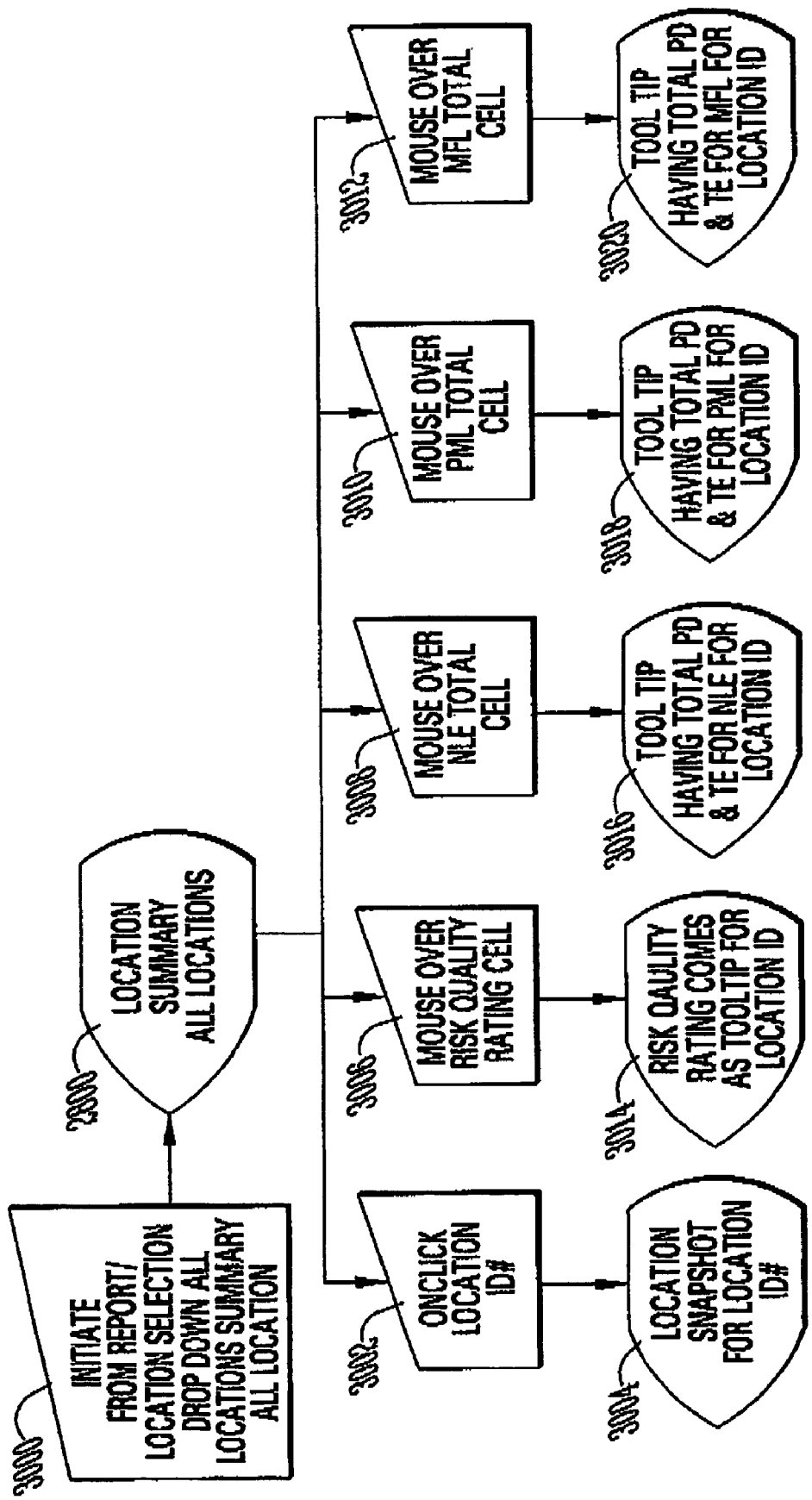
FIG. 30 is a flow chart of selectable menu options that are used in combination with the location summary report of FIG. 31 to provide a user-selectable drill-down summary reporting capability that links a graphics interface to a reporting engine.

FIG. 30 is a flow chart illustrating user selectable down-drill report processing that is available from the location summary report 2800 shown in FIGS. 28A through 28C. For example, reporting is initiated 3000 by user selection of options for predetermined (system available) reporting functionality 2801 (FIG. 28A), which may include, for example, user-selectable combinations of report type and location. The selected reporting option delivers the location summary report 2800, for example, representing data for all locations available to the user. The report type may produce an intermediate menu (not shown) that facilitates user-selected filtering of location data based upon any data parameter in data tables 500A through 500J. Onclick selection 3002 of a particular location ID# produces a location snapshot report 3004. Mouse-over selection of any cell in the location summary report 2800, such as mouse over selections 3006 (risk quality rating), 3008 (NLE; normal loss total estimates), 3010 (PML; probable maximum loss total estimates) and 3012 (MFL; maximum foreseeable loss total), produces a corresponding pop-up report referred to as a "tool tip," which explains the value to the user and how it may be used or applied according to expert instructions. The corresponding reports are, by way of example, a report of risk quality rating 3014, total property damage and time element damage estimates that combine to form NLE Total 3016, total property damage and time element damage estimates for PML Total 3018, and total property damage and time element damage estimates for MFL 3020, The mouse over selection functionality permits the user to see the reports without having to actually click on the field, and this functionality provides a quick and seamless way to access the reported data.

Figure 31:
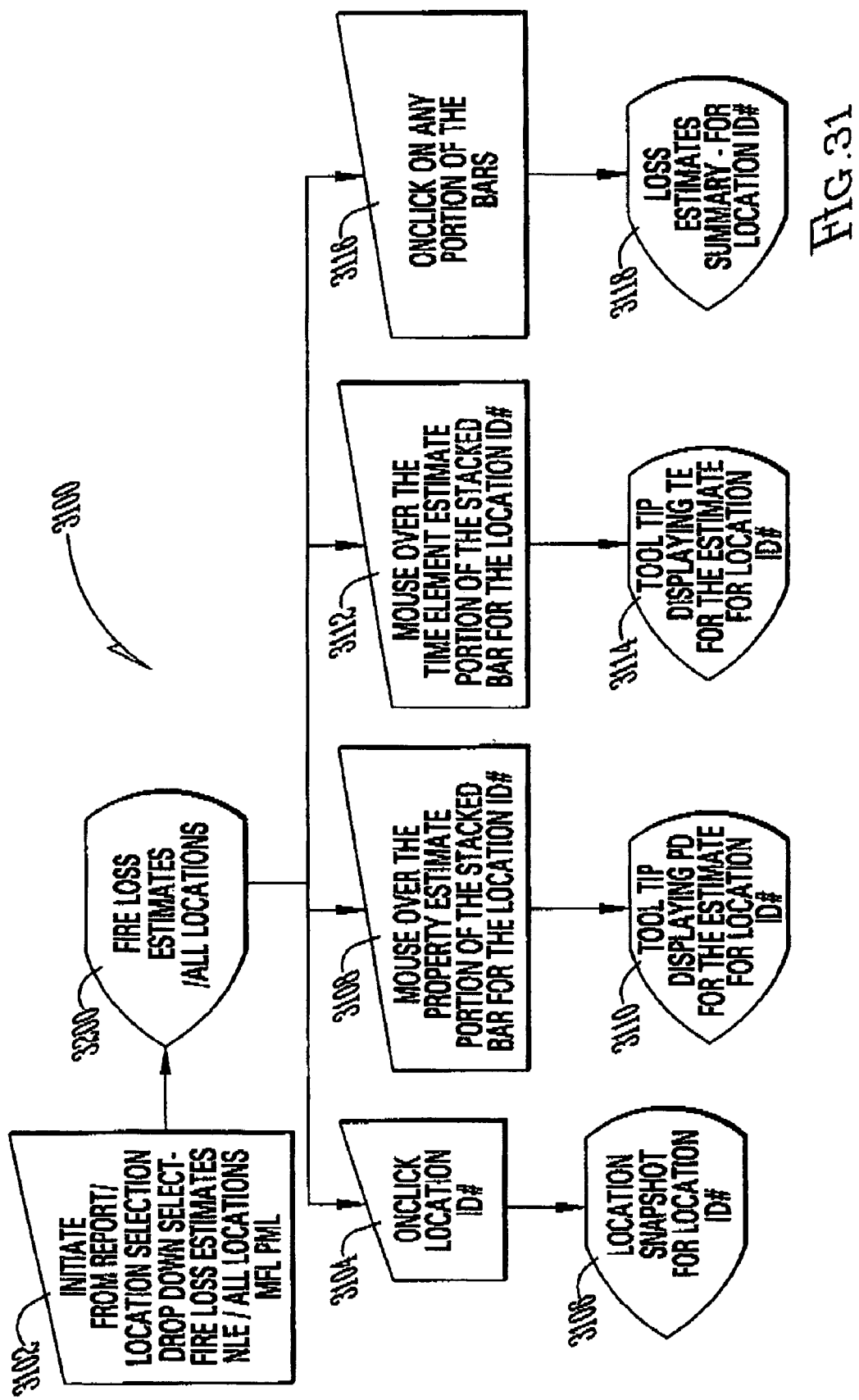
FIG. 31 is a flow chart of selectable menu options that provide a user-selectable drill-down summary reporting capability that links a graphics interface to a reporting engine for fire loss estimate reporting purposes.
Figure 32:
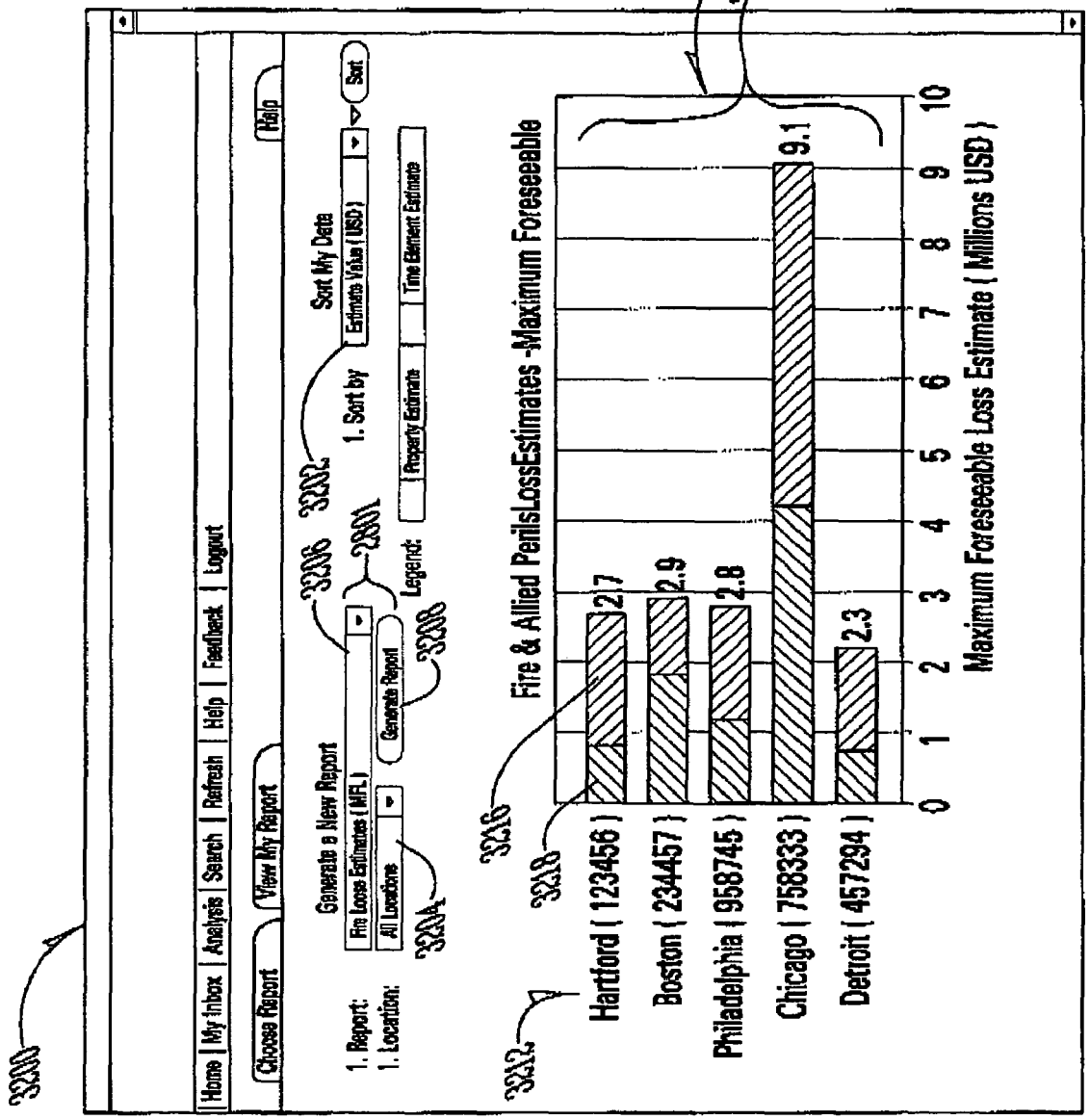
FIG. 32 is a summary report comparing filtered fire loss data.

FIG. 31 illustrates a fire loss reporting capability 3100 that may be accessed from the general reporting functionality 2801. The processes of FIG. 31 are initiated 3102 through the general reporting functionality 2801. As shown in FIG. 32, the general reporting functionality 2801 differs from that shown in FIGS. 28A through 28C, in that FIG. 32 shows a fire loss estimate report 3200 obtained by user-selected options in the general reporting functionality 2801. The fire loss estimate report 3200 contains additional reporting features, such as user-selectable sort criteria 3202. Sort criteria 3202 permit, for example, sorting by normal loss total estimates (NLE), maximum foreseeable loss total estimates (MFL), and probable maximum loss total estimates (PML). Additional sorting or filtering may be selected through use of fields 3204 (location filter) and 3206 (report type) to provide comparison reports for any two combinations of data from data table 500H. This reporting capability may be used to compare and adjust any relevant information in the system to provide user-specific or company-specific weighted averages to compare system inputs against normalized, average, or anonymous information within the same industry, occupancy group, or product line. For example, the NLE for each location may be summed by city and averaged, as may property value. This reporting feature permits the user to compare statistically processed data when selecting a value for a proposed input, e.g., by adjusting weighted benchmarking formulae to compare data including:

1) proposed data elements against other data elements across facilities, surveys, and recommendations; and 2) multiple data elements from one source aggregated through a statistical analysis formula of the users' choosing against comparable normalized data elements from other sources.

Fire loss estimate reporting initiates 3102 with user selection of options 3204, 3206 and onclick selection of the generate report button 3208. The resulting fire loss estimate report 3200 contains a bar graph 3210 that summarizes data according to the selected sort criteria 3202 for a plurality of locations in location axis 3212. The bars 3214 are each composed of two sections including a maximum property damage loss estimate portion 3216 and a time delay loss estimate portion 3218.

Onclick selection 3104 of any element from the location bar 3212 causes a display 3106 of the location snapshot report 2800 . . . Mouse-over movement 3108 on a property estimate portion 3216 produces a tool tip 3110 displaying information that includes the numbers upon which the estimate is based. The description of the estimate, and expert tips on how the value can be applied or used. Similarly, mouse-over movement 3112 on the time element estimate 3218 produces a tool tip 3114. Onclick selection 3116 on either portion 3216, 3218 may further produce a loss estimate summary report with column headings as shown in FIGS. 28A through 28C.

Figure 33:
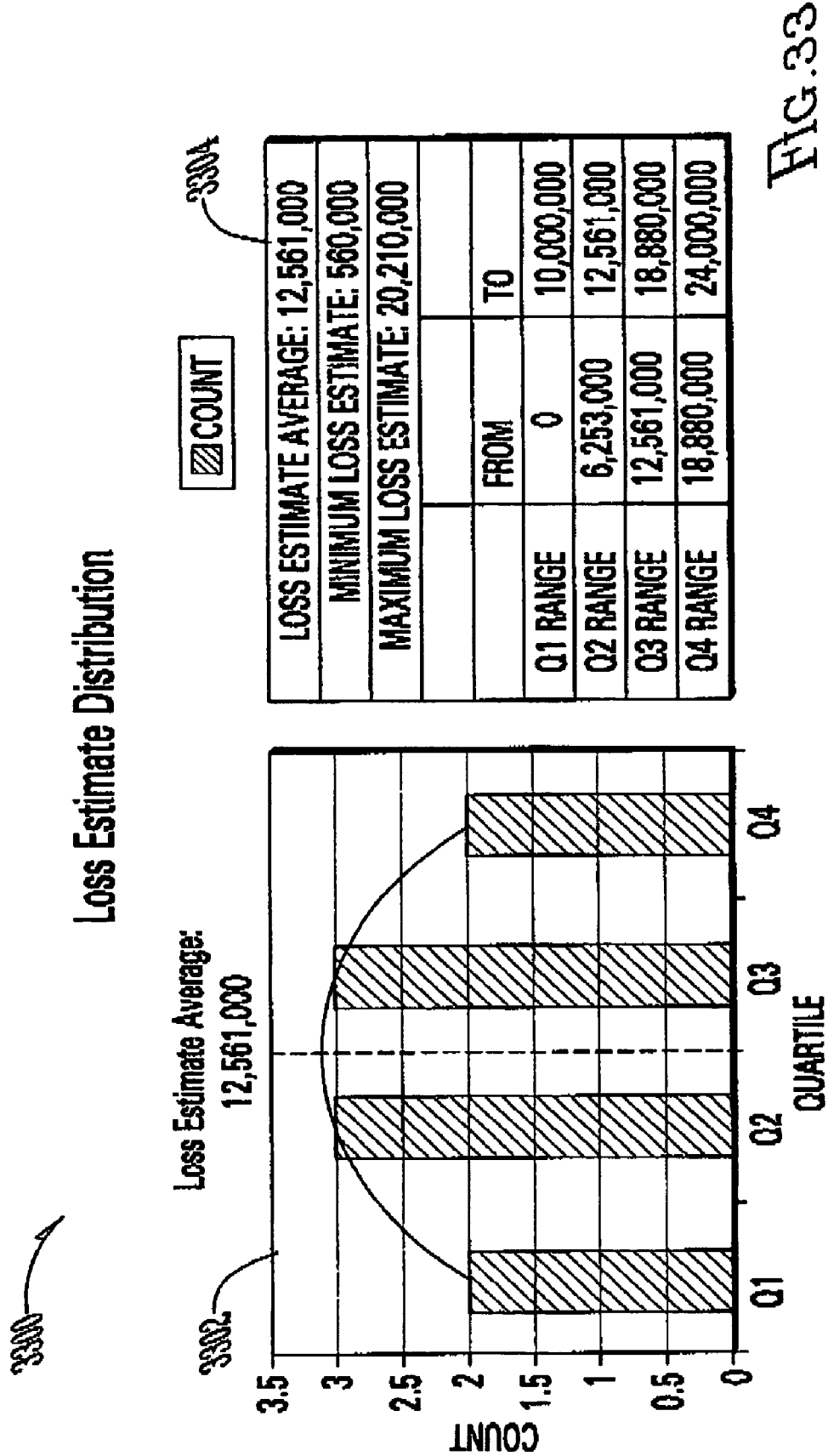
FIG. 33 is a bar graph presenting filtered data that has been subjected to statistical processing for risk management evaluation.

In some contemplated embodiments, onclick selection of the generate report button 3208 produces an additional graphical report of statistically processed data, such as a bar graph 3300 shown in FIG. 33. All loss estimates that are selected by user-interactive screening and filtering processes may be subjected to conventional statistical processing techniques, for example, to produce a weighted average of the data divided into quartiles presented graphically in part 3302. Part 3304 includes a summary of statistical data and calculation results used to prepare part 3302. The data may also be presented as a pie chart or any other visual display or tabular report that is commonly used to present statistical information. This type of presentation is especially useful in helping users or customers select a level of insurance that is appropriate to their situation. The displayed chart or graph 3300 can be converted into different views based upon user selection (i.e., pie chart, 3D, bar, line, scatter, bubble, variance, waterfall, etc.)

The aforementioned functionalities, which are made available by the reporting engine 27, permit the user to utilize user-specified or company-specified weighted averages to compare users' information against normalized, average, anonymous information within the same industry, occupancy group, or product line. The normalized, average, anonymous information may, for example, be stored in the database 20 and filtered through filters 40( ) using software on computers 14( ), as shown in FIG. 1, to provide the reporting engine. These ad-hoc reports may be selectively saved and shared with peers on network 18. Users can construct reports and related surveys with specific questions and discrete or open-ended answers, send that survey out to network peers, prompt for action and follow-up, and request a response. Network 18 permits a peer to enter information about his or her people, processes, or property according to another user's prompting, which facilitates sharing of expertise among a group of peers. Database 20 stores and retrieves this information for risk management purposes. Thus, the results of customized surveys and reports are available documenting survey responses.

In operation, users can manipulate recommendation cost benefit analysis information to reconcile the informational content of database 20 with actual events. This provides improved predictive accuracy by comparing, for example, total loss estimates before damage occurs versus actual total loss after damage occurs; property damage loss estimates before damage occurs versus actual property damage loss after damage occurs; business interruption loss estimates before loss occurs versus actual business interruption loss after loss occurs; estimated cost to complete repairs (by estimate source) versus actual cost to complete; estimated probabilities of loss (by source) or percentages of cost versus actual probabilities of loss or percentage cost. Customers can also be provided with estimated risk reduction numbers which, for example, represent statistically based comparators, such as:

(1) Risk reduction=[(property loss before+business interruption loss before)−(property loss after+business interruption loss after)−Estimated Cost to Complete].

Along similar lines, trends in database content inaccuracies may be used as a predictive tool by logging and archiving historical adjustments any information that is adjusted by these processes, for example, historical probability and estimated cost to complete numbers.

When system 10 is used to provide a recommendation, users are available to asses the recommendation by viewing the impact upon the facility's overall risk quality rating or sub-rating of completing a particular recommendation based upon parameters developed to assess these factors if the recommendation is adopted. The recommendations are automatically prioritized according to which ones have the highest impact according to these parameters.

When customers are permitted to access computers 14( ) directly, they can enter any of the information that an agent would enter, such as entry of a dollar value representing their total insurance premium dollars for property insurance that is factored against the weighted averages for estimated losses to allocate their total premium dollars to individual facilities. The weighted average may be factored, for example, as a percentage of the property damage value of the individual facility; the business interruption damage value of the facility; the insured value of the facility; or a subjective rating of 1-10 (called a user's 'tilt') to quantify the overall value of the facility.

In one embodiment, the structure of database 20 permits users to assign tasks to peers. Tasks include providing recommendations to specified clients for specified locations and assigning a survey completion date. Calendar-based tracking of the assignments and individuals Are monitored in a standardized report that identifies, survey type (name), target date, and current status (accepted, rejected, completed, delayed, etc.). A user can create customized reports that contain questions and discrete and/or open-ended criteria on behalf of a customer. These are linked to the risk information database 20 and email server 90. Remotely located associates or network peers may be tasked to collect information at the customer's request, for example, when the associate inspects a customer's facilities. Database 20 can be structured to contain customer-specific customized templates for the associate's entry of information into a client-side database for seamless uploading into the risk management database 20 facilitated either by email server 90 or a web-based interface to network 18 for delivery of the information collected by the remotely located field associate. Alternatively, a customer can access one of computers 14( ) to provide information, such as recommendations and associated valuations, switching seamlessly between cost-benefit analysis, summary, and status screens.

Figure 5J:
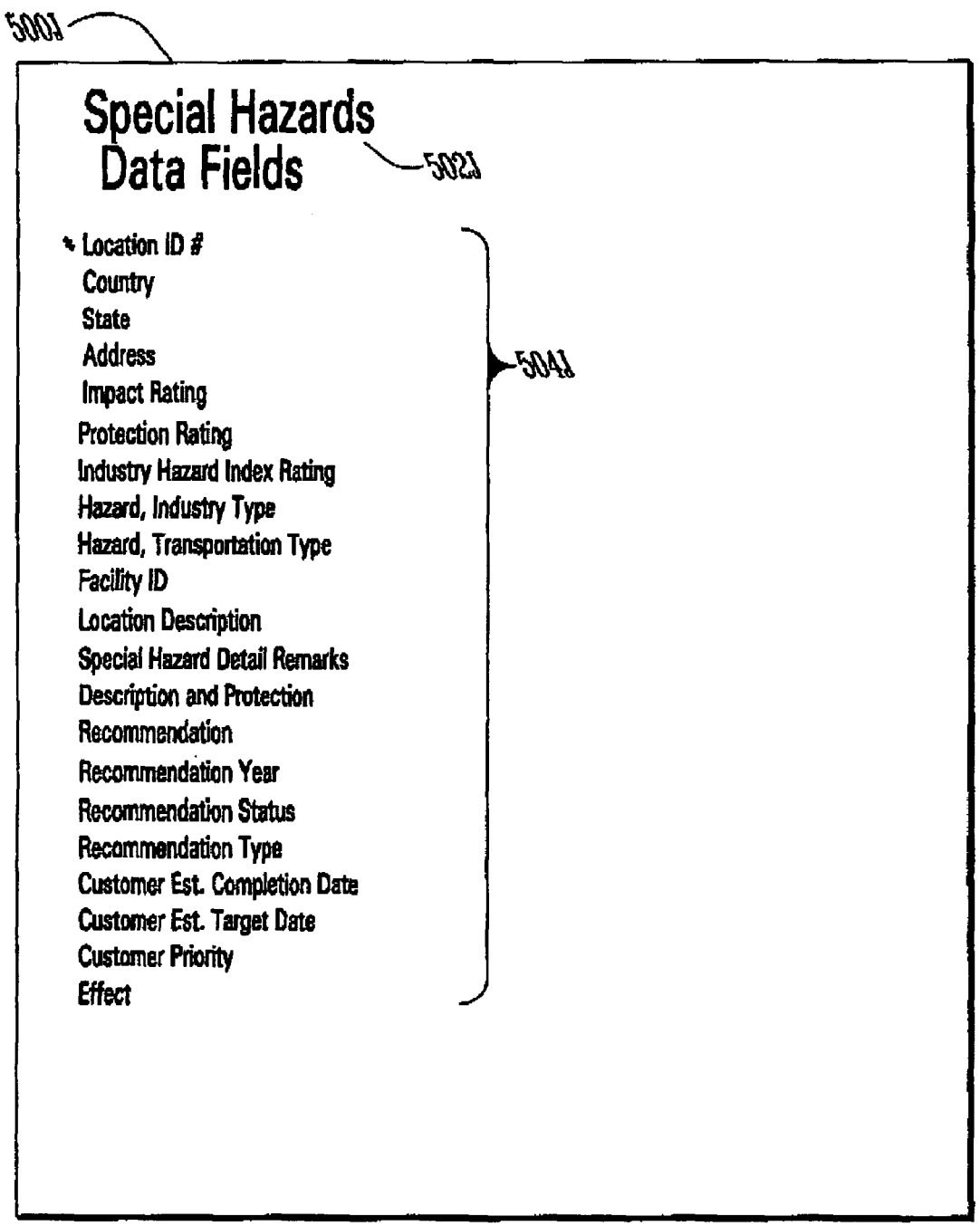
Figure 37:
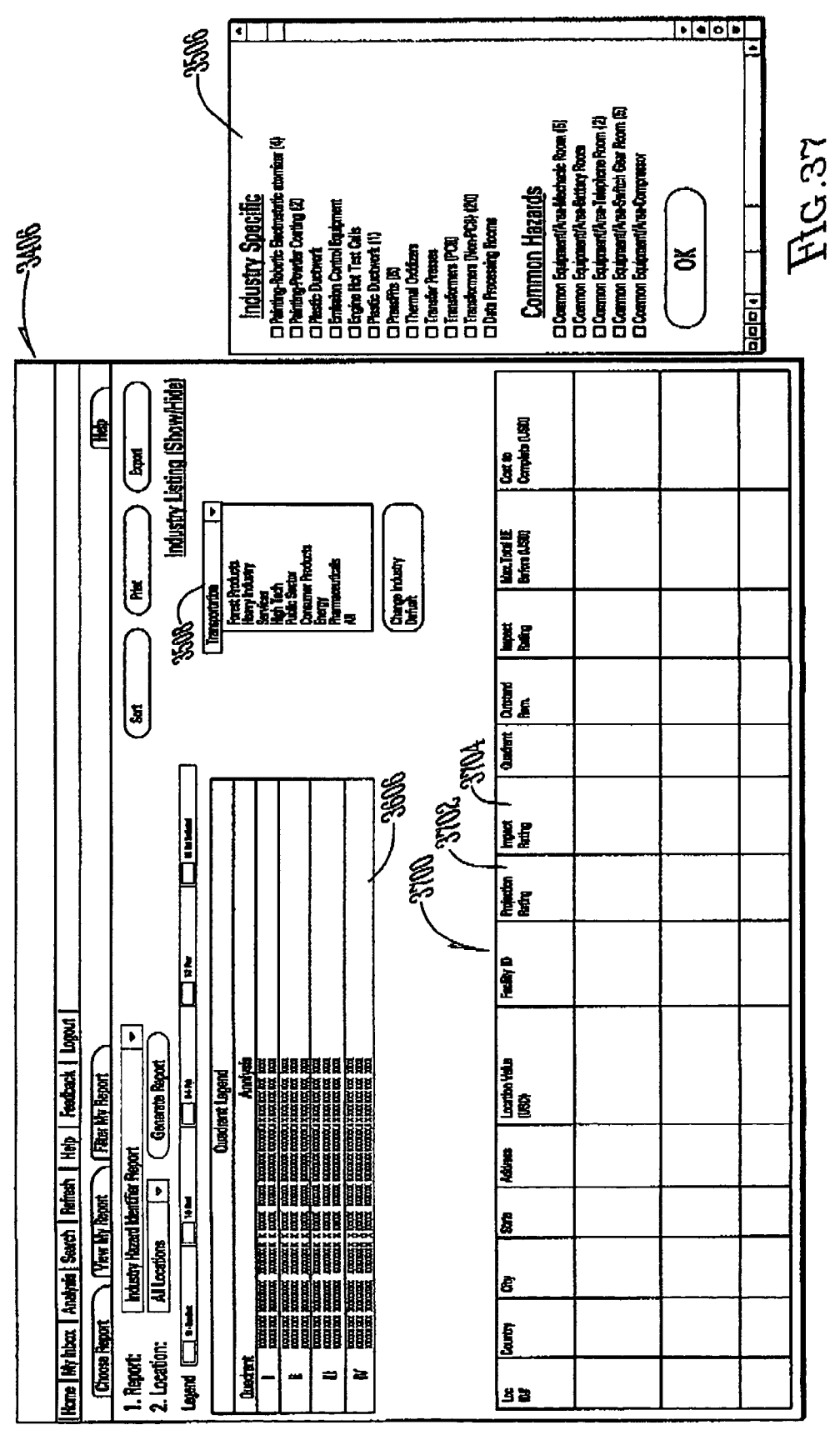

Each location within system 10 may be exposed to risk from special hazards that arise due to the nature of activity at the location or environmental factors. Data table 500J, FIG. 5J, is specifically used within FIG. 34 for loss estimate summary reporting. Initiation 3400 occurs, for example, as a combination of predetermined report/scope options 200/202 shown in FIG. 2 or using the reporting functionality 2801. The user chooses one of three predetermined reports 3402 (an Industry Hazard Index Report; FIG. 35), 3404 (an Industry Hazard Identifier Report; FIG. 36), and 3406 (an Industry Hazard Summary Report; FIG. 37). In the discussion below, the notation XXXX is used to indicate a report, e.g., report

3404. The suffix notations ', ", '" are used to indicate report of identical schematic nature that differ from one another by the data content, e.g., as XXXX' and XXXX".

The reports 3402, 3404, 3406 are filtered to represent data within the specified scope selected by initiation 3400. Onclick selection 3408 of any location element on location bar 3500 in the Industry Hazard Index Report 3402 drills-down to an Industry Hazard Identifier Report 3404' that is identical to Industry Hazard Identifier Report 3404, except it is filtered for data pertaining only to that particular location. Onclick selection 3410 of a graphical hazard representation on report 3404, e.g., diamond 3600 representing a single hazard, produces a Hazard Details Report 3412 (see FIG. 38) for that hazard. Onclick selection 3414 of another graphical hazard representation on report 3404, e.g., circle 3602 representing an overlapping hazard, produces an Industry Hazard Summary Report 3406' (identical to report 3406 shown in FIG. 37) for the overlapping hazards. Onclick selection 3416 of any cell in a facility ID column 3700 delivers a Hazard Details Report 3412' (see FIG. 38).

Onclick selection 3418 of a graphical hazard representation on report 3404, e.g., diamond 3600 representing a single hazard, produces a Hazard Details Report 3412" (see FIG. 38) for that hazard. Onclick selection 3420 of another graphical hazard representation on report 3404, e.g., circle 3602 representing an overlapping hazard, produces an Industry Hazard Summary Report 3406" for the overlapping hazards. Onclick selection 3422 of any cell in a facility ID column 3700 delivers a Hazard Details Report 3412" (see FIG. 38).

Onclick selection 3424 of any cell in the facility ID column 3700 delivers a Hazard Details Report 3412''' for that hazard.

Figure 34:
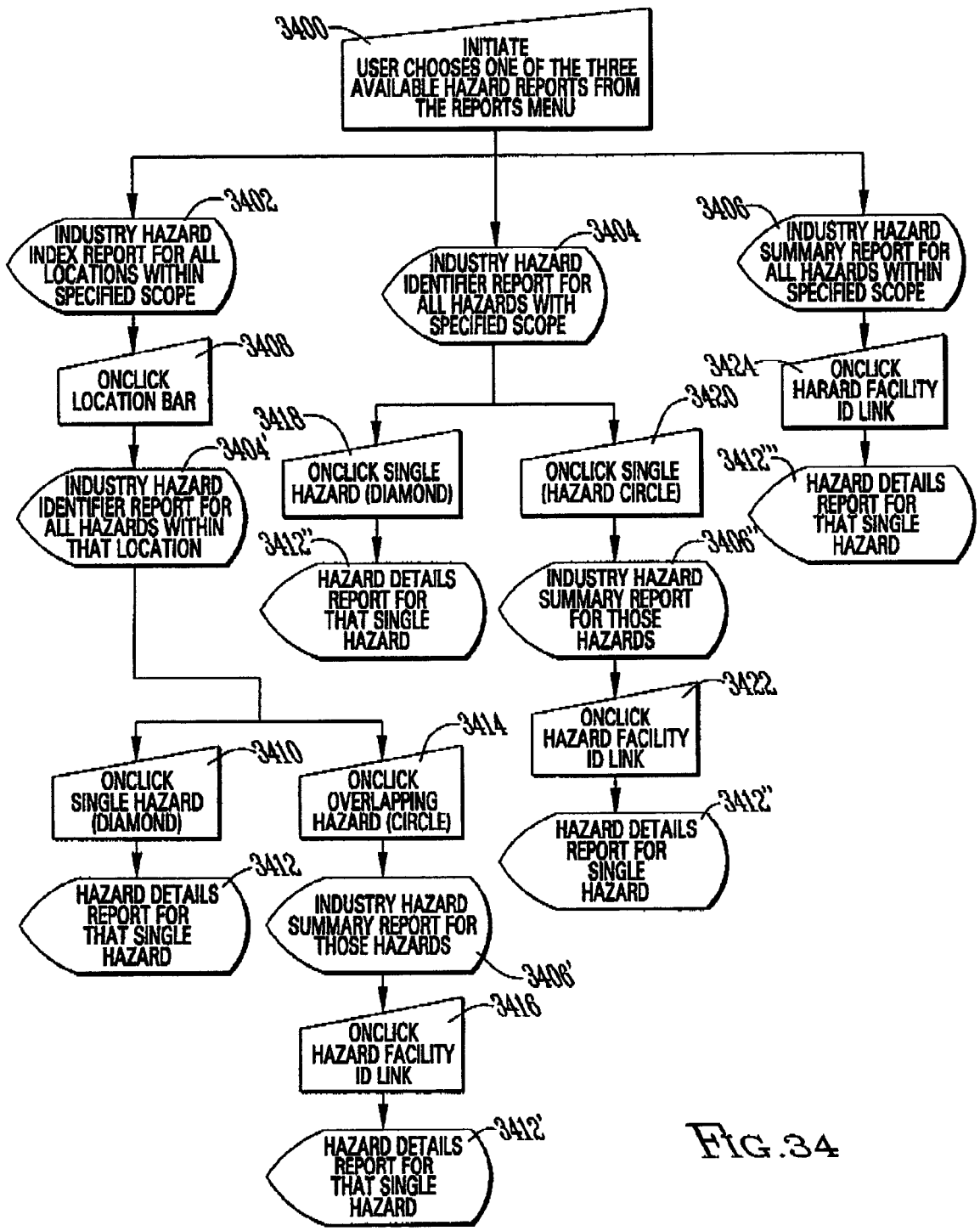
FIG. 34 is a flow chart of selectable menu options that provide a user-selectable drill-down summary reporting capability linking a graphics interface to a reporting engine for special hazard reporting purposes.
Figure 35:
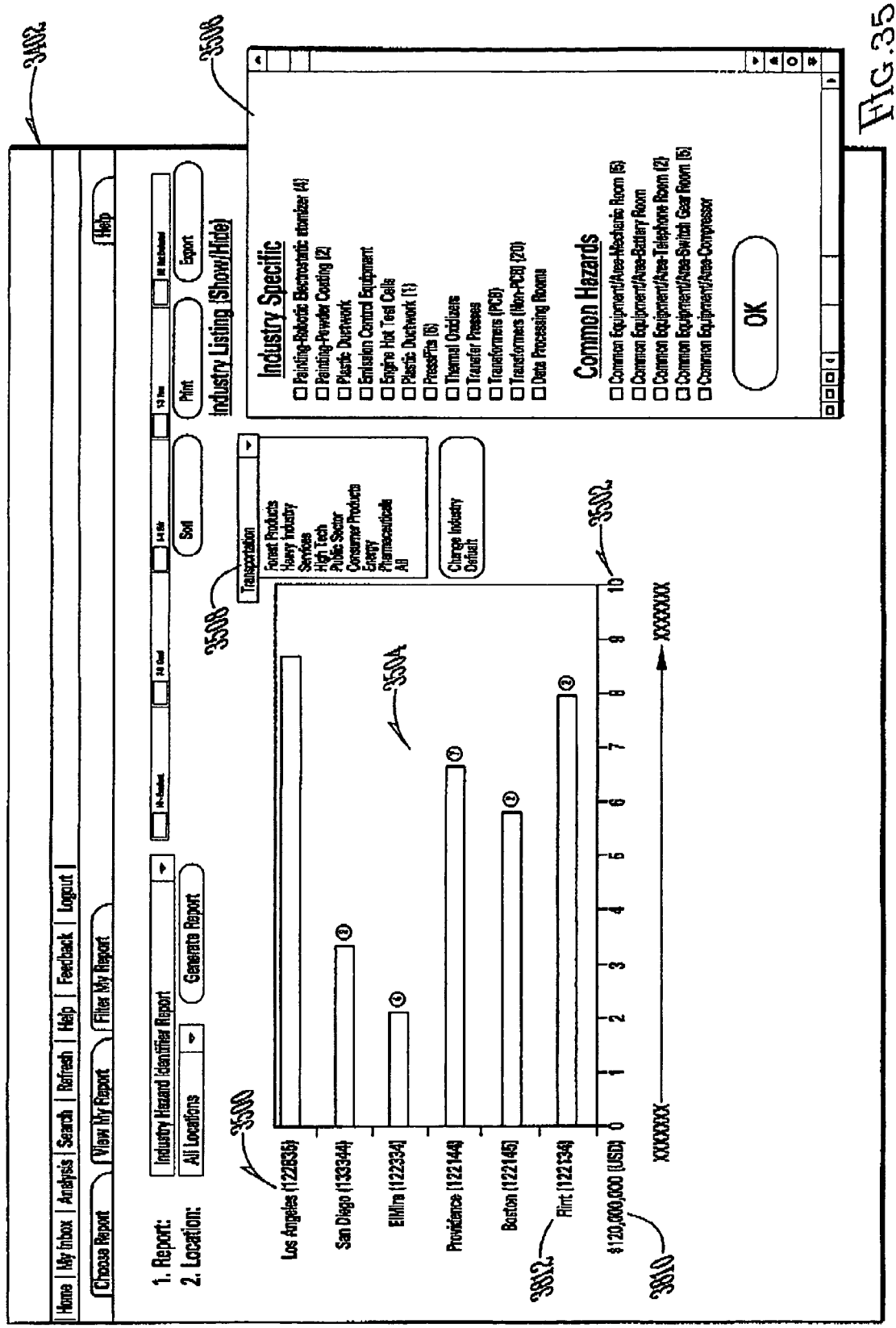
FIG. 35 illustrates an industry hazards index report that is delivered by the processes shown in FIG. 34.
Figure 36:
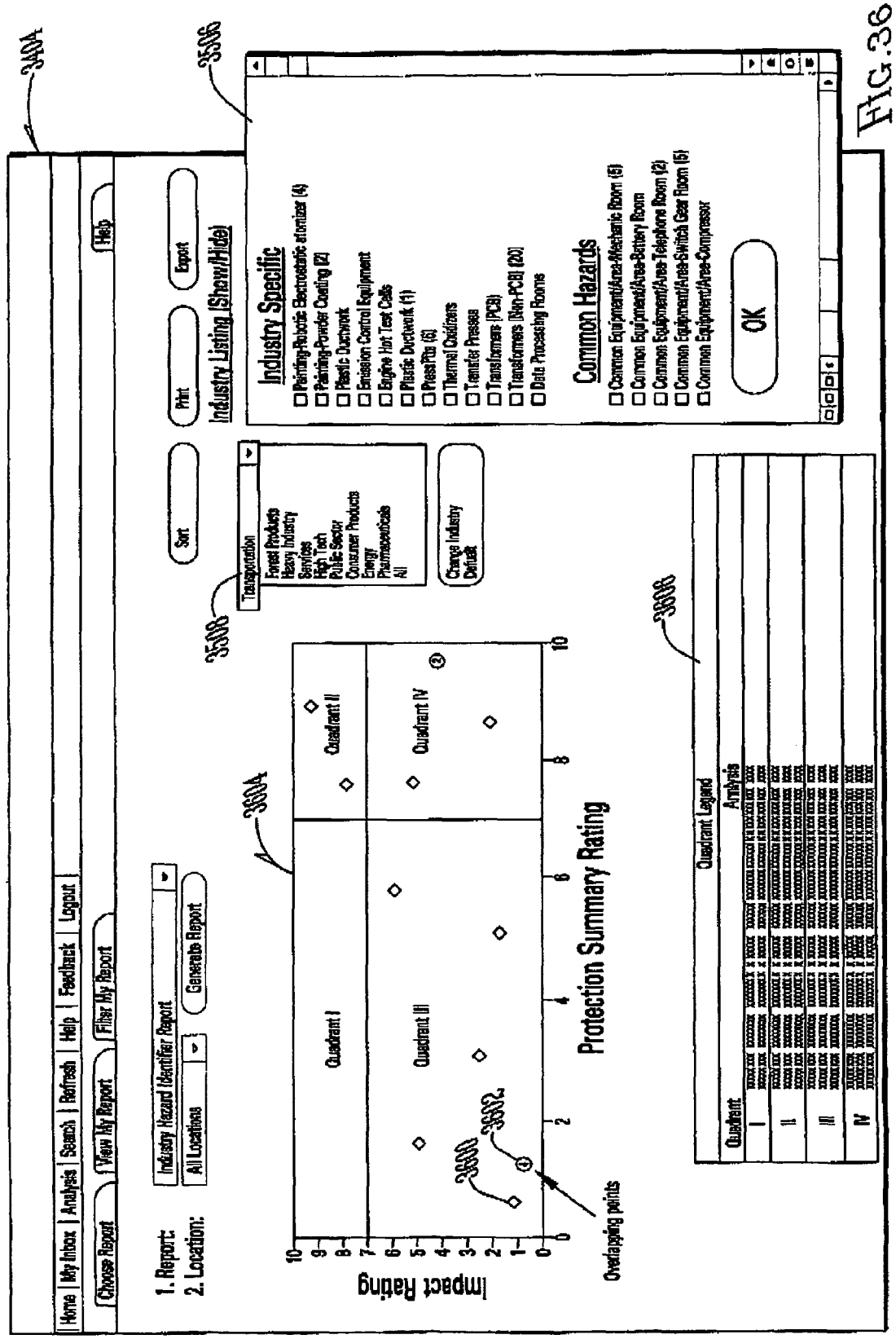
FIG. 36 illustrates an industry hazards identifier report that is delivered by the processes shown in FIG. 34.

As seen in FIG. 35, the reporting functionality of FIG. 34 provides an aggregate industry hazard index rating axis 3502 based on the protection ratings 3702 and impact ratings 3704 (see FIG. 37) for the special hazards at each location. The index ratings are displayed, for example, sorting by site in graphical format using a horizontal bar chart. A pull-down menu 3506 lists recognized industry-specific hazards. Another pull-down menu 3508 lists transportation-specific hazards. Mouse-over selection of fields on report 3402 may provide tool tips, for example, tool tip 3810 showing a dollar value for location 3812.

FIG. 36 shows report 3404, which plots the impact rating versus the protection summary rating in a quadrant chart 3604. A legend 3606 explains the significance of the respective quadrants. Report 3406 shown in FIG. 37 operates on data from data table 500J. Report 3412 shown in FIG. 38 reproduces data from data table 500J.

The following definitions in Table 2 may be useful in understanding terminology described above:

TABLE 2

DEFINITION OF TERMS

| Term/Phrase/ Abbreviation | Meaning |
|---|---|
| Country, State, Address | Geographical location of an account location |
| Location ID | A six digit number that is assigned to each location |
| Facility ID | Description of the Special Hazard as the customer identifies it, eg: Paint Booth 1. |
| Type | Type refers to the type of the special hazard, eg "Painting, manual" |
| Status | Refers to the status of the special hazard such as "Active", "Inactive" or "Unknown". Inactive can mean temporarily or permanently inactive. |

TABLE 2-continued

DEFINITION OF TERMS

| Term/Phrase/ Abbreviation | Meaning |
|---|---|
| Quadrant | One of four areas of a scatter chart (Industry Hazard Identifier Report) Quadrant I: Protection Rating < 7 & Impact rating >= 7 Quadrant II: Protection Rating >= 7 & Impact rating >= 7 Quadrant III: Protection Rating < 7 & Impact rating < 7 Quadrant IV: Protection Rating >= 7 & Impact rating < 7 |
| Impact Rating | Quantification of the impact that a loss or incident involving the special hazard will have on the overall operations at the location into a rating ranging from 1 to 10, (1 signifying the least impact and 10 signifying an extremely high impact on the operations). |
| Protection rating | Quantification of the protection of the special hazard and includes sprinkler protection, special extinguishing systems etc. into a rating ranging from 1 to 10 (0-3 poor; 4-6 fair; 7-9 good; 10 excellent) |
| Industry Hazard Index Rating | A measure between 1.0(Poorest) and 10.0 (Best) of the overall "risk quality" of the special hazards at a location with a status of "Active". Industry Hazard Index Ratings (0-3.9 poor; 4.0-6.9 fair; 7.0-9.9 good; 10.0 excellent). The special hazard index rating is calculated used the following formula: I.H. Index Rating = $[(P_1 * I_1) + (P_2 * I_2) + (P_3 * I_3) + \ldots (P_n * I_n)]/(I_1 + I_2 + I_3 \ldots + I_n)$ P = Protection rating I = Impact rating Note: Special hazards with a status of "Inactive" or "Unknown" are not included in the index calculation. |
| Filtering | Filtering functionality provides the ability to select and narrow reports based on specific criteria. Functionality incorporated to this tool also allows the user to save the filters for future use at an individual or account level. |
| Sorting | Sorting is the process of ordering information based on entered parameters (field names, ascending, descending). Sorting functionality provides the ability to arrange data in order (increasing or decreasing) based on parameters selected by the user. |
| Risk Quality Rating | The Risk Quality Rating Summary report compares the ratings of several risk management programs and physical protection features for a location. The rating is on a scale of 1-10 with 10 being the best rating and 1 being the poorest rating. Ratings are coded in Red (Poor), Yellow (Fair), Green (Good) and Blue (Excellent) This visual representation allows a customer to quickly identify deficiencies which are affecting the Quality Rating for an account, division or location. Additionally, the user can efficiently identify outstanding actions that can be taken to improve deficiencies. |
| Benchmarking | A single graphical report that displays the risk quality rating that is calculated from a weighted average of various loss prevention features for the entire account or divisions and locations of an account. The report is titled as follows: Risk Quality Benchmarking |
| Analysis | Several tabular reports that display loss prevention data and evaluation for a division and/or locations of an account. The reports are titled as follows: Building Construction Summary, Catastrophe Summary, Fire Protection Summary, Management Programs Summary, and Risk Quality Ratings Summary. |
| Recommen- dations | Several graphical and tabular reports that categorize and prioritize "recommendations" for a division and/or locations of an account. The reports are titled as follows: Active Recommendation by Type, Active Recommendation Completion Status, and Recommendation Summary. |
| Performance Metrics | Two graphical and tabular reports that track the timeliness of report delivery and the schedule of previous and upcoming surveys for a location of an account. The reports are titled as follows: Loss Prevention Survey Report Delivery and Loss Prevention Survey Schedule. |
| Recommen- dation | Refers to a recommendation made by a service representative (or other risk manager) to eliminate or minimize deficiencies in the physical protection or management loss prevention programs at a location |

Since certain changes may be made in the above methods and systems without departing from the scope of the invention, it is intended that all matter contained in the above description or shown in the accompanying drawing be interpreted as illustrative and not in a limiting sense. For example, the processes described above as occurring on a single compute or server may occur across a distributed network of such computers or servers. It is also to be understood that the following claims are to cover all generic and specific features of the invention described herein, and all statements of the scope of the invention which, as a matter of language, might be said to fall there between.

What is claimed is:

1. A graphical and interactive interface system for managing risk management information, comprising:
   a secure database having risk management information accessible by authorized access through a network;
   a graphics interface for presenting electronic indicia of the risk management information in response to the authorized access; and
   a reporting engine capable of interacting with the secure database to summarize risk management information in a plurality of risk management categories,
   the reporting engine configured to provide summarized risk management information to the graphics interface for facilitation of risk management decisions and recommendations,
   where the reporting engine includes means for providing a loss estimate summary report filtered according to user-specified parameters, and
   where the loss estimate summary report comprises a location identifier, and the graphics interface is configured to operate in concert with the reporting engine such that onclick selection of the location identifier provides a location snapshot report of summary information associated with that location identifier.

2. A graphical and interactive interface system for managing risk management information, comprising:
   a secure database having risk management information accessible by authorized access through a network;
   a graphics interface for presenting electronic indicia of the risk management information in response to the authorized access; and
   a reporting engine capable of interacting with the secure database to summarize risk management information in a plurality of risk management categories,
   the reporting engine configured to provide summarized risk management information to the graphics interface for facilitation of risk management decisions and recommendations,
   where the reporting engine includes means for providing a loss estimate summary report filtered according to user-specified parameters, and
   where the loss estimate summary report comprises a selectable field, and the graphics interface is configured to operate in concert with the reporting engine such that onclick selection of the selectable field provides a pop-up report of loss estimate details.

3. A system of claim 2, where the graphics interface comprises means for displaying comparative statistical calculation results to a user.

4. A graphical and interactive interface system for managing risk management information, comprising:
   a secure database having risk management information accessible by authorized access through a network;
   a graphics interface for presenting electronic indicia of the risk management information in response to the authorized access; and
   a reporting engine capable of interacting with the secure database to summarize risk management information in a plurality of risk management categories,
   the reporting engine configured to provide summarized risk management information to the graphics interface for facilitation of risk management decisions and recommendations,
   where the reporting engine provides means for producing a location snapshot report including summary information for a particular location, and the graphics interface comprises a plurality of selectable fields each allocated to providing expanded information relevant to a different category of the location snapshot report.

5. A system of claim 4, where the different categories are selected from the group consisting of location documents, fire protection summary, natural catastrophe summary, other and allied protection summary, loss estimate details, customer comments, outstanding recommendations, special hazards, and combinations thereof.

6. A graphical and interactive interface system for managing risk management information, comprising:
   a secure database having risk management information accessible by authorized access through a network;
   a graphics interface for presenting electronic indicia of the risk management information in response to the authorized access; and
   a reporting engine capable of interacting with the secure database to summarize risk management information in a plurality of risk management categories,
   the reporting engine configured to provide summarized risk management information to the graphics interface for facilitation of risk management decisions and recommendations,
   wherein the reporting engine providing means for adjusting weighted benchmarking formula to compare data selected from the group consisting of:
   A) proposed data elements against other data elements across facilities, surveys, and recommendations; and
   B) multiple data elements from one source aggregated through a user-selectable statistical analysis formula against comparable normalized data elements from other sources.

7. A graphical and interactive interface system for managing risk management information, comprising:
   a secure database having risk management information accessible by authorized access through a network;
   a graphics interface for presenting electronic indicia of the risk management information in response to the authorized access; and
   a reporting engine capable of interacting with the secure database to summarize risk management information in a plurality of risk management categories,
   the reporting engine configured to provide summarized risk management information to the graphics interface for facilitation of risk management decisions and recommendations,
   further comprising means for associating a special hazard with an impact rating for the special hazard,
   the special hazard being defined as a risk category that is specific to an industry or production-method,
   where the impact rating represents a magnitude of potential loss affecting a location-specific industrial operation or production method, further comprising means for identifying a hazard by standard classification within a matrix of risk management classifications.

8. A system of claim 7, wherein the matrix further comprises an association between facility property loss value, time element loss value and one or more parameters selected from the group consisting of loss estimates, risk quality ratings, natural catastrophe ratings, and risk quality categories.

9. A system of claim 8, further comprising means for user-configurable reporting from the matrix.

* * * * *